United States Patent
Campana, Jr. et al.

(10) Patent No.: US 6,317,592 B1
(45) Date of Patent: *Nov. 13, 2001

(54) ELECTRONIC MAIL SYSTEM WITH RF COMMUNICATIONS TO MOBILE PROCESSORS

(75) Inventors: Thomas J. Campana, Jr., Chicago; Michael P. Ponschke, Lockport; Gary F. Thelen, Palos Park, all of IL (US)

(73) Assignee: NTP Incorporated, Annandale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,409

(22) Filed: Dec. 6, 1999

Related U.S. Application Data

(63) Continuation of application No. 09/161,462, filed on Sep. 28, 1998, now Pat. No. 6,067,451, which is a continuation of application No. 08/844,957, filed on Apr. 23, 1997, now Pat. No. 5,819,172, which is a continuation of application No. 08/443,430, filed on May 18, 1995, now Pat. No. 5,625,670, which is a continuation of application No. 07/702,939, filed on May 20, 1991, now Pat. No. 5,436,960.

(51) Int. Cl.[7] .................................................. H04M 11/10
(52) U.S. Cl. .................... 455/412; 455/418; 329/100.08; 709/206
(58) Field of Search .................................. 455/412, 418, 455/403, 461, 466, 31.2–31.3, 38.3; 379/93.1, 93.7, 93.14, 93.24, 100.8; 709/200, 204, 206–207, 217–219; 340/865.44, 311.1

(56) References Cited

U.S. PATENT DOCUMENTS 4,644,351 * 2/1987 Zabarsky et al. ............... 455/31.3 X
4,768,087 * 8/1988 Taub et al. ............................ 455/2 X
4,814,763 * 3/1989 Nelson et al. .................. 340/825.44

(List continued on next page.)

FOREIGN PATENT DOCUMENTS 63-209263   12/1988   (JP) .
1125049      5/1989   (JP) .

OTHER PUBLICATIONS

R Cole et al, Feb. 1989, "An Architecture for a Mobile OSI Mail Access System" IEEE Journal on Sleected Areas in Communications, vol. 7, Issue 2, pp. 249–256.*

(List continued on next page.)

Primary Examiner—William G. Trost
(74) Attorney, Agent, or Firm—Antonelli, Terry, Stout & Kraus, LLP.

(57) ABSTRACT

A system (100) for transmitting information from one of a plurality of originating processors A-N to at least a plurality of destination processors (A-N) which may be transported during operation in accordance with the invention includes at least one gateway switch (14), a gateway switch storing information received from one of the at least one originating processor prior to transmission of the information to the at least one destination processor; a RF information transmission network (302) for transmitting stored information received from one of the at least one gateway switch by RF transmission to at least one destination processor; at least one interface switch (304), an interface switch connecting a gateway switch to the RF transmission network and transmitting stored information received from one of the at least one gateway switch to the RF information transmission network; and wherein the information is electronic mail system in response to an address of the receiving interface switch which has been added to the information originated by the originating processor by either the originating processor or gateway switch and the information is transmitted from the receiving interface switch to the RF information transmission network with an address of the destination processor to receive the information which has been added by either the originating processor, a gateway switch or the receiving interface switch.

665 Claims, 12 Drawing Sheets

U.S. PATENT DOCUMENTS

| | | | |
|---|---|---|---|
| 4,821,308 | 4/1989 | Hashimoto | 455/31.2 |
| 4,825,456 | 4/1989 | Rosenberg | 455/31.2 |
| 4,837,797 | 6/1989 | Freeny, Jr. | 379/99.17 |
| 4,845,658 * | 7/1989 | Gifford | 709/217 |
| 4,875,039 * | 10/1989 | Andros et al. | 455/31.2 |
| 4,882,744 | 11/1989 | Hashimoto | 455/31.2 |
| 4,942,598 | 7/1990 | Davis | 455/31.2 |
| 4,961,216 | 10/1990 | Baehr et al. | 455/31.2 |
| 4,972,457 * | 11/1990 | O'Sullivan et al. | 455/556 |
| 4,994,797 * | 2/1991 | Breeden | 340/825.44 |
| 5,045,850 * | 9/1991 | Andros et al. | 340/825.44 |
| 5,046,066 * | 9/1991 | Messenger | 370/349 |
| 5,128,981 * | 7/1992 | Tsukamoto et al. | 455/550 |
| 5,159,592 | 10/1992 | Perkins | 370/338 |
| 5,917,629 | 6/1999 | Hortensius et al. | 359/136 |

OTHER PUBLICATIONS

"400 Breeds Third Generation E–Mail Systems", Morris, J. TPT 3–1989, vol. 7, No. 3, pp. 34–37.*

"Data Communications on The Cellular—The Office of Tommorow in Your Car Today", What Telephone & Comm. News 11–1995, No. 101, pp. 28–31.*

"Cellular Radio", Computer Law & Security Repcrt, 1–1986, vol. 1 No. 5, pp. 18–19.*

"More Power to The Pager", Today's Office (7–1987), No. 7, pp. 16–17.*

"Get in Memphis, Tennessee (cellular Communications)", Micro Decision, 5–1989, No. 95, pp. 50–54.*

"Tele–laptop Mobility as deciding Competition feature (radiotelephone & coup)", Funk–chav, 12–1987 110, 26 1', 35–6, 39.*

"Electronic Mail Radio Pulse Sliecper . . . ", Revue Polytechnique, 12–1989, No. 12, pp. 1508–1510.*

"Message Link", appearing in British Telecommunications Engineering, vol. 4, Jan. 1986, p. 202.

"Mobile Data Report" publication, vol. 3, No. 15, Apr. 22, 199 pp. 1–12.

* cited by examiner

LOCAL SWITCH MEMORY MAP

FIG. 5
(PRIOR ART)
HUB SWITCH MEMORY MAP

| HUB BUFFERS (206) | LATA BUFFERS (208) | LATA CODE TABLES N (100) (210) | HUB ROUTING CODES N (1000) (212) |
|---|---|---|---|
| INBOUND HUB # 1 | INBOUND LATA # 1 | LATA CODE 222 # 1 | ROUTING CODE 1,2,3,4,5,6 (312) — 224 |
| (214) | 218 | | |
| INBOUND HUB # N (6) | INBOUND LATA # N (100) | | |
| OUTBOUND HUB 1 | OUTBOUND LATA 1 | | |
| (216) | 220 | LATA CODE # N (100) | |
| OUTBOUND HUB # N (6) | OUTBOUND LATA # N (100) | | ROUTING CODE # N (999) |

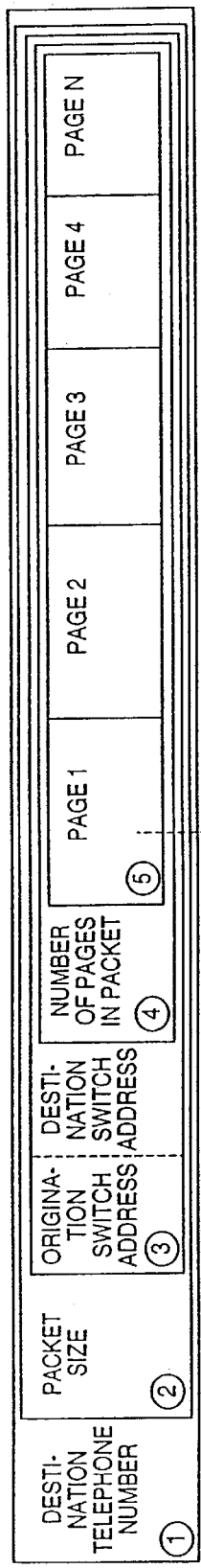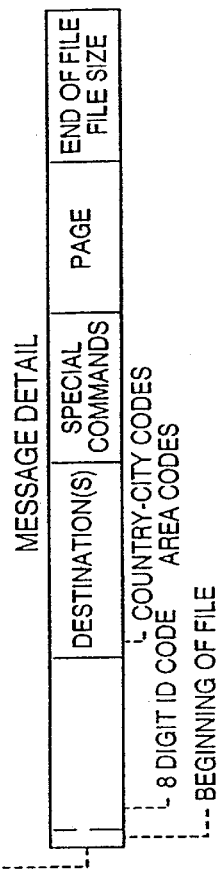
FIG. 6
PRIOR ART

ELECTRONIC MAIL SYSTEM WITH RF COMMUNICATIONS TO MOBILE PROCESSORS

CROSS-REFERENCE TO RELATED APPLICATIONS

Reference is made to other applications which are incorporated by reference in their entirety.

U.S. patent application Ser. No. 07/702,319, now abandoned, which is a parent of U.S. patent application Ser. No. 08/247,466, filed May 23, 1994, now U.S. Pat. No. 5,438,611, entitled "Electronic Mail System With RF Communications to Mobile Processors Originating From Outside of the Electronic Mail System"; and U.S. patent application Ser. No. 07/702,938, now U.S. Pat. No. 5,479,472, issued Dec. 26, 1995, entitled "System for Interconnecting Electronic Mail Systems By RF Communications";

This application is a Continuation of U.S. patent application Ser. No. 09/161,462, filed Sep. 28, 1998, now U.S. Pat. No. 6,067,451 which is a Continuation of U.S. patent application Ser. No. 08/844,957, filed Apr. 23, 1997, now U.S. Pat. No. 5,819,172; which is a continuation of U.S. patent application Ser. No. 08/443,430, filed May 18, 1995, now U.S. Pat. No. 5,625,670; which is a continuation of U.S. patent application Ser. No. 07/702,939, filed May 20, 1991, now U.S. Pat. No. 5,436,960.

TECHNICAL FIELD

The present invention relates to electronic mail systems for transmitting information between processors.

BACKGROUND ART

The use of computers to send and receive electronic mail messages is becoming very popular globally. Numerous companies (both network and software related) offer electronic mail packages (E Mail) and services. Currently, electronic mail services provide a convenient alternative to the more formal facsimile transmissions of memos and documents. Electronic mail is typically used to send relatively short informal messages between computers within an organization, or to a party located at a distant location or company. Electronic mail services are basically a wire line-to-wire line, point-to-point type of communications. Electronic mail, similar to facsimile transmissions, provides a one-way message. A recipient typically does not have to interact with the message. Electronic mail, unlike facsimile, is a non-real-time message transmission architecture.

FIG. 1 illustrates a block diagram of a typicai electronic mail system 10 in commercial use such as by AT&T Corporation. The electronic mail system 10 is comprised of a plurality of single processors or groups of processors #1-#N with N being any number with each group having individual processors A-N with N being any number. The groups of processors #1-#N may be distributed at locations which are linked by the public switch telephone network 12. The individual processors may be portable personal computers with a modem which are linked to the public telephone switch network 12 through wired or RF communications as indicated by a dotted line. Groups of associated processors #1-#3 may have diverse configurations with the illustrated configurations only being representative of possible architectures of groups of associated processors. The groups of associated processors may be connected to a host or mainframe computer through various communication mechanisms such as direct telephone communications (#1), communications through a local area network (#2), or communications through a private automatic branch exchange (#3). It should be understood that the illustrated architecture of the single and associated groups of processors is only representative of the state of the art with numerous variations being utilized. Many of the groups of associated processors are contained within the database network of a single company or organization located at distributed geographical locations throughout a country or in different countries.

Communications between an originating processor A-N, which may be any of the processors within the groups of associated processors #1-#3 or processor #N and a destination processor A-N are completed through the public switch telephone network 12 to one or gateway switch with mailboxes 14 which function store the message for delivery to the destination processor at a later point in time. The gateway switches with mailboxes 14 have a storage location, associated with each subscriber which may be any of the computers A-N within the associated groups of computers #1-#3 and individual computers #N, which provides retrieval capability of the electronic message when it is not delivered directly to the destination processor A-N such as when the destination processor does not go directly off hook in response to an attempt to deliver the message from storage in the electronic mail gateway mailbox storage location associated with the destination processor. In order to originate an electronic mail message, the originating processor A-N calls an associated gateway switch with mailboxes 14 via telephone through the usage of a modem connection. This connection is made through the public switch network 12. A gateway switch with mailboxes 14 answers and provides a data connection to the originating processor A-N. The gateway switch with mailboxes 14 typically contains the originating processor A-N file and verifies that the sending processor is able to originate an electronic mail message via some form of password protection. Upon verification of the entry password, the electronic gateway switch with mailboxes 14 down loads software and entry screens that are displayed on the originating processor to permit a message to be composed. Thereafter, the message is composed and transferred from the originating processors gateway switch with mailboxes 14 to the destination processors gateway switch with mailboxes where the message is stored and an attempt is made to deliver the message to the destination processor via telephone connection through the public switch telephone network 12.

Electronic mail systems have several common items that must be entered in order to originate and send (format) an electronic message. These items include the destination address, which consists of either the person or company's name, an abbreviated form of the person's company or name, or a series of digits or alphanumeric characters that must be entered to indicate to the electronic mail system the destination address of the recipient processor. Another item is an identification of the originating processor which may be an indication of the sender or the originator's name, company name, an abbreviated form of the originator'name or company name, or a numeric or alphanumeric entry that comprises the sender's name or address. This information is collectively an identification of the originating processor. Another item is the subject of the message which is typically a short reference as to the subject matter of the text or message that follows. Finally, the message or message text must be entered which is the information that is inputted by the person or machine which is originating the message at the originating processor A-N. Upon completion of the message text, the user or machine operating the originating processor A-N enters a series of commands or keystrokes on the originating processor to transmit the message to the gateway switch with mailboxes 14 associated with the originating processor A-N.

The transmission of the message from the originating processor's gateway switch with mailboxes 14 to the destination processor's electronic mail gateway switch with mailboxes is via analog or digital communications through the public switch telephone network. The destination gateway switch with mailboxes 14 contains the destination address of recipient destination processor.

Upon arrival of the information at the destination processor's gateway switch with mailboxes 14, one of two events takes place. The information is typically stored in the destination processor's electronic mailbox for later retrieval by the destination processor through interaction by the user of the destination processor. This typically happens as a result of the fact that a person is not located at the destination processor at the time of delivery of the message to the gateway switch with mailboxes 14 or the destination processor is not turned on and connected to the public switch telephone network 12. A second methodology is that the destination processor's gateway switch with mailboxes automatically dials the gateway processor's telephone number to deliver the information. In the situation where the destination processor is within a company or organization, the information may be delivered to the host computer. The destination processor's host computer stores the information until the destination processor calls the host computer to retrieve the information. In both of the methodologies described above, information delivery requires periodically calling a host computer or a mailbox at the gateway switch with mailboxes 14 to determine if new messages are present. This incurs additional costs in telephone calls and/or labor. If the host computer or gateway switch is not checked frequently, the information becomes untimely in its delivery. If the destination processor frequently checks the host computer or gateway switch, then additional costs and telephone calls and/or labor are encountered.

As personal computers are used more frequently by business travellers, the problem of electronic mail delivery becomes considerably more difficult. A business traveller carrying a portable PC has great difficulty in finding a telephone jack to connect the PC to fetch electronic mail from either a host computer or a gateway switch. Connections for a PC's modem are difficult to find in airports and with the advent of digital PABX's in businesses the telephone connectors are incompatible with a PC's analog modem. Hotels and motels oftentimes have internal PABX's that prevent calls from automatically being placed by the user's PC to electronic mail gateway switches to retrieve information. Most portable PC modems will only operate correctly when connected to a true outside telephone line that has telephone battery voltages and dial tone available to permit the number to be dialed direct. The inability to find an appropriate connection to connect the PC modem when travelling has contributed to the degradation of electronic mail reception when the recipient is travelling. When travelling internationally, this problem is further compounded by the fact that most electronic mail gateway mailboxes require a 1-800 toll free number is dialed in order to connect the mailbox. Almost all 1-800 telephone numbers are available for continental use only and cannot be accessed from a foreign country.

Industry trends make it increasingly difficult to receive electronic mail. When PC's were exclusively considered an office or desktop machine, it was loss difficult to deliver electronic mail. Advances in the state of the art in microelectronics have permitted PC's to be downsized to very lightweight portable (notebook), and notebook size computers. These portable units have the computing and storage power of the former desktop units and have lent themselves to the trend that they now become very portable in their utilization. They are small enough that they can easily fit into an attache case and/or a suit pocket. The net result is that the portable unit no longer resides in the office or the desktop. The portable unit now may be taken home at night, as well as on travel with the user, such as for business travel. Increased portability of PC's further aggravates the problem of automatic electronic mail delivery as a consequence of portability eliminating the wired communication paths which have been typically used in state of the art electronic mail systems. The electronic mail industry is currently experiencing a rapid growth rate.

Numerous communication companies are offering forms of electronic mail services. However, a problem arises that users of one electronic mail system currently cannot send electronic mail to a subscriber of another electronic mail system (e.g., AT&T E-mail to Sprint Mail, etc.). Numerous attempts are currently underway in the industry to solve this problem. Current attempts are the utilization of common protocols between electronic mail systems (e.g. X.400). However, the proposed system does not resolve the problems resultant from portability and travelling situations described above.

FIG. 2 illustrates a diagram of a prior art network 100 developed by Telefind Corporation of Coral Gables, Fla., which provided paging and data transmission capability and is a preferred form of the RF information transmission network used in practicing the present invention. This network is described in detail in U.S. Pat. Nos. 4,866,431, 4,868,558, 4,868,562, 4,868,860, 4,870,410, 4,878,051, 4,881,073, 4,875,039 and 4,876,538 and U.S. patent application Ser. Nos. 409,390, 464,675, 465,894, 464,680, 429, 615, 429,541, 409,605, and 456,742 which are incorporated herein by reference in their entirety. The system was a distributed network of switches comprised of a plurality of local switches 112, a plurality of lata switches 114 and a plurality of hub switches 116 with each switch being located in a different geographical location within an area being serviced by the system. The hub switches 116 may be located totally within a country to provide national service or in multiple countries to provide international service. Only a single portion of the network is labelled with reference numerals with it being understood that repeating portions exist such as for that portion under the jurisdiction hub switch #P. Communication links which are illustrated as a dotted arrow represent network structure which has been omitted for clarity that is identical to structure that is illustrated in detail. Additionally, one or more sublocal switches may optionally be provided within the system under the jurisdiction of the local switch as described in the aforementioned patents. The sublocal switches have been omitted for purposes of clarity. Each switch has jurisdiction over a geographic area. The functions performed by the local switch 112, the lata switch 114 and the hub switch 116 are described below. A local paging service 118 is typically connected to each of the local switches 112 which offers other paging services although it should be understood that the local switch may be used exclusively to control all services offered at the local level. The local paging service 118 is typically an existing common carrier paging service which services an area within broadcast distance of a transmitter 115 under the jurisdiction of the local paging service to which the local switch 112 has been connected to permit the local paging service to function in the network to transmit pages to a plurality of paging receivers 119 (only one having been illustrated) connected to a peripheral device 119 which may be a data processor printer, telex service, facsimile service or other types of data processing devices. The paging receivers automatically download data stored in their memory upon connection to a printer for producing a printout of the data. The printer was sold with the receiver by Telefind Corporation of Coral Gables, Fla. The paging receivers 119 were described in U.S. Pat. Nos. 4,849,750, 4,851,830, 4,853,688, 4,857,915, 4,928,100, 4,935,732, 4,978,944 and 5,012,235 and U.S. patent application Ser. Nos. 381,483, 381,527, 597,350 and 662,616 which were assigned to Telefind Corporation of Coral Gables, Fla. The transmitter 115 may be either an analog or digital transmitter. Communications between the local, lata and hub switches may be by any existing communication medium 120 such as direct dial-up circuits (IDD Circuits International), direct outward dial circuits (end-to-end), in-bound watts (and other in-bound services that are volume discounted), out-bound watts (and other out-bound services that are volume discounted), feature group A (U.S. service), feature group B (U.S. and European services), MF tie trunks (U.S. and European services), and direct inward dial (international service, where available), as well as any future medium which permits pages to be transmitted between switches. Each of these services are indicated schematically by a bi-directional arrow 120 which interconnects a local switch 112 to a lata switch 114, a lata switch to a hub switch 116, and a hub switch to another hub switch. Furthermore, the local switches 112 are connected to a local paging service 118 by a communication link 122 of any conventional nature, including wires connecting the local switch to the local paging service. Each switch is provided with a local telephone trunk 127 which functions as a maintenance port. Furthermore, dotted bi-directional lines 124 illustrate alternative communication paths between switches which may be used in the case of malfunction or busy conditions. It should be further understood that the network is not limited to any particular communication protocol linking switches, nor connecting the local switch to the local paging service. A telephone trunk 28 functions as an input for manual (telephone handset) and automatic device entry of pages as described below.

The network 110 provides numeric, alphanumeric and data services to all points within the United States and participating countries. In the preferred embodiment of the network, a universal code is used for encoding transmissions of characters over both the communication links 120 and 122 which is compatible with existing analog and digital transmitters 115. A universal code discussed in the aforementioned patents utilizes sixteen tones for encoding all characters for transmission between switches or to a local paging service 118. Each character is transmitted as two successive tones. A X.25 modified transmission protocol which is disclosed in the aforementioned network patents is preferably utilized for transmitting packets of pages between switches.

The network 110 is economical to implement and operate as a consequence of utilizing distributed processing technologies and transmission of pages periodically in packets of pages between the switches. Dynamic interaction between a frequency agile pager, which preferably is of the type described in the above-referenced receiver patents and applications and the network 110 efficiently utilizes transmission time that is available in the frequency spectrum. One of the distinct advantages of the network 110 is that it utilizes existing paging common carriers to deliver pages to the end user with existing paging RF coverage in the United States being greater than 85% of its geographical area with just two 150 MHz frequencies with a total of 10,500 additional frequencies being available for paging receiver use. Wire line common carriers, private systems, hospital, government, emergency and many other services can be accommodated by the utilization of dynamic frequency programming, by the network 110 to change the frequency band on which individual paging receivers may receive pages.

The network 110 provides an integrated sublocal, local, regional and nationwide paging network that is transparent to use by the subscriber and provides for pages (data transmissions) to be called into an existing local paging service 118 by the making of a local phone call on a telephone trunk 128 connected to the local switch 112 in a conventional fashion as well as to any lata switch 114 throughout the network 110 by a local phone call to telephone trunk 126. The functionality of permitting pages or data transmissions to be originated anywhere within the network 10 by local telephone call, preferably by calling a single number within the country (950-XXXX) avoids the telephone expense and system overhead caused by calling of a central switch to originate a page. It should be understood that the network's usage of periodically transmitting packets of pages between switches results in a much lower cost than the cost of 800 or conventional long distance service. The phone trunk 126 for calling the lata switch 114 to place a page anywhere within the network 110 is indicated by bi-directional arrows to each lata switch. Regardless of the location of the person making the telephone call to a lata switch 114 over telephone trunk 126 to originate a page, the lata switch will formulate a page with the destination specified by geographically descriptive digits of the identification code inputted with the call to request a page or data transmission to the lata switch and the network 110 will automatically route the page through the switches of the network to the person being paged by way of the local switch 112, which stores a subscriber file that stores the identification code of the subscriber and paging receiver. The local switch 112, which stores the identification code inputted with the page in its subscriber file, adds one or more destinations to the page and transmits the page(s) to the local paging service 118 and/or the network 110 by way of the lata switch 114 having jurisdiction. The person placing the page by calling the local switch 112 on telephone trunk 128 or the lata switch 114 on telephone trunk 126 does not have to know the location of the person receiving the page.

The local switch 112 is connected to a participating common carrier paging service 118 located in a particular geographic area. The local switch 112 has local direct inward dial trunks 128 which permits the subscriber to use a local telephone call to place a page. Pages over the local telephone trunks 128 may be (1) numeric characters which are entered manually by DTMF tones or other telephone coding mechanisms, (2) alphanumeric characters which are entered manually by DTMF tones or other coding mechanisms, (3) alphanumeric characters which are entered by an automatic message inputting device using an encoding format having a transmission protocol of conventional nature such as DTMF tones or (4) a high speed (baud rate) encoding protocol such as an X.25 protocol permitting a variable number of pages or data transmissions each with its own network destination to be formed into a packet which is transmitted to a single switch. The local switch 12 has voice prompting which facilitates the person placing a call on the telephone trunk 28 to enter a message to be transmitted as a page.

The local switch 112 processes the pages received from the telephone trunk 128 and from the associated lata switch 114 to which the local switch is connected by the communication link 120. It should be understood that the local switch 112 has programming which automatically and dynamically monitors paging traffic when a plurality of transmission frequencies are used and allocates the frequencies available to the paging service 118 for transmission to the paging receivers to maximize the local paging services paging throughput as described below. The local switch 112 calls the resident local paging terminal of the paging service 118 and determines how much air time it has to deliver a batch of pages to the transmitter 115 associated with the local paging service. The local switch 112 then calls the local paging terminal of the local paging service 118 and transmits a batch of pages encoded in the hybrid encoding format described below which is compatible with existing analog and digital FM paging transmitters.

The local switch periodically transmits packets of pages or data transmissions stored in an outbound lata buffer over communication link 20 to the lata switch 114 having jurisdiction over it which provides cost efficient transmission and efficient page or data transmission processing. This architecture is highly efficient in routing the pages originating at the local switch 112 to be transmitted by the network 110 which are intended for broadcast by a transmitter remote from the local switch having a subscriber file storing the identification code of the subscriber to which data or a page is to be transmitted.

When the subscriber desires to receive regional, national, or international service, the local lata switch 112 is programmed by the subscriber by simple telephone area code entries which identify the service areas to which pages or data transmissions are to be transmitted. The programming is accomplished by adding or deleting one or more area codes of the subscriber's destination field contained in a subscriber file maintained in the subscriber's local switch 112. In the United States, area codes are used for ease of subscriber use and telephone books may then serve as the service area directory. The same ease of use is available to worldwide customers with county-city code entries available from telephone books in any airport, hotel or business.

The local switch controls the generation of individual pages or data transmissions having message detail as described below with reference to FIG. 6. The number of pages or data transmissions which are generated in response to a page received without an area destination from the telephone trunk 128 or from a lata switch 114 is determined by the central processor of the local switch 112 interrogating any area destinations listed in the destination area code field of the local switch as described below with reference to FIG. 3. Each page or data transmission generated by the processor contains the same message content. A separate page or data transmission is generated for each destination area listed in the destination area code field and if the local service option of the service option field is selected, as described below, an additional page or data transmission is generated for broadcast by the local paging service 118 without an area destination in the network which is processed by the local switch 112 as a page or data transmission received from the network for broadcast by the local paging service. Furthermore, each individual page or data transmission generated by a local switch 12 contains one or more commands. The commands which are added to each page or data transmission transmitting a message are determined by the operation of the central processor of the local switch 112 in response to interrogation of the selected service options of the subscriber. Programming of receivers with the channel programming command is in response to the local switch programming the receiver to receive one or more channels, subscriber programming of destination areas of reception in the destination area code field, and the degree of utilization of the channels of the local transmitter 115.

The central processor of the local switch 112 processes each individual page or data transmission received from the network to determine if it originated from a local switch 112 or a lata switch 114. This determination is made by determining if a destination header identifying a lata switch 114 originating the page precedes the paging receiver identification code in a packet having the configuration of FIG. 6. In the absence of the header (which is a geographic identification of the originating lata switch 112 in the network) in an individual page or data transmission, the page or data transmission is processed exclusively by the local switch 112 for broadcast by the associated local paging service 118 without interrogation of a subscriber file in the local switch. If the header is found in a page or data transmission, the central processor processes the page as either a request to reprogram the subscriber file or as a page received on the telephone port 128 without an area destination which must be processed to determine one or more area destinations be formed into new pages each with a different area destination from the area destination field if transmission by the network is to occur and into a page or data without an area destination if transmission by the local service 18 is to occur.

The local switch 112 also serves as the dynamic programming interface between the paging or data receivers 119 and the network 110. The local paging service 18 may cause channels to be received by receivers 19, change subscriber identification codes and add new customers to the network 110 utilizing the local switch 112. The functionality of the receiver 119 can be changed from a fixed channel to a multi-channel or a scanning receiver as required by use of the channel programming command.

Messages originating at the local switch 112 which are transmitted to the lata collector switch 114 having jurisdiction over it are packetized as described below with reference to FIG. 6. Destination area codes (telephone area codes or other geographically descriptive code) are added to pages or data transmissions prior to transmission to the lata switch 114 and the receiver 119 is dynamically and automatically reprogrammed for the new service areas by the local switch 112 issuing channel programming command(s) which ensures that the receiver 119 is programmed to receive channels in each designated area. The current channels remain in the receiver 119 to avoid loss of a message while a subscriber is still in the area.

The lata switch 114 provides a second tier of network intelligence. This intelligence includes page or data transmission processing, packetizing and routing. The lata switch 114 receives packets of pages from each of the local switches 112 within its jurisdiction as well as the hub switch 116 having jurisdiction over it. The lata switch 114 provides the geographical presence for the network 110 to originate and terminate pages or data transmissions utilizing dial-up or dedicated communication services.

The lata switch 114 is responsible for collection of pages from the local switches 112 within its jurisdiction. When a packet of pages is received from the local switch 112, it is disassembled, processed and stored for transmission to the proper destination(s) in one or more packets each consisting of one or more pages which are intended for destination(s) either within or outside the lata switch jurisdiction. The lata switch 114 periodically transmits packets of pages stored in its outbound hub buffer and its outbound local buffer to the associated hub switch 116 havin jurisdiction over it and to local switches 112 within its jurisdiction which provides cost efficient transmission and efficient processing by avoiding processing by a single central switch controlling the network 110. This architecture is highly efficient in routing pages or data transmissions originating within the jurisdiction of the lata switch 114 which are intended for broadcast outside its jurisdiction as well as distributing pages or data transmissions from one local switch 112 to one or more additional local switches within the jurisdiction of the lata switch. If the page or data transmission is destined for distribution within the jurisdiction of the lata switch 114, the page or data transmission is processed into packets for transmission to each of the local switches 112 within its jurisdiction or alternatively to less than all of the local switches in its jurisdiction. The pages or data transmissions are then periodically transmitted as packets to the local switches 112 within the jurisdiction of the lata switch 114.

The lata switch 114 is also responsible for collection of pages outside its jurisdiction to be broadcast to the local switches 112 within its jurisdiction. Packets received from the hub switch 116 are disassembled, processed, and packetized for transmission to the destination local switches 112.

The function of the lata switch 114 in collecting requests for placing pages or data transmissions in the network or to reprogram the subscriber file of a local switch 112 by placing a local phone call on telephone trunk 126 is an important aspect of the network. The lata switch 114 places the header discussed above, which geographically identifies the lata switch originating the page or data transmission in front of the receiver identification code, in a packet as illustrated in the message detail of FIG. 6 to enable the local switch 112 to differentiate between pages or data transmission which are for broadcast by the local service 118 associated with a receiving local switch 112 and pages or data transmission which require access to the subscriber files to generate one or more pages or data transmissions for broadcast or for reprogramming a subscriber file. Preferably, the header is four digits comprised of a country code followed by the telephone area code identifying the lata switch 114 which received the call for the originating page or data transmission.

The hub switch 116 provides the third tier of network intelligence and serves as an inter-regional communications link. One hub switch 116 will preferably be located in each international region to serve as a network routing switch. In the United States, a hub switch 116 will be located within the region served by each of the Bell regional companies (RBOC's). Accordingly, in the United States the preferred implementation of the network 110 includes seven distinct hub switches 116. Each hub switch 116 in a preferred embodiment can have fifty-five lata switches 114 under its jurisdiction. The hub switch 116 also serves as a network routing switch for inter-hub calls when pages or data transmissions are to continue in the hub-to-hub network.

When a packet of pages is received from either another hub switch 116 or a lata switch 114 within its jurisdiction, the pages or data transmission are disassembled for examination. Each page or data transmission is examined for its destination address(es). A determination is made if the hub switch 116 should forward the page or data transmission to one of the six adjacent hub switches or forward the page or data transmission to a lata switch 114 within its jurisdiction. The pages or data transmissions are then destination processed and packetized for transmission to either another hub switch 116 or a lata switch 114 within its jurisdiction.

FIG. 3 illustrates a memory map of the RAM of a local switch 112. The RAM has four main storage areas which are the subscriber files 154, channel files 156, lata buffers 158 and local buffers 160.

Each local switch 112 is allocated a capacity of, for example, 10,000 subscribers which are identified by a four-digit code stored in field 162 of the subscriber files 154.

Field 164 stores the subscriber's local telephone number within the area code serviced by the lata switch 114 having jurisdiction.

Field 166 is the subscriber's receiver identification code which uniquely identifies the subscriber and the receiver 119 of the subscriber which is to receive pages or data transmissions throughout the network 110. The receiver identification number (code) consists of 8 digits with the four most significant digits geographically representing the area serviced by the associated lata switch 114 (country code as the most significant digit followed sequentially by area or city code lesser significant digits) and the four least significant digits being digits assigned to identify 10,000 subscribers within the jurisdiction of the local switch. The capacity of the network 110 is 100 million subscribers with the eight digit identification code. The least significant numbers of the identification code define subscribers of a specific local switch 112 within the jurisdiction of the lata switch 114.

Field 168 stores the service options which each subscriber may choose to have provided by the local service 118. The service options control the commands, which are used with pages or data transmissions sent to the receivers 119. The main CPU interrogates the particular subscriber file identified by the identification code inputted with the request for a page or data transmission by telephone trunks 126 or 128, causes storage of the page or data transmission, determines the destination(s) of the page or data transmission and the appropriate system command to be used to transmit the page or data transmission. It should be understood that the service options may be dynamically programmed through voice prompted communications over the telephone trunk lines 128 with the local switch 112 and through telephone calls to the lata switch 114 by trunk 126 as described below.

The service options are described as follows. The service option "a" is for no service which is a condition when an active subscriber does not wish to receive any pages or data transmissions such as may occur when the subscriber is on vacation or is otherwise desirous of not being reached for a period of time but does not wish to be removed from the subscriber base of the system. The service option "b" is for pages or data transmissions to be broadcast only by the transmitter 115 of the local service 118. The service option "c" is for regional service which is for pages or data transmissions to be broadcast throughout all of the local services 118 which are within its lata switch jurisdiction. The service option "d" is for national service which is for pages or data transmissions to be broadcast from the local switch 112 to one or more lata switches 114 other than the lata switch having jurisdiction over the local switch. While not illustrated, an international service option may be added. The service option "e" is for a repeat of pages or data transmissions for any of the "b", "c" or "d" service options so that a page or data transmission is broadcast more than once. The service option "f" is for data service which causes the page or data transmission to be stored in a specified section of the receiver memory. The service option "g" is for external data service which commands the receiver 119 to output the page or data transmission to the external data port of the receiver. This option permits the receiver 119 to support peripheral devices such as printers or processors to provide a wide range of data services.

The following additional fields are provided. The fifth field 170 is the subscriber's name and the subscriber's specified account number. The sixth field 172 is the subscriber's account number entry for purposes of interval billing by the local service 118. The seventh field 174 is the subscriber's count (local, regional or national) which is a total of the number of pages or data transmissions made in a billing period. The eighth field 176 is the total number of data characters sent during the billing period.

The ninth field 178 is the destination (area code(s)) of each of the pages or data transmissions. For local service, there is no area code specified. For regional service, the area code of the associated lata switch 114 having jurisdiction over the local switch 112 is specified and for national and international service, one or more area codes or other geographic identification identifying lata switches other than the lata switch having jurisdiction over the local switch are specified. For international service, a country code may be used to identify lata switches 114 within a particular country. Any number of area codes may be specified but in a preferred embodiment of the network 110, three area codes is a maximum number of lata switches 114 which may be specified as regions to receive pages from the local switch 112.

The above-referenced description describes the first file of the n (10,000) possible subscriber files stored in the subscriber files 154. It should be understood that the other subscriber files have the same configuration. Access to the subscriber file is obtained by a voice prompted message requiring the inputting of a secret code which if inputted correctly is followed by voice prompted requests requesting specification of the information of the subscriber file to be changed.

The frequency files 156 perform an important function in the network 110. The frequency files 156 contain n possible lata files with each individual file identifying up to, for example, 15 four-digit numbers that represent broadcast channels available within the service area of a lata switch 114. Thus, each of the individual lata switches 114 in the network 110 will have a separate frequency file which identifies all of the channels which are available to transmit pages or data transmissions from the transmitters 115 associated with the local services 118 under the jurisdiction of that lata switch 114. The channels are stored as a four-digit number in a hexadecimal numbering system which requires only four digits of space. A file containing all zeros (no channel) will cause an invalid area code message to be returned to a subscriber attempting to reprogram service areas. The frequency files are the source of channels which are utilized by the channel programming command to program each receiver 119 for operation in each lata switch jurisdiction and the local switch jurisdiction. For example, a receiver 119 which is to be serviced by only a single local service 118 may be programmed to receive only a single or a number of channels up to the number of channels used by that local paging service. Furthermore, for regional service or national service, the frequency files 156 are used to program the receiver 119 to receive pages or data transmissions from the channels used by the local services 118 within the designated area codes representative of the service areas serviced by the lata switches 114. Furthermore, if a receiver 119 is to be programmed to receive messages in a particular area serviced by a lata switch 114 as a consequence of the subscriber travelling, the channel programming command utilizes the channels stored in the file number corresponding to the jurisdiction of the lata switch 114 in the area to which the subscriber is to travel, to dynamically program the channel(s) which the paging receiver is to receive in that area. For service in a local region, the frequency files are used as a source of channels to be used by the channel programming command to dynamically shift the channels on which the paging receiver is to receive a page, to adjust the channels used in the broadcast area used by the local service 118 associated with the local switch 112 based on the amount of traffic on each channel and to further provide a source of channels which are to be used for specialized services for transmitting particular types of information to particular subscribers such as, but not limited to stock quotations.

The lata buffers 158 consist of an inbound lata buffer 180 and an outbound lata buffer 182. The inbound lata buffer 180 functions to receive pages or data transmissions coded in ASCII which have been processed to strip the X.25 transmission protocol used for transmitting pages from the lata switch 114 to the local switch 112 and converted from the hybrid code described below to ASCII. Pages or data transmissions which are initially stored in the inbound lata buffer 180 are processed for destination and are either for broadcast by the associated local service 118 in which case they are ultimately stored in the appropriate identification code buffer 186 which matches the least significant digit of the identification code contained with the page or data transmission or in the outbound lata buffer 182 if the page or data transmission originated from one of the lata switches 114 by calling on the telephone trunk 126 and which has a final destination which is determined by the field 178 of the subscriber file 154.

The local buffers 160 are comprised of an inbound buffer 184 for receiving all local inbound pages or data transmissions which originate from the trunk line 128 which is connected to the local switch 112 and a plurality of identification code buffers 186 which are each individually assigned to store outbound pages or data transmissions with a particular least significant identification code digit of the number base used for the subscriber identification code which are to be transmitted to a receiver 119. All of the received pages or data transmissions from the local switch 112 are initially stored in the buffer 184. Each of the individual identification code buffers 186 stores pages or data transmissions for broadcast by the local service 118 in batches which are grouped by the least significant digit of the subscriber identification code received with the page or data transmission after sorting by the CPU. In other words, the least significant digit of the subscriber identification code within a page or data transmission for broadcast by a local service 118 determines in which of the identification code buffers 186 the page or data transmission is stored. For example, if the last digit of the identification code of a page or data transmission for broadcast by the local service 118 ends in the digit 0, the page or data transmission is stored in the identification code buffer identified by "0".

FIG. 4 is a memory map of the random access memory of the lata switch 114. The random access memory has three main areas and two optional areas. The three main areas are hub buffers 188, local buffers 190 and a lata identification code (ID) memory 192. The optional memory areas are an all call buffer 194 for storing nationwide pages or data transmissions received from the hub switch 116 which are to be transmitted to all of the local switches 112 under the jurisdiction of the lata switch 114 and an all call buffer 196 which stores pages or data transmissions received from one of the local switches 112 which are to be transmitted to all of the local switches under the jurisdiction of the lata switch 114.

The hub buffers 188 are an outbound hub buffer 198 and an inbound hub buffer 200. The outbound hub buffer 198 stores pages or data transmissions to be periodically transmitted to the hub switch 116 having jurisdiction over the lata switch 114 under the control of the CPU. The inbound hub buffer 200 stores pages or data transmissions which are periodically received from the associated hub switch 116 via storage in a buffer of the CPU.

The local buffers 190 are comprised of an inbound local buffer 202 which stores groups of inbound pages or data transmissions received from the local switches 112 and a plurality of outbound local buffers 204 each of which store groups of pages or data transmissions which are to be transmitted periodically to a specific one of the local switches with a separate outbound local buffer being provided for each of the local switches under the jurisdiction of the lata switch 114. The CPU processes each of the pages or data transmissions which is received in the inbound buffers 200 and 202 by destination and causes storage in the outbound buffers 198 and 204 which is associated with the destination of the page or data transmission.

The lata identification code memory 192 stores the subscriber identification numbers of all of the subscribers which are associated with each of the local switches 112 within its jurisdiction. The lata identification code memory 192 is used for determining the local switch 112 which stores a subscriber file of the subscriber used for pages or data transmissions which are inputted to the system from a direct call by telephone trunk 126 to a lata switch 114 or from a direct call by telephone trunk 126 to a lata switch by a subscriber to program the reception area of pages or data transmissions by changing the destination 178 of the pages or data transmissions. The lata identification code memory 192 may be organized by subscriber identification codes which are within the jurisdiction of each local switch 112 so that the matching of an identification code of a page or data transmission inputted to the lata switch 114 in the lata identification code memory 192 provides the location of the particular local switch which stores the subscriber file 154 of that subscriber.

In order to avoid having to provide additional storage space in each of the outbound local buffers 204, the optional all call buffer 194 may be provided to store a single page or data transmission, received from the hub switch 116 having jurisdiction over the lata switch 114, which is to be transmitted to each of the local switches 112. Similarly, the optional all call buffer 196 may be provided for receiving pages or data transmissions from an individual local switch 112 which are to be transmitted to all of the local switches within the jurisdiction of the lata switch 114.

For pages, data transmissions or requests to reprogram the subscriber file 154 which are made to a lata switch 114 over telephone trunk 126 which require access to a subscriber file outside the jurisdiction of the lata switch, the CPU forms a page or data transmission contained in a packet having an area destination identified by the four most significant digits of the identification code inputted to the lata switch 114 preceded by the identification code of the receiver 119 to receive the page or data transmission, preceded by the geographical area identification of the lata switch receiving the call to originate a page or data transmission or to program the subscriber file which is transmitted by the network 110 to the specified area destination. For pages or data transmissions to be billed to subscribers stored in the subscriber file 154 of a local switch 112 within the jurisdiction of the lata switch 114 or requests to program the subscriber file 154, the CPU forms a packet having an area destination of the local switch 112 within its jurisdiction which stores the subscriber identification code as determined by interrogation of the lata identification code buffer 192 by the CPU. The ultimate destination of a page or data transmission is determined by the destination field 178 of the subscriber file 154 matching the identification code of the receiver 119 either within or outside the jurisdiction of the lata switch that is called in over telephone trunk 126. The local switch 112 containing the subscriber file 154 creates the one or more pages or data transmissions in accordance with the information in the subscriber file including the adding of destination(s) and the appropriate command. Transmission of the pages or data transmissions created by the local switch 112 in response to a call to a lata switch 114 is identical to the transmission of pages or data transmissions originating at the local switch 112 by the placing of a telephone call on telephone trunk 128. In the case of requesting programming of the subscriber's file 154, the caller must in response to a voice prompted message enter a four-digit secret identification code to obtain access to the subscriber file with voice prompted messages being supplied under the control of the CPU to control the input of programming information from the subscriber. To request a page or data transmission by calling the lata switch 114, the caller will receive a voice prompted message to enter the subscriber identification code and then the appropriate page or data transmission.

FIG. 5 is a memory map of the random access memory of the hub switch 116. The hub switch memory map is comprised of four main parts which are hub buffers 206, lata buffers 208, lata code tables 210 and hub routing codes 212. The hub buffers 206 are comprised of a plurality of inbound hub buffers 214 which correspond in number to the number of other hub switches 116 in the network 110 which have direct connection to the hub switch and a corresponding number of outbound hub buffers 216. The individual inbound hub buffers 214 each store pages or data transmissions received from one of the hub switches 116 with pages or data transmissions received from each adjacent hub switch 116 being stored in only a single one of the inbound hub buffers 214. Similarly, pages or data transmissions which are to be transmitted to another hub switch 116 are stored in the outbound hub buffer 216 which is associated with the destination hub switch to which they are being transmitted with all pages or data transmissions which are to be routed to a single hub switch being stored in a corresponding one of the outbound hub buffers 216 with a separate hub buffer being associated with each hub switch to which pages or data transmissions are directly transmitted. The lata buffers 208 are comprised of a plurality of inbound lata buffers 218 which correspond to the number of lata switches 114 under the jurisdiction of the hub switch 116. The inbound lata buffers 218 store all of the pages or data transmissions received from the lata switches 114 under the jurisdiction of the hub switch 116. The outbound lata buffers 220 correspond in number to the lata switches 114 under the jurisdiction of the hub switch 116 with a separate lata buffer being associated with each of the lata switches. The outbound lata buffers 220 store groups of pages or data transmissions to be periodically transmitted to their associated lata switch 114. Pages or data transmissions which are stored in the inbound hub buffers 214 are processed by destination by the CPU and stored in either the outbound hub buffer 216, which is the destination of the pages or data transmissions not to be received by a lata switch 114 under the jurisdiction of the hub switch 116, or in one or more of the outbound lata buffers 220 if the destination of the packets received from another hub switch 116 is a lata switch under the jurisdiction of the hub switch. The CPU also processes the pages or data transmissions stored in the inbound lata buffers 218 according to their destination and causes their storage in either the outbound hub buffers 216 if the pages or data transmissions are to be sent to a lata switch 114 outside of the jurisdiction of the hub switch 116 or to one or more of the outbound lata switches 220 if the pages or data transmissions are to be received by one or more lata switches 114 under the jurisdiction of the hub switch 116.

The lata code tables 210 store each of the lata (telephone area or other geographic identifier) codes 222 under the jurisdiction of the hub switch 116 which are utilized by the comparison performed by the CPU with the pages or data transmissions stored in the inbound hub buffers 214 and inbound lata buffers 218 to determine in which of the outbound hub buffers 216 or outbound lata buffers 220 the pages or data transmissions should be stored. Each separate lata code 222 corresponds to the geographical identification of the lata switch 114 which in the preferred embodiment is the telephone area code of a lata switch's jurisdiction.

The routing codes 212 determine the transmission routes to other hub switches on a priority basis to which a packet should be sent which are not intended for a lata switch 114 within the jurisdiction of the hub switch 116. It should be understood that a number of factors may be considered in choosing the priority of a route to be used to transmit a packet from one hub switch 116 to another hub switch. It would appear on first analysis that a direct first hub switch to second hub switch route would be best but often the switching overhead of routing a packet through one or more intermediate switches is more than compensated for by the efficiency of a route having one or more intermediate hub switches by adding additional pages or data transmissions to the packet which are inputted to the one or more intermediate hub switch(es) to the packets being transmitted to the second hub switch. The CPU compares the destination of the groups of pages or data transmissions stored in the inbound hub buffers 214 and the inbound lata buffers 218 to determine if these pages or data transmissions should be routed to another hub switch 116. The hub routing codes 212 are referred to by default when a match is not found by the CPU in comparing the destination of the pages or data transmissions stored in the inbound hub buffers 214 and inbound lata buffers 218 with the codes stored in the lata code tables 210. Each page or data transmission stored in the inbound hub buffer 214 and inbound lata buffers 218 is processed by destination by the CPU and caused to be stored in the outbound buffers 216 and 220 which correspond to its destination. Each individual hub routing code contains the hub switch destination priorities for pages or data transmissions to be sent to a single lata switch 114 outside the jurisdiction of the hub switch 116. For example, for the lata switch 114 having jurisdiction over area code 312, the hub routing code 234 determines the priorities in descending order from the highest priority to the lowest priority such that the highest priority hub would be #1 followed by #2–#6.

FIG. 6 illustrates a preferred transmission protocol to be used for transmitting packets between switches. The protocol which is used is a modified X.25 protocol. As illustrated, each packet contains five separate layers. The first layer is the destination telephone number which is the receiving port to receive the page or data transmission. With reference to FIG. 2 if a packet of X.25 formatted pages or data transmissions were to be sent from a first lata switch 114 to its associated hub switch 116 over communication path 120, the destination telephone number would be the telephone number of the hub switch. It should be further understood that the X.25 transmission protocol as described herein may be utilized with other types of communication mediums between switches such that a destination telephone number may be replaced with another form of address of the receiving switch. The second layer indicates the packet size field in terms of succeeding layers of information. In the present case levels 3, 4 and 5 are provided which dictates that the packet size would store the number 3 to indicate the subsequently lower third, fourth and fifth layers. The third layer contains an origination switch address and a destination switch address which can be either telephone numbers or real addresses within the network 110. The fourth layer is the number of pages or data transmissions which are contained in a packet. As illustrated, this number may be any integer n. The fifth layer is one or more pages or data transmissions which each correspond to an individual page or data transmission to be sent to a particular receiver 119.

Each message includes the following information. In accordance with standard X.25 protocol, a beginning of file header is included. Following the beginning of file header is a receiver I.D. code which is the identification code of the destination receiver which is identical to the subscriber identification code stored in the subscriber files 154 of the subscriber to receive the page or data transmission. Following the I.D. code is the destination(s) of the page or data transmission which is geographically descriptive of the area to which the page or data transmission is to be transmitted and is added by the local switch 112 interrogating the destination field 178 of FIG. 3. In the preferred embodiment, the destination is a combination of country and area code as utilized by the telephone system to identify the area to which the paqe or data transmission is destined. For each country, the same country code will be used so that if the system 110 as illustrated in FIG. 1 were to be utilized for the United States, the first digit of the destination would be a 1. Similarly, the destinations in other countries would be followed by different numbers identifying those countries followed by code which breaks up the identified country into smaller geographic regions. It should be understood that a destination which is not based on the telephone system is equally usable. The field of special commands are the system commands which are transmitted with each page or data transmission to a receiver. The "page" or "data transmission" is the part which is to be displayed to the bearer of the receiver 119 and may be numeric or alphanumeric characters. The end of the file and file size information are part of a standard X.25 protocol.

A FIG. 7 illustrates an interconnection between a paging receiver (left side) in accordance with the above-referenced receiver patents and a printer (right side) which has been offered for sale by Telefind Corporation of Coral Gables, Fla. The "EXTERNAL ANTENNA" pin is for connection only to an external antenna and connects the RF signal from the external antenna to the receiver internal antenna. The "LINK" pin is detected by the printer to determine if the receiver 119 is connected or not. If the receiver is not connected when peripheral power is on, then the CPU of the printer will detect that the "LINK" pin is high. Otherwise the "LINK" pin will be low. The pin "EXTERNAL BUZZER" outputs a 2 KHz trigger signal when a page or data transmission is received. The "ETERNAL BUZZER" pin also outputs the 2 KHz trigger signal when display of a message is complete. The pin "PRG VCC" is supplied 5 volt power by the attached printer to provide power to the receiver 119 whether the pager is powered or not. The "GROUND" pin is a ground for the printer and receiver 119. The pin "BUSY" is pulled high by the printer if the printer is too busy to handle input data bits on the "PRTDATA" pin of the receiver 119. The "PRTDATA" pin is the data output from the receiver 119 to the printer. Serial data bits are fed to the printer to drive the printer to generate text corresponding to the data bits. The "DIS AUDIO" pin provides external audio which may be the X.25 modified protocol of FIG. 6 encoded into audio tones which modulate the channel carrier on which information is received by the receiver 119. When the "DIS AUDIO" pin is high, it indicates that the display button is pressed. The memory of the receiver 119 stores the text to be printed by the printer. The text is downloaded through the aforementioned interconnection upon connection to the printer to generate a hard copy of the text stored in the memory.

DISCLOSURE OF INVENTION

The present invention provides an integration of an electronic mail system with an RF information transmission network for transmitting electronic mail originating at processors either within or outside an electronic mail system by RF communication to at least one destination processor within an electronic mail system by a RF receiver which transfer the information to the destination processor and method of use thereof. The RF receiver stores the received information which is to be transferred to the destination processor. Storage in the RF receiver memory permits the reception of the information without a connection of the RF receiver to the destination processor thus eliminating the requirement that the destination processor is turned on and carried with the user of the destination processor. In a typical application with a portable PC functioning as the destination processor, it is important that reception of the information by the RF receiver does not require the drawing of powfr from the PC battery. The RF receiver automatically transfers the information to the destination processor upon connection of the RF receiver to the destination processor. The destination processor may be within the same electronic mail system containing the originating processor which originated the information or another electronic mail system. While a preferred application of the invention is with portable destination processors, it should be understood that the originating and destination processors may be at a fixed site or portable. The use of the RF receiver to receive electronic mail permits fixed site destination processors to receive electronic mail without calling the electronic mail system as in the prior art by using the storage of the RF receiver which may be carried on the user of the destination processor either within an office or other site or for travel. The RF receiver provides the automatic storage of electronic mail and review of its content without interaction with the destination processor. The stored messages may be transferred at a later time automatically without manually keying the message which is an important consideration in using portable PC's. The problems of the prior art in delivering electronic mail to destination processors within an electronic mail system which are being exacerbated by the increasing portability of personal computers and the absence of a current system for delivering electronic mail between electronic mail systems are overcome by the present invention.

The present invention transmits electronic mail from an originating processor to at least one destination processor through an interface switch. The interface switch connects an electronic mail system and/or at least one additional processor to an RF data transmission network which transmits the information to a RF receiver which is connectable to the destination processor to transfer the received RF message from the RF receiver to the destination processor.

The invention is user friendly in that the minimum amount of information which must be provided to initiate the transmission of electronic mail from an originating processor to at least one destination processor is an identification of the destination processor and information indicating that the message is to be sent by the RF information transmission network. The inputting of information that the information is to be sent by the RF information transmission network may be simplified to the extent that an icon driven display associated with the originating processor, such as a mouse, may be used to point to an icon of a radio receiver. Alternatively, an identification of the address of the interface switch through which the information is transmitted to the RF transmission network may be inputted by the operator or a machine operating the originating processor. Finally the entering of the destination processor identified in terms such as the user's name may be entered which is compared with a look up table to determine if a match exists. If a match exists, the matched identification of the destination processor supplies an address of the interface switch and an identification of an RF receiver to receive the information and transfer the information to the destination processor. The inputting of the destination processor in terms such as the user's name to an originating processor may be used by the destination processor, gateway switch or addressed interface switch to look up an identification number of the RF receiver within the RF information transmission network which is connectable to the destination processor which is added to the information for use by the RF information transmission network. The electronic mail system or the interface switch may append the identification number of the RF receiver to receive the information which is utilized by the RF information transmission network to determine the final destination of the RF receiver to which the message is broadcast by the RF information transmission network. The appending of the identification number of the RF receiver to the information to be broadcast to the destination processor may be inputted by an operator of the originating processor, added to the information by a comparison of the identification of the destination processor to stored identifications of destination processors stored by the originating processor to which RF messages are to be broadcast by the RF information transmission network to identify the identification number of the RF receiver in the RF information transmission network, or by a gateway switch in the electronic mail system or the interface switch between the electronic mail system and the RF information transmission network.

The intelligence for determining the identification number of the RF receiver to receive the information is less expensive and operates most efficiently when placed within the interface switch where the aforementioned matching may be produced without requiring modification of either individual originating processors within the electronic mail system or gateway switches within the electronic mail system which have additional functions for supporting other conventional aspects of electronic mail. However, the determination of an identification number of the RF receiver which transfers the information to the destination processor may be located anywhere between the originating processor and the RF information transmission network for practicing the present invention. Similarly, the appending of the address of the interface switch to which the information is transmitted by the electronic mail system for entry into the RF information transmission network for broadcast to the RF receiver for transfer to the destination processor may be located within any one of the originating processor, gateway switch or interface switch.

An electronic mail system for transmitting information from one of a plurality of originating processors to at least one of a plurality of destination processors in accordance with the invention includes at least one gateway switch, a gateway switch storing information received from one of the at least one originating processor prior to transmission of the information to the at least one destination processor; an RF information transmission network for transmitting stored information received from one of the at least one gateway switch by RF transmission to at least one destination processor; at least one interface switch, an interface switch connecting a gateway switch to the RF information transmission network and transmitting stored information received from one of the at least one gateway switch to the RF information transmission network; and wherein the information is transmitted to a receiving interface switch by the electronic mail system in response to an address of the receiving interface switch which has been added to the information originated by the originating processor by either the originating processor or gateway switch and the information is transmitted from the receiving interface switch to the RF information transmission network with an address of the destination processor to receive the information which has been added by either the originating processor, a gateway switch or the receiving interface switch. The destination processors may be transported during operation by a user. The receiving interface switch removes information added by the electronic mail system to the information originated by the originating processor from the stored information received from one of the at least one gateway switch and adds information used by the RF information transmission network during transmission of the information to the information originated by the originating processor to an RF receiver in the RF information transmission network which receives the information and transfers the information originated by the originating processor to the destination processor. The RF receiver may be detached from the destination processor during reception of the information with a memory of the RF receiver storing the information. Storage in memory permits review of the information prior to transferring the information to the destination processor by connection the RF receiver to the destination processor. The address of the destination processor is preferably an identification of a RF receiver in the RF information transmission network which receives the information and transfers it to the destination processor.

The receiving interface switch stores information which has been stored by at least one gateway switch that is received from a plurality of originating processors, assembles the information from a plurality of originating processors into a packet and transmits the packet to the RF information transmission network. The RF information transmission network comprises a switch which receives the packet from the receiving interface switch and disassembles the packet into information from the plurality of originating processors. The RF information transmission network transmits the disassembled information, including the identification number of the RF receiver, to a switch in the RF information transmission network storing a file identified by the identification number and any destination of the RF receiver in the RF information transmission network to which the information and identification number is to be transmitted by the RF information transmission network. The switch adds any destination of the RF receiver to the information and the RF information transmission network in response to any added destination transmits the information and identification number to the destination for RF broadcast to the RF receiver for relaying to the destination processor.

The electronic mail system also transmits information between an originating processor and at least one destination processor through either a public switch or a private switch telephone network without transmission by the RF information transmission network. The destination processor is addressed by a different address during transmission to the destination processor when using the public or private switch telephone network than during transmission by the RF information transmission network.

The RF receiver is connectable to the destination processor and in response to connection of the RF receiver to the destination processor the RF receiver transfers information stored in a memory of the RF receiver received from the originating processor to the destination processor. The number of originating processors is greater than a number of interface switches. The plurality of originating processors also function as destination processors with a RF receiver coupled thereto.

The address of the receiving interface switch may be added to the information originated by the originating processor by a gateway switch. The address of the receiving interface switch may be added by the gateway switch by matching an identification of the destination processor such as a name of a user of the destination processor with a stored identification of a destination processor and adding an address of an interface switch stored with the matched identification of the destination processor to the information as the address of the receiving interface switch.

The address of the receiving interface switch may also be added by the originating processor. The address of the receiving interface switch may be added by an inputting of the address of the receiving interface switch along with an identification of the destination processor by an operator or a machine using the originating processor or by matching an identification of the destination processor, such as the name of the user, with a stored identification of a destination processor and adding an address of an interface switch stored with the matched identification of the destination processor to the information as the address of the receiving interface switch.

The address of the destination processor, which preferably is an identification number of a RF receiver receiving the information and transferring the information to the destination processor, may be added to the information originated by the originating processor by an operator or a machine using the originating processor. The identification number may also be added to the information originated by the originating processor by matching an identification of the destination processor, such as a user of the destination processor, with a stored identification of a destination processor and adding an identification number stored with the matched identification of the destination processor to the information as the identification number.

The address of the destination processor may also be added to the information originated by the originating processor by the gateway switch. The identification number may be added by the gateway switch by matching an identification of the destination processor, such as a name of a user of the destination processor, with a stored identification of a destination processor and adding an identification number stored with the matched identification of the destination processor to the information as the identification number.

The address of the destination processor may also be added to the information originated by the originating processor by the receiving interface switch. The identification number may be added by the receiving interface switch to the information originated by the originating processor by matching an identification of the destination processor, such as a name of a user of a destination processor, with a stored identification of the destination processor and adding an identification number stored with the matched identification of the destination processor to the information as the identification number.

BRIEF DESCRIPTION OF DRAWINGS

FIG. 5 illustrates a memory map of a hub switch of the prior art paging system of FIG. 2.

FIG. 6 illustrates a message format utilized by the prior art paging system of FIG. 2.

BEST MODE FOR CARRYING OUT THE INVENTION

Figure 1:
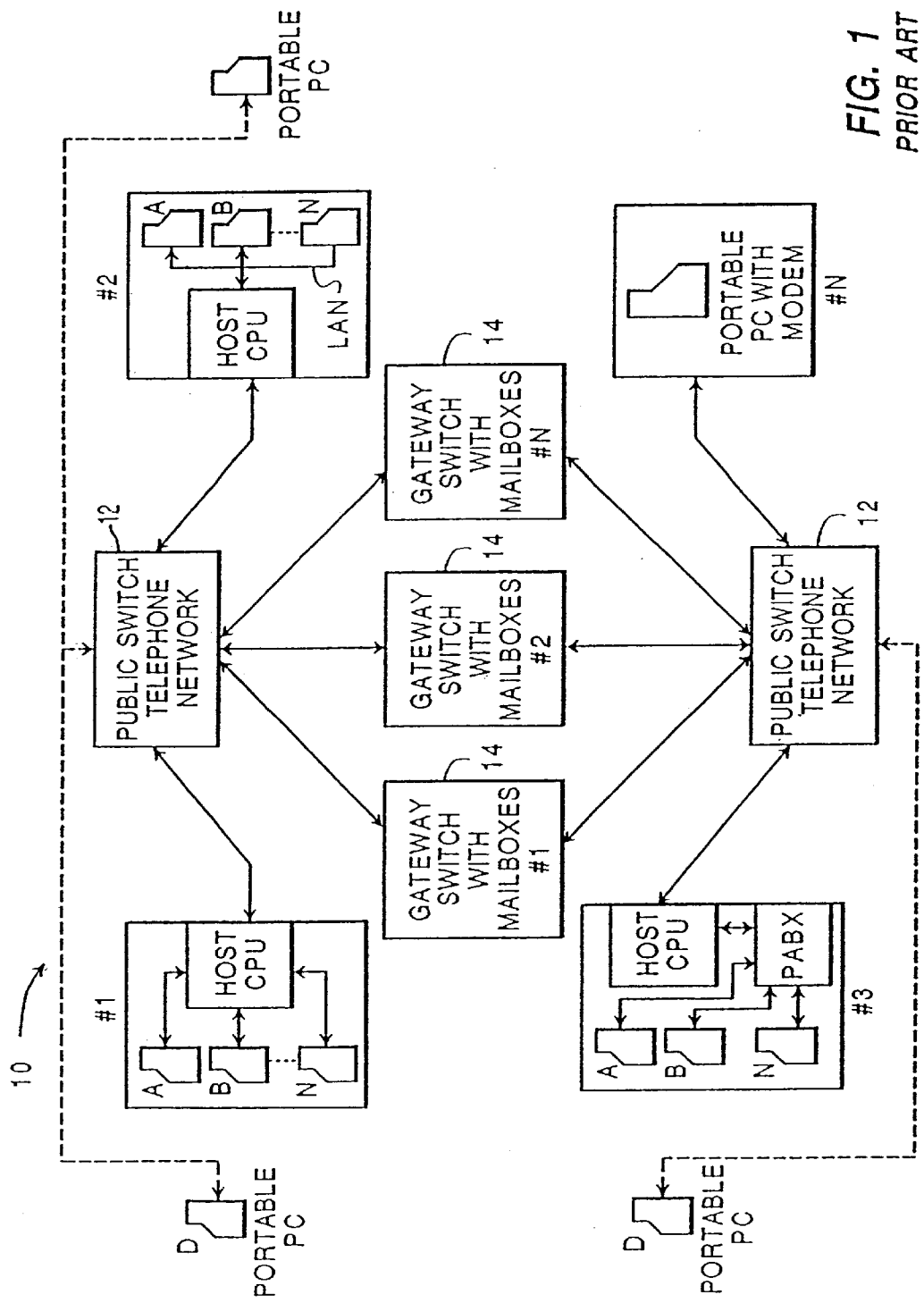
FIG. 1 illustrates a prior art electronic mail system.
Figure 2:
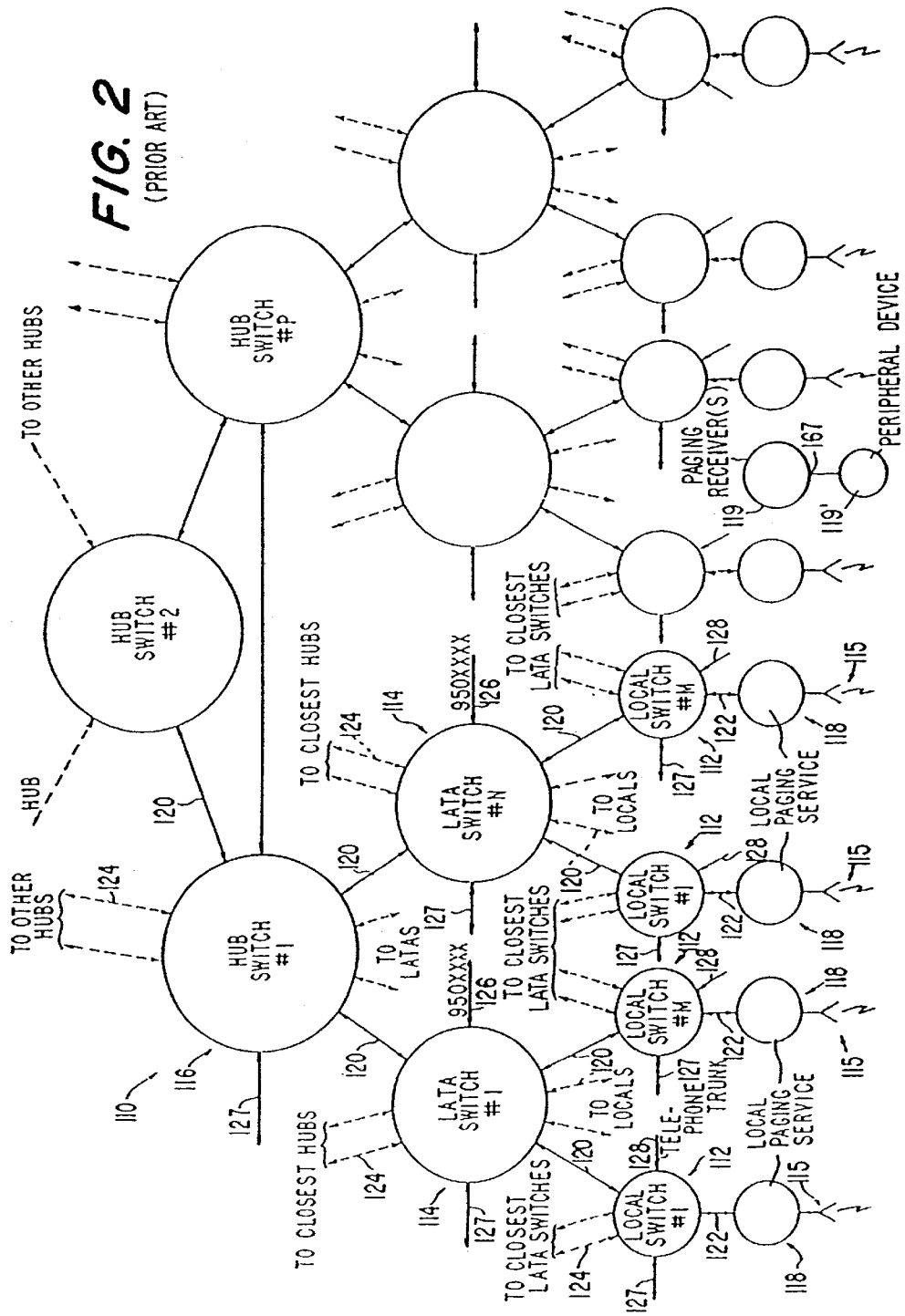
FIG. 2 illustrates a prior art paging system used by the present invention.
Figure 3:
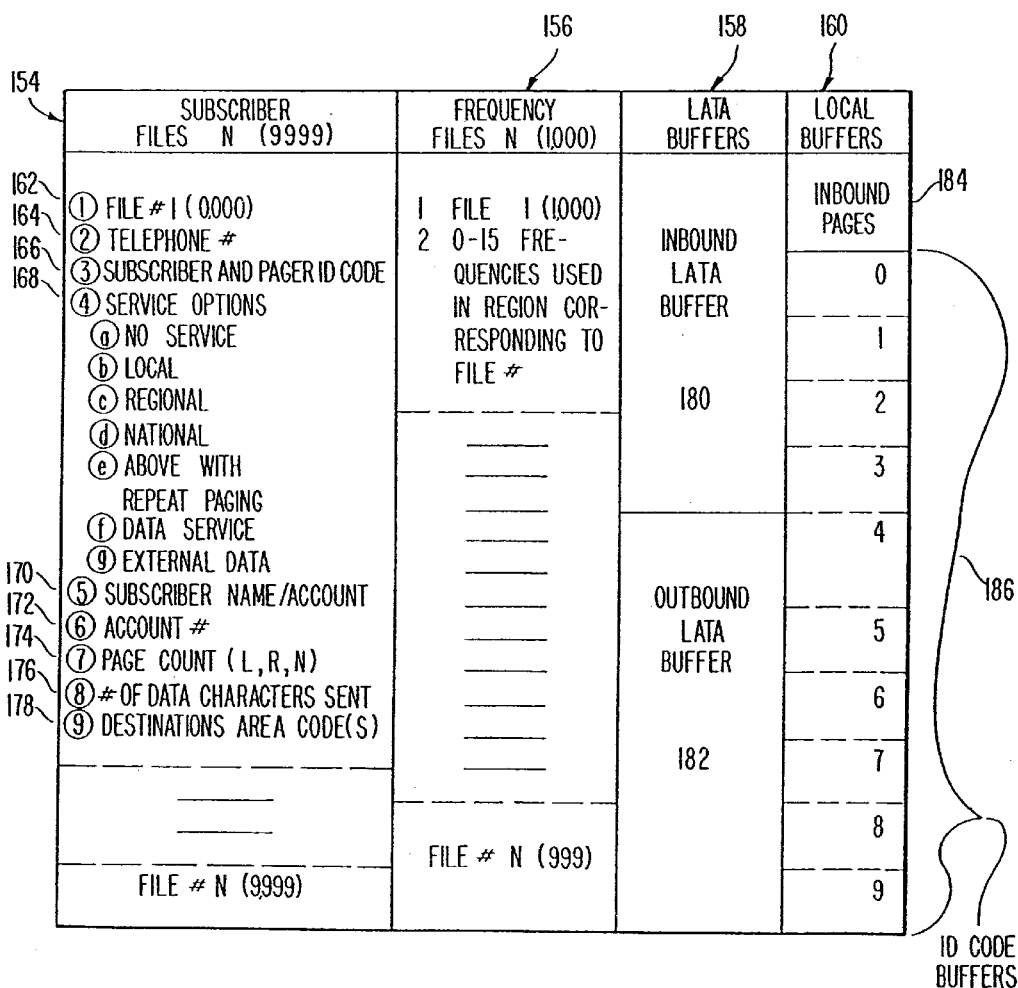
FIG. 3 illustrates a memory map of the local switch of the prior art paging system of FIG. 2.
Figure 4:
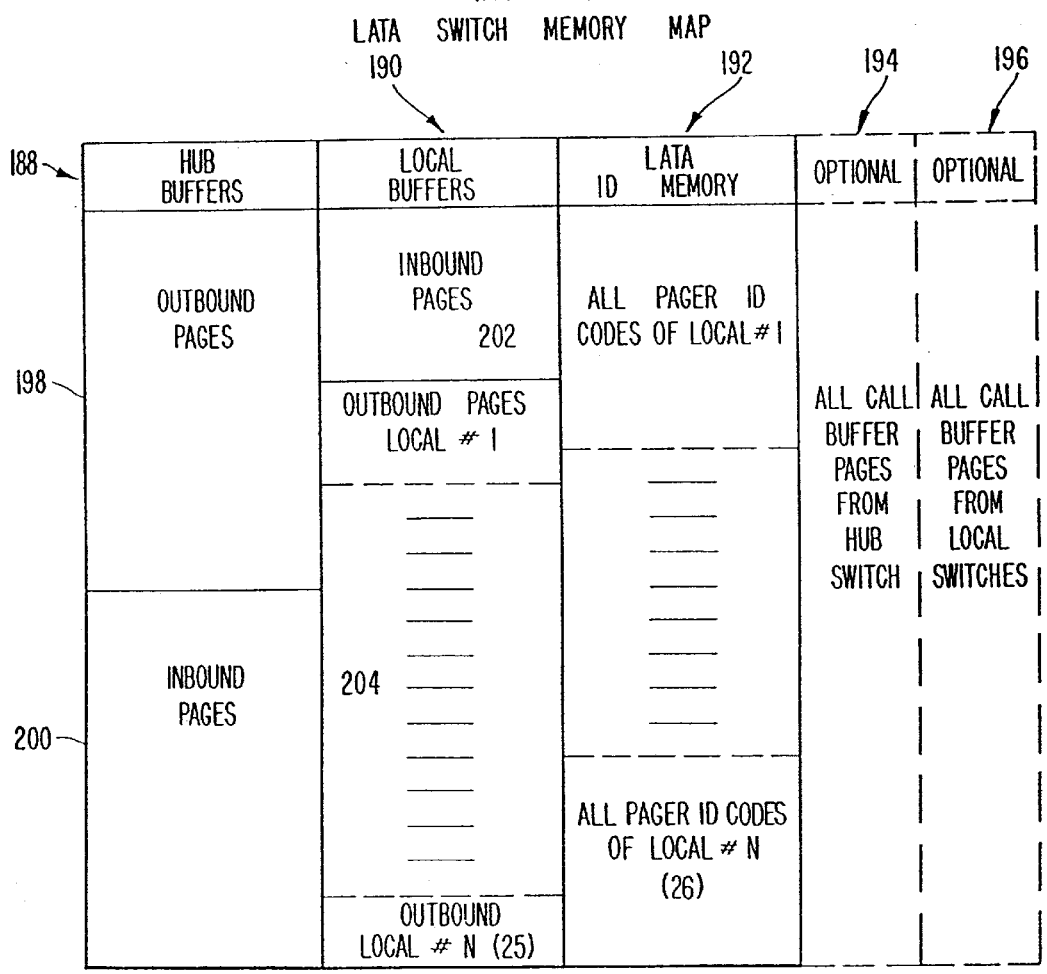
FIG. 4 illustrates a memory map of a lata switch of the prior art paging system of FIG. 2.
Figure 7:
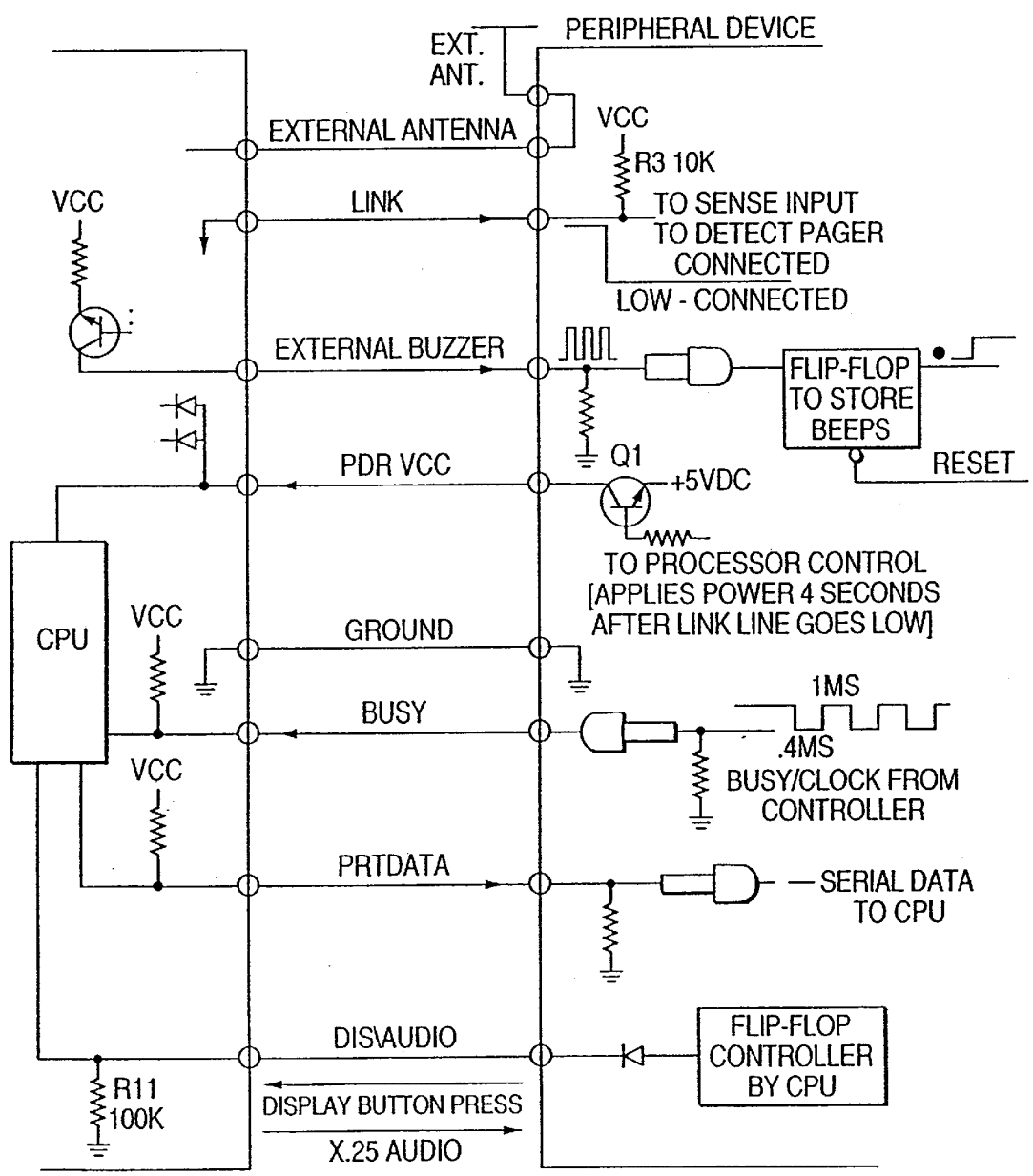
FIG. 7 illustrates a prior art connection between a receiver in the paging system of FIG. 2 and a printer.
Figure 8:
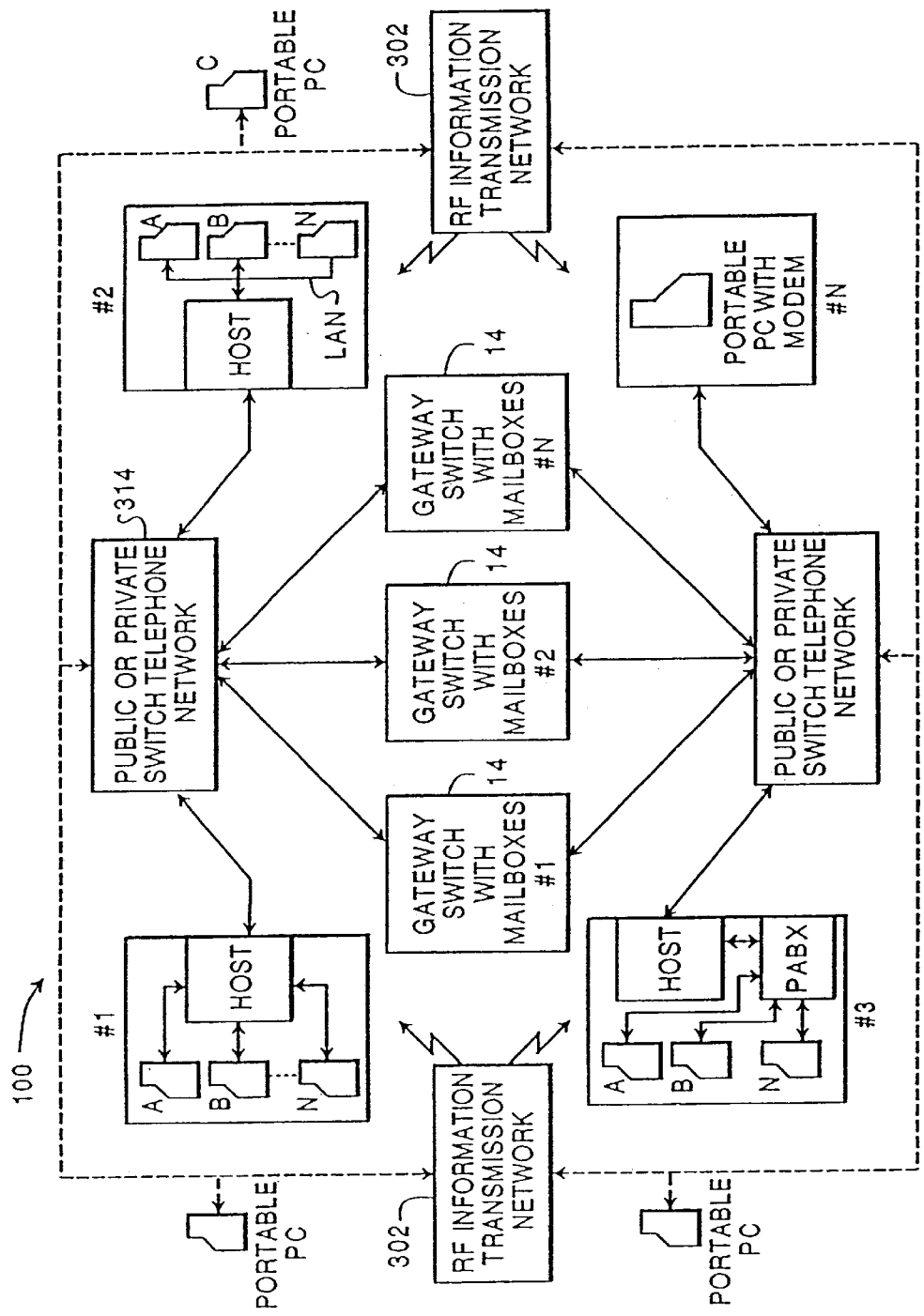
FIG. 8 illustrates a block diagram of a system in accordance with the present invention.
Figure 9:
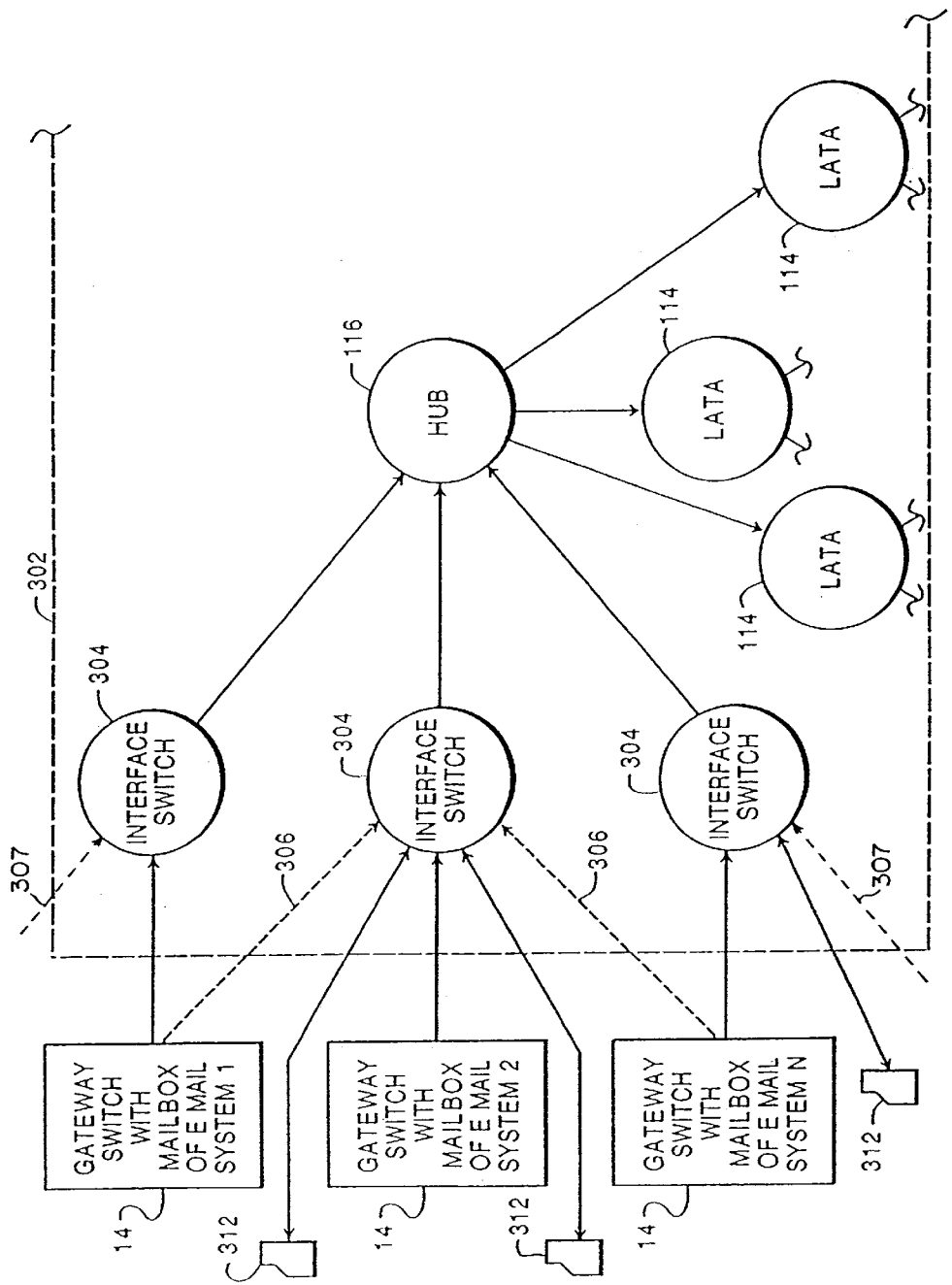
FIG. 9 illustrates a block diagram of the connection of a plurality of electronic mail systems through a plurality of interface switches to an input port of an RF information transmission network utilized by the present invention.
Figure 10:
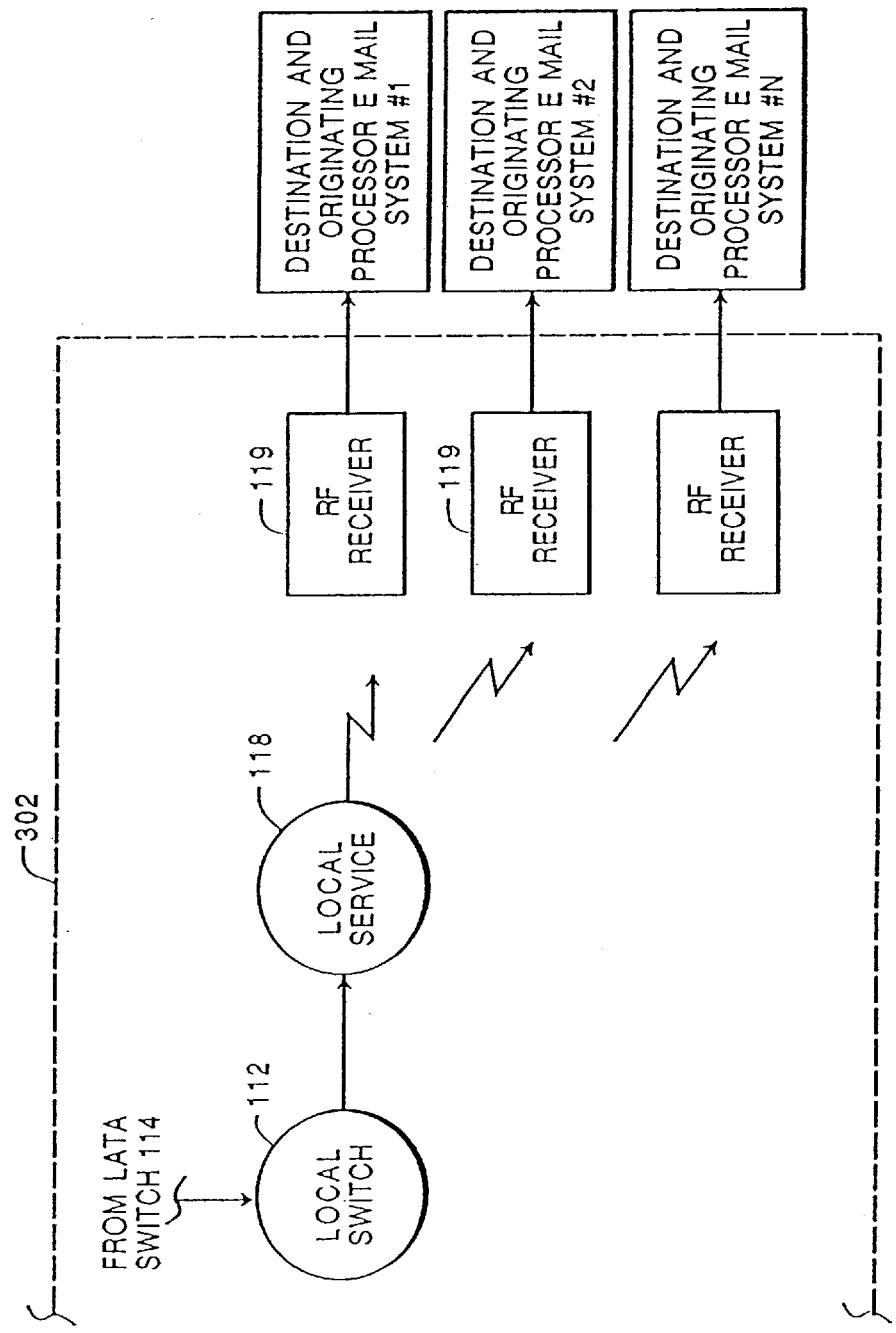
FIG. 10 illustrates a block diagram of the transmission of information originating from a plurality of electronic mail systems to an RF information transmission network to a plurality of destination processors and originating processors within a plurality of electronic mail systems in accordance with the present invention.

FIGS. 8–10 illustrate a block diagram of an electronic mail system 100 which has been integrated with an RF information transmission network 302 for transmitting information from an originating processor within the electronic mail system to a destination processor within the electronic mail system utilizing RF communications in accordance with the present invention. Like reference numerals identify like parts in FIGS. 1–10 and 12. The integrated system 100 differs from the prior art of FIGS. 1–7 in that the originating processor, which may be any of the processors within computing systems #1-#N is provided the option of transmitting electronic mail (information) to at least one destination processor which may be any processor A-N within the processing systems #1-#N by means of an RF information transmission network 302 as described below. It should be understood that the present invention is not limited to the block diagram form of FIGS. 8–10 and 12. Additionally, the communications between the originating processors, gateway switches 14 a destination processors may be through either a public or private switch telephone network 314 and are not limited to any type of telephone system interconnection. The RF information transmission network 302 functions to transmit the information which originated from one of the originating processors A-N within any of the computing systems #1-#N to the destination processor A-N within any of the computing systems #1-1πN by an RF transmission to an RF receiver 119. The RF receiver 119 is connected to the destination processor with the same connections as illustrated in the prior art of FIG. 7. When the RF receiver is connected to the SAFARI™ computer, the connection is powered by the SAFARI computer. Upon connection, the receiver 119 relays the information from the RF receiver to the destination processor. An important aspect of the present invention is that reception and review of electronic mail can be performed without connection of the RF receiver 119 to the destination processer A-N which permits the receiver to function as a mobile electronic mail receiver. As a result, the user may move from the site of the destination processor A-N either within an office or other location or during travel while receiving electronic mail which was not possible with the prior art. Furthermore, the connection of the RF receiver 119 to the destination processor automatically transfers the electronic mail stored within the memory of the RF receiver to the destination processor without manual keyboarding. A computer program for controlling the transfer of information from the receiver 119 to a SAFARI™ laptop computer of AT&T Corporation is contained within the attached Appendix at pages 1–9. This program automatically provides transfer of the stored electronic mail stored within the memory of the RF receiver 119 into the destination processor A-N where it is accessible to application programs within the destination processor. As a result, the deficiencies of the prior art in requiring substantial expense consequent from the making of telephone calls, substantial labor resultant from the lost time of persons making telephone calls and the inability to deliver electronic mail messages and the more difficult problem of delivering electronic mail messages to portable processors is overcome. Moreover, as is explained in detail below in conjunction with FIG. 11, the initiation of an information transmission from an originating processor A-N to a destination processor A-N using an RF transmission by the RF information transmission network 302 to an individual RF receiver has many different options which are user friendly. The initiation of the transmission of information from an originating processor A-N to a destination processor A-N using RF transmission by the RF information transmission network 302 only requires the identification of an address of the RF receiver, which preferably is the identification number of the receiver 119 in the RF information transmission network and the designation of an address of an interface switch in the form of an address such a "TF MOBOX" which connects the electronic mail system to the RF information transmission network as described below in conjunction with FIGS. 9 and 10. The initiator of an electronic mail message, in the most user friendly form of the invention, is only required to input into the originating processor A-N an identification of the destination processor A-N which typically is in the form of a name such as "John Doe". The distributed intelligence of the system implementing the present invention, which may be located in any one of the originating processor A-N, gateway switch 14 or interface switch 304 or distributed therebetween as described below with reference to FIG. 11, may be used to add the necessary address of the interface switch connecting the electronic mail system 1-N to the RF information transmission network 302 and the identification of the RF receiver 119 in the RF information transmission network from the inputting of only an identification of the destination processor A-N. The addition of the identification number of the RF receiver 119 and the address of the interface switch may be implemented by the originating processor A-N of one of the computing systems #1-#N, a gateway switch 14 or an interface switch 304 as described below with reference to FIG. 9.

FIG. 9 illustrates a block diagram of the connection between a plurality of gateway switches with mailboxes 14 in different electronic mail systems to the RF information transmission network 302. It should be understood that multiple gateway switches with mailboxes 14 from a single electronic mail system 1-N may be connected to each interface switch 304 instead of the connection of a single gateway switch with mailbox to a single interface switch as illustrated. A plurality of interface switches 304 connect information transmitted from at least one electronic mail system as illustrated in FIG. 8. Optionally, a plurality of electronic mail systems 1-N each as illustrated in FIG. 8 are connected to a data input port of the RF information transmission system which is preferably hub switch 116 of the prior art paging network described above with reference to FIGS. 2–6. The dotted line communication paths 306 illustrate optional information transmissions in which information from a plurality of different electronic mail systems is concentrated at a single interface switch 304. The dotted line, communication paths 307 illustrate connections to additional gateway switches with mailboxes 14 within electronic mail systems 1-N.

The function of the interface switches 304 is twofold. In the first place, the interface switches 304 function as a security check to detemine that information transmissions originating from a gateway switch with mailbox 14 represent transmissions which should be coupled to a hub switch 116 of the RF information transmission network 302. The security check is performed by the interface switch 304 comparing the identification number of the RF receiver 119 which has been added by either an originating processor A-N or a gateway switch with mailboxes 14 with permissible identification numbers or the interface switch performing the addition of the identification number. The interface switch 304 also removes information added by the electronic mail system 1-N to the information originated by the originating processor A-N from the stored information received from one of the gateway switches 14 and adds information used by the RF information transmission network 302 during transmission of the information originated at the originating processor to a RF receiver 119 in the RF information transmission network 302 which receives the information and transfers it to the destination processor A-N. Additionally, the interface switch 304 encodes data, which is required to format the display of the CRT of the destination processor for the electronic mail system to which the destination processor is connected, in the form of a character or characters which are decoded by either the RF receiver 119 or the destination processor A-N and added in decoded form back to the information which is processed by the destination processor with a format of the electronic mail system to which the destination processor A-N is connected.

The interface switches 304 function to store information which has been stored by at least one gateway switch 114 that is received from a plurality of originating processors, assemble the information from a plurality of originating processors into a packet preferably having the format of that described above with reference to the prior art in FIG. 6 and transmit the packet to the hub switch 116 within the RF information transmission network 302. While the invention is not limited to the transmission of the packets from the interface switch 304 to the hub switch 116 of the RF information transmission system 302, the hub switch is the preferable node in the RF information transmission network to which communications from the gateway switches 14 should be transmitted as a consequence of it having jurisdiction over both lata switches 114 and the local switches 112 in the RF information transmission network which results in lesser network overhead.

The hub switch 116 receives the packet from the receiving interface switch 304 and disassembles the packet into information from the plurality of originating processors either within a single electronic mail system such as system 1 or from a plurality of electronic mail systems, such as systems 1-N, or from outside of any electronic mail system from at least one additional processor 312 which is connected directly to interface switch 304 to originate information to be transmitted to a destination processor A-N in an electronic mail system as described below. The RF information transmission network 302 transmits the disassembled information from the hub switch 116 including the identification number of the RF receiver 119 transferring information to the destination processor A-N to a local switch 112 storing the file 154 identified by the identification number and any destination 178 of the RF receiver in the RF information transmission network to which the information and identification number is to be transmitted by the RF information transmission network and adds any destination of the RF receiver to the information in accordance with the prior art system described above with reference to FIGS. 2–6. The RF information transmission network in response to any added destination transmits the information and identification number to the destination in accordance with the prior art system described above with reference to FIGS. 2–6 for RF broadcast to the RF receiver 119 for transfer to the destination processor A-N.

The information is transmitted to a receiving interface switch 304 from one or more gateway switches 14 by one or more electronic mail systems 1-N in response to an address of the receiving interface switch which has been added to the information originated by the originating processor by either the originating processor or gateway switch. The information is transmitted from the receiving interface switch 304 to the RF information transmission network with an address of the destination processor, such as a name of a user of the destination processor A-N, to receive the information which has been added by either the originating processor A-N, a gateway switch 14 or the receiving interface switch 304.

Various options exist for the adding of the address of the receiving interface switch and the address of the destination processor. Preferably, the address of the receiving interface switch is a code word, such as "TF-MOBOX", which is recognized throughout the electronic mail system when appended to information as directing the information to be transmitted to the interface switch 304. The address of the destination processor is preferably the identification number of the RF receiver 119 within the RF information transmission network 302. The address of the receiving interface switch may be added to the information originated by the originating processor, by a gateway switch 14 or by the originating processor A-N. The address of the receiving interface switch 304 may be added to the information by matching an identification of the destination processor A-N which may be the name of the individual utilizing the processor or some other information and adds an address of an interface switch such as the aforementioned "TF-MOBOX" stored with the matched identification of the destination processor to the information as the address of the receiving interface switch. Alternatively, the originating processor may be used to add the address of the receiving interface switch 14 by an inputting of the address of the receiving interface switch (TF-MOBOX) along with an identification of the destination processor A-N (name of recipient using the processor). The originating processor A-N may also add the address of the receiving interface switch 304 by matching an identification of the destination processor (name of the user of the processor) with a stored identification of a destination processor and adding an address of the interface switch (TF-MOBOX) stored with the matched identification of the destination processor to the information as the address of the receiving interface switch. The identification number may be added to the information originated by the originating processor or, alternatively, may be added by the originating processor by matching an identification of the destination processor (the name of the user of the processor) with a stored identification of a destination processor (the authorized user of the destination processor) and adding an identification number stored with the matched identification of the destination processor to the information as the identification number of the RF receiver 119. Alternatively, the aforementioned matching process may be performed by either the gateway switch 14 or the interface switch 304.

The at least one additional processor 312 originates information from outside of any electronic mail system. The processors 312 provide an address of at least one destination processor in an electronic mail system, such as the name of the user, to receive information transmitted by the RF information transmission system 302 or an identification number of the RF receiver 119 receiving information and transferring the information to the destination processor. The interface switch 304 which receives the information from each processor 312 adds information used by the RF information transmission network 302 during transmission of the information to the RF receiver 119 receiving the information in the same manner as described above with respect to the interface switch 304.

The advantage of connecting the processors 312 directly to the interface switch 304 is that the processors 312 are only required to have a telephone modem and support programming to format information for RF transmission to a destination processor A-N within any one of one or more electronic mail systems 1-N. The processors 312 are not required to have the necessary electronic mail system software present in originating processors A-N or interconnections with an electronic mail system. As a result of the connection to the interface switch 304, information originating from the additional processors 312 may be transmitted by RF transmission to a destination processor A-N within any one or a plurality of electronic mail systems with the user of the processor 312 or the processor 312 or the interface switch 304 only having to supply an identification number of the receiver 119 to input information into the RF information transmission system 302 for RF transmission to a destination processor.

The difference between originating information by one of the additional processors 312 outside of any electronic mail system and originating information by one of the processors within one of the electronic mail systems is that the direct connection of the additional processor to the interface switch 304 eliminates the requirement for the adding of an address of the interface switch 304 which is required by the electronic mail systems to forward the information to the interface switch where necessary formatting of the information to be compatible with the RF information transmission system is performed. The interface switch 304 packetizes information originating from the additional processors 312 in the same manner as described above with respect to information originating from within an electronic mail system. Information from within an electronic mail system and originating from additional processors 312 outside of the electronic mail system may be formatted into the same packets which are forwarded to the hub switch 116. Additionally, an interface switch 304 may be connected only to the additional processors 312 to provide an interface only for processors outside of any electronic mail system to destination processors A-N within one or more electronic mail systems 1-N. The only information which is necessary to be inputted by the additional processors 312 is the address of the destination processor (user of the processor). The addition of the identification number of the receiver 119 may be added by matching of an identification of the destination processor with stored destination processors within the additional processor 312 or the interface switch 304 with an identification number of the receiver 119 stored with an identification of a destination processor A-N used as an identification of the destination processor upon a match having been made.

Figure 11:
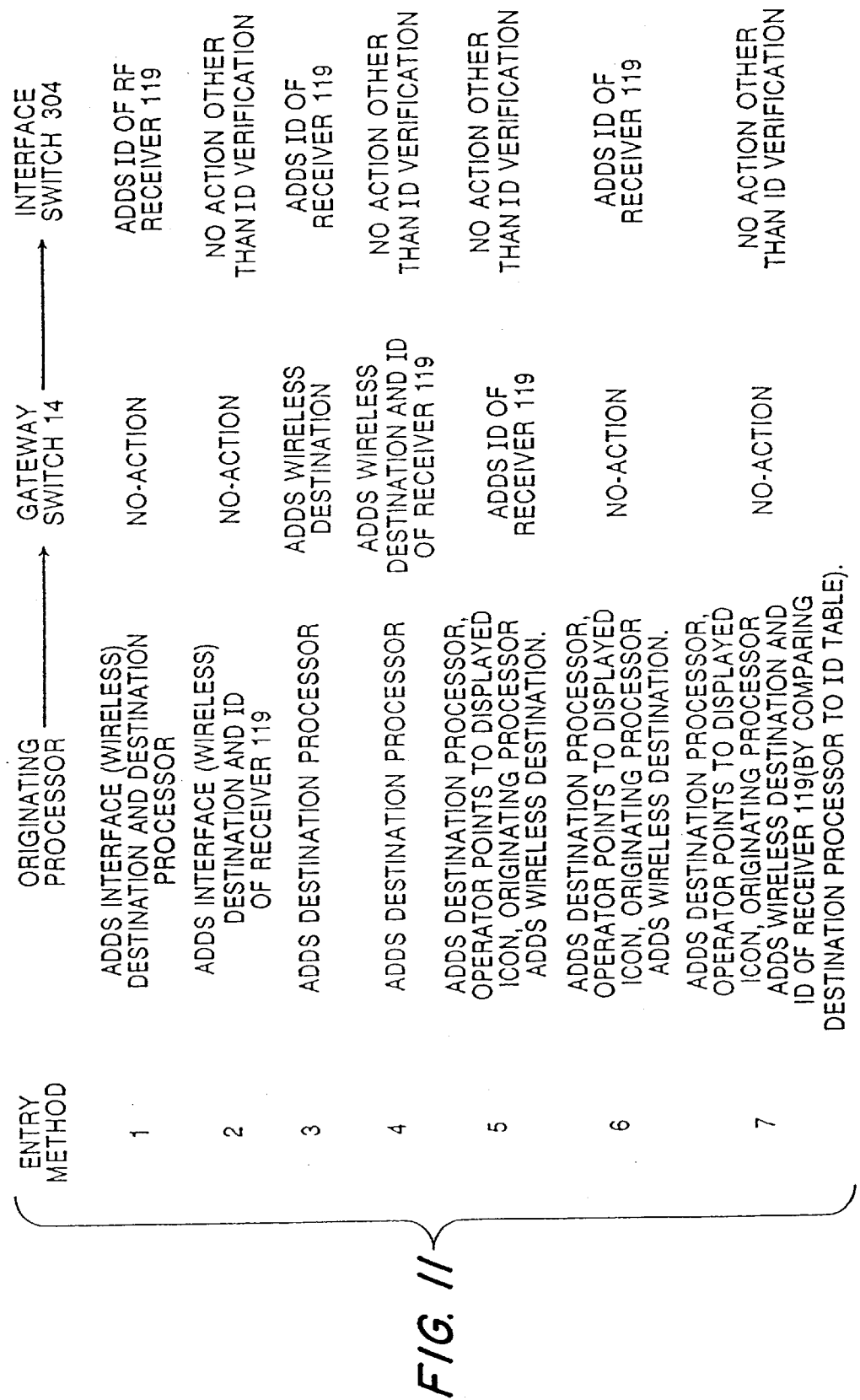
FIG. 11 illustrates possible distributed functions for performing data processing steps necessary to transmit information from an originating processor to a destination processor using RF transmission in accordance with the present invention.

FIG. 11 summarizes electronic mail message entry methods for messages (information) originating from originating processors within an electronic mail system. The first entry method adds the address of the interface switch 304 and the destination processor preferably in the form of a user's name; the gateway switch 14 takes no action; and the interface switch 304 adds the identification number of the RF receiver 119. The second entry method adds the address of the interface switch 304 and the identification number of the receiver 119; the gateway switch 14 takes no action; and the interface switch 304 performs only the function of verifying that the identification number which was added by the originating processor is a valid identification number within the RF information transmission network 302. In the third method, the originating processor adds the destination processor preferably in the form of the user's name; the gateway switch adds the destination of the interface switch 304; and the interface switch 304 adds the identification of the receiver 119. In the fourth method, the originating processor adds the destination processor preferably in the form of the user's name only; the gateway switch 14 adds an address of the interface switch 304 and the identification number of the receiver 119; and the interface switch takes no action other than verification that the identification number of the receiver 119 added by the gateway switch 14 is valid. In the fifth method, the operator of the originating processor adds the destination processor, points to an icon displayed on a CRT associated with the originating processor and the originating processor adds the address of the interface switch 304; the gateway switch 14 adds the identification number of the receiver 119 and the interface switch 304 takes no action other than verification. In the sixth method, the operator of the originating processor adds the destination processor, the user of the originating processor points to an icon displayed by a CRT associated with the originating processor which causes the addition of the address of the interface switch 304; the gateway switch takes no action and the interface switch 304 adds the identification of the receiver 119. In the seventh method, the operator of the originating processor adds the destination processor, the user points to an icon displayed on a CRT associated with the originating processor causing the addition of the address of the interface switch 304 and the receiver identification number by comparing an identification of the destination processor, such as user name of the destination processor, to an identification of destination processors with identification numbers or RF receivers 119 which transfer information to the destination processor; the gateway switch 14 takes no action; and the interface switch 304 takes no action.

Figure 12:
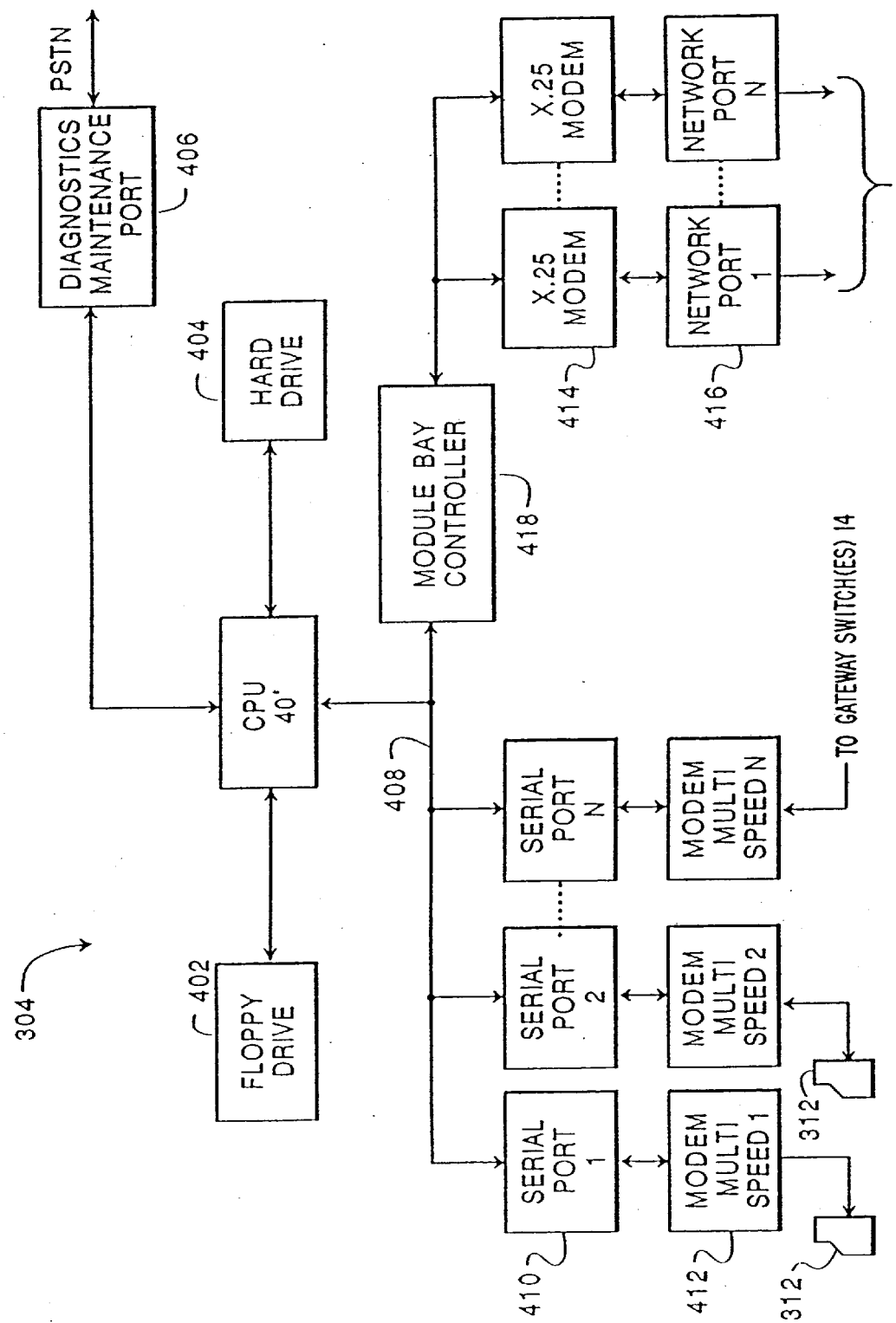
FIG. 12 is a block diagram of an interface switch in accordance with the present invention.

FIG. 12 illustrates a block diagram of an interface switch 304 in accordance with the present invention. The interface switch 304 has a main CPU 400 to which is connected a floppy drive 402 and a hard drive 404 for providing memory storage for use by the CPU in executing the various functions of the interface switch as described above. The program on pages 10–12 of the Appendix implements the function of the interfaced switch 304 in a 3B2 computer which interfaces with the Telefind Corporation data transmission network described in the above-referenced patents and the AT&T Corporation electronic mail system. A diagnostic and maintenance port 406 is connected to the CPU in accordance with standard practice. A main bus 408 is coupled to a plurality of serial ports 410 which are connected in series with a multispeed modem 412 which is connected to one of the additional processors 312 as discussed above with reference to FIG. 9, to at least one gateway switch with mailboxes 14 in at least one electronic mail system and to a plurality of network ports which are connected to a plurality of X.25 modems 414 which are connected in series with a network port 416 which is connected to hub switch 116 of FIG. 9. A module bay controller 418 controls the bus 408 in accordance with standard practice. Alternatively, if the interface switch is not connected to a gateway switch with mailboxes 14, the interface switch functions only as a general purpose collector switch for the additional processors 312.

While the invention has been described in terms of its preferred embodiments, it should be understood that numerous modifications may be made thereto without departing from the spirit and scope as defined in the appended claims. For example, while the invention has been described in terms of utilizing a preferred RF information transmission network, it should be understood that the invention is equally applicable to other forms of RF transmission systems for broadcasting information originating from an originating processor within an electronic mail system or from an additional processor outside of any electronic mail system to a destination processor connected to an electronic mail system. It is intended that all such modifications fall within the scope of the appended claims.

APPENDIX

An Appendix containing a listing of control programs for controlling the transmission of information between an RF receiver and a destination processor and controlling the operation of an interface switch in accordance with the invention is attached. The programs are written in the C programming language. The program for controlling the transmission of information from the RF receiver to the destination processor appears at pages 1–9 and the program for controlling the operation of the interface switch appears at pages 10–12. The Appendix contains subject matter which is copyrighted. A limited license is granted to anyone who requires a copy of the program disclosed therein for purposes of understanding or analyzing the invention, but no license is granted to make a copy for any other purposes including the loading of a processing device with code in any form or language.

What is claimed is:

1. In a communication system comprising a wireless system which communication system transmits electronic mail inputted to the communication system from an originating device, mobile processors which execute electronic mail programming to function as a destination of electronic mail, and a destination processor to which the electronic mail is transmitted from the originating device and after reception of the electronic mail by the destination processor, information contained in the electronic mail and an identification of a wireless device in the wireless system are transmitted by the wireless system to the wireless device and from the wireless device to one of the mobile processors connected thereto, the originating device comprising:

a programmed processor which executes electronic mail programming to originate the electronic mail, the electronic mail containing an address of the destination processor and the information contained in the electronic mail to be transmitted to the destination processor.

2. An originating device in accordance with claim 1 wherein:

the electronic mail originated by the programmed processor also contains an identification of the wireless device and a recipient of the electronic mail to receive the information at the one mobile processor.

3. An originating device in accordance with claim 2 wherein:

the identification of the wireless device is a number.

4. An originating device in accordance with claim 1 wherein:

the programmed processor is mobile, executes electronic mail programming to originate electronic mail which is wirelessly transmitted from the programmed processor and by the communication system; and the one mobile processor executes electronic mail programming to originate electronic mail which is wirelessly transmitted from the one mobile processor and by the communication system.

5. An originating device in accordance with claim 2 wherein:

the programmed processor is mobile, executes electronic mail programming to originate electronic mail which is wirelessly transmitted from the programmed processor and by the communication system; and the one mobile processor executes electronic mail programming to originate electronic mail which is wirelessly transmitted from the one mobile processor and by the communication system.

6. An originating device in accordance with claim 3 wherein:

the programmed processor is mobile, executes electronic mail programming to originate electronic mail which is wirelessly transmitted from the programmed processor and by the communication system; and the one mobile processor executes electronic mail programming to originate electronic mail which is wirelessly transmitted from the one mobile processor and by the communication system.

7. An originating device in accordance with claim 1 wherein:
the one mobile processor executes at least one application program which processes the information contained in the electronic mail.

8. An originating device in accordance with claim 2 wherein:
the one mobile processor executes at least one application program which processes the information contained in the electronic mail.

9. An originating device in accordance with claim 3 wherein:
the one mobile processor executes at least one application program which processes the information contained in the electronic mail.

10. An originating device in accordance with claim 4 wherein:
the one mobile processor executes at least one application program which processes the information contained in the electronic mail.

11. An originating device in accordance with claim 5 wherein:
the one mobile processor executes at least one application program which processes the information contained in the electronic mail.

12. An originating device in accordance with claim 6 wherein:
the one mobile processor executes at least one application program which processes the information contained in the electronic mail.

13. An originating device in accordance with claim 1 wherein:
after reception of the electronic mail by the destination processor, the identification of the wireless device is added to the information contained in the electronic mail before transmission by the wireless system.

14. An originating device in accordance with claim 4 wherein:
after reception of the electronic mail by the destination processor, the identification of the wireless device is added to the information contained in the electronic mail before transmission by the wireless system.

15. An originating device in accordance with claim 7 wherein:
after reception of the electronic mail by the destination processor, the identification of the wireless device is added to the information contained in the electronic mail before transmission by the wireless system.

16. An originating processor in accordance with claim 1 wherein:
after reception of the electronic mail by the destination processor, information is deleted from the electronic mail and is not transmitted by the wireless system.

17. An originating processor in accordance with claim 2 wherein:
after reception of the electronic mail by the destination processor, information is deleted from the electronic mail and is not transmitted by the wireless system.

18. An originating processor in accordance with claim 3 wherein:
after reception of the electronic mail by the destination processor, information is deleted from the electronic mail and is not transmitted by the wireless system.

19. An originating processor in accordance with claim 4 wherein:
after reception of the electronic mail by the destination processor, information is deleted from the electronic mail and is not transmitted by the wireless system.

20. An originating processor in accordance with claim 5 wherein:
after reception of the electronic mail by the destination processor, information is deleted from the electronic mail and is not transmitted by the wireless system.

21. An originating processor in accordance with claim 6 wherein:
after reception of the electronic mail by the destination processor, information is deleted from the electronic mail and is not transmitted by the wireless system.

22. An originating processor in accordance with claim 7 wherein:
after reception of the electronic mail by the destination processor, information is deleted from the electronic mail and is not transmitted by the wireless system.

23. An originating processor in accordance with claim 8 wherein:
after reception of the electronic mail by the destination processor, information is deleted from the electronic mail and is not transmitted by the wireless system.

24. An originating processor in accordance with claim 9 wherein:
after reception of the electronic mail by the destination processor, information is deleted from the electronic mail and is not transmitted by the wireless system.

25. An originating processor in accordance with claim 10 wherein:
after reception of the electronic mail by the destination processor, information is deleted from the electronic mail and is not transmitted by the wireless system.

26. An originating processor in accordance with claim 11 wherein:
after reception of the electronic mail by the destination processor, information is deleted from the electronic mail and is not transmitted by the wireless system.

27. An originating processor in accordance with claim 12 wherein:
after reception of the electronic mail by the destination processor, information is deleted from the electronic mail and is not transmitted by the wireless system.

28. An originating processor in accordance with claim 13 wherein:
after reception of the electronic mail by the destination processor, information is deleted from the electronic mail and is not transmitted by the wireless system.

29. An originating processor in accordance with claim 14 wherein:
after reception of the electronic mail by the destination processor, information is deleted from the electronic mail and is not transmitted by the wireless system.

30. An originating processor in accordance with claim 15 wherein:
after reception of the electronic mail by the destination processor, information is deleted from the electronic mail and is not transmitted by the wireless system.

31. An originating device in accordance with claim 16 wherein:
the deleted information is a header in the electronic mail inputted by the originating device.

32. An originating device in accordance with claim 17 wherein:

the deleted information is a header in the electronic mail inputted by the originating device.

33. An originating device in accordance with claim 18 wherein:
the deleted information is a header in the electronic mail inputted by the originating device.

34. An originating device in accordance with claim 19 wherein:
the deleted information is a header in the electronic mail inputted by the originating device.

35. An originating device in accordance with claim 20 wherein:
the deleted information is a header in the electronic mail inputted by the originating device.

36. An originating device in accordance with claim 21 wherein:
the deleted information is a header in the electronic mail inputted by the originating device.

37. An originating device in accordance with claim 22 wherein:
the deleted information is a header in the electronic mail inputted by the originating device.

38. An originating device in accordance with claim 23 wherein:
the deleted information is a header in the electronic mail inputted by the originating device.

39. An originating device in accordance with claim 24 wherein:
the deleted information is a header in the electronic mail inputted by the originating device.

40. An originating device in accordance with claim 25 wherein:
the deleted information is a header in the electronic mail inputted by the originating device.

41. An originating device in accordance with claim 26 wherein:
the deleted information is a header in the electronic mail inputted by the originating device.

42. An originating device in accordance with claim 27 wherein:
the deleted information is a header in the electronic mail inputted by the originating device.

43. An originating device in accordance with claim 28 wherein:
the deleted information is a header in the electronic mail inputted by the originating device.

44. An originating device in accordance with claim 29 wherein:
the deleted information is a header in the electronic mail inputted by the originating device.

45. An originating device in accordance with claim 30 wherein:
the deleted information is a header in the electronic mail inputted by the originating device.

46. An originating device in accordance with claim 1 wherein:
after reception of the electronic mail by the destination processor, a check is performed to determine if the information contained in the electronic mail should be transmitted by the wireless system to the wireless device.

47. An originating device in accordance with claim 2 wherein:
after reception of the electronic mail by the destination processor, a check is performed to determine if the information contained in the electronic mail should be transmitted by the wireless system to the wireless device.

48. An originating device in accordance with claim 3 wherein:
after reception of the electronic mail by the destination processor, a check is performed to determine if the information contained in the electronic mail should be transmitted by the wireless system to the wireless device.

49. An originating device in accordance with claim 4 wherein:
after reception of the electronic mail by the destination processor, a check is performed to determine if the information contained in the electronic mail should be transmitted by the wireless system to the wireless device.

50. An originating device in accordance with claim 5 wherein:
after reception of the electronic mail by the destination processor, a check is performed to determine if the information contained in the electronic mail should be transmitted by the wireless system to the wireless device.

51. An originating device in accordance with claim 6 wherein:
after reception of the electronic mail by the destination processor, a check is performed to determine if the information contained in the electronic mail should be transmitted by the wireless system to the wireless device.

52. An originating device in accordance with claim 7 wherein:
after reception of the electronic mail by the destination processor, a check is performed to determine if the information contained in the electronic mail should be transmitted by the wireless system to the wireless device.

53. An originating device in accordance with claim 8 wherein:
after reception of the electronic mail by the destination processor, a check is performed to determine if the information contained in the electronic mail should be transmitted by the wireless system to the wireless device.

54. An originating device in accordance with claim 9 wherein:
after reception of the electronic mail by the destination processor, a check is performed to determine if the information contained in the electronic mail should be transmitted by the wireless system to the wireless device.

55. An originating device in accordance with claim 10 wherein:
after reception of the electronic mail by the destination processor, a check is performed to determine if the information contained in the electronic mail should be transmitted by the wireless system to the wireless device.

56. An originating device in accordance with claim 11 wherein:
after reception of the electronic mail by the destination processor, a check is performed to determine if the information contained in the electronic mail should be transmitted by the wireless system to the wireless device.

57. An originating device in accordance with claim 12 wherein:
  after reception of the electronic mail by the destination processor, a check is performed to determine if the information contained in the electronic mail should be transmitted by the wireless system to the wireless device.

58. An originating device in accordance with claim 13 wherein:
  after reception of the electronic mail by the destination processor, a check is performed to determine if the information contained in the electronic mail should be transmitted by the wireless system to the wireless device.

59. An originating device in accordance with claim 14 wherein:
  after reception of the electronic mail by the destination processor, a check is performed to determine if the information contained in the electronic mail should be transmitted by the wireless system to the wireless device.

60. An originating device in accordance with claim 15 wherein:
  after reception of the electronic mail by the destination processor, a check is performed to determine if the information contained in the electronic mail should be transmitted by the wireless system to the wireless device.

61. An originating device in accordance with claim 16 wherein: after reception of the electronic mail by the destination processor, a check is performed to determine if the information contained in the electronic mail should be transmitted by the wireless system to the wireless device.

62. An originating device in accordance with claim 17 wherein:
  after reception of the electronic mail by the destination processor, a check is performed to determine if the information contained in the electronic mail should be transmitted by the wireless system to the wireless device.

63. An originating device in accordance with claim 18 wherein:
  after reception of the electronic mail by the destination processor, a check is performed to determine if the information contained in the electronic mail should be transmitted by the wireless system to the wireless device.

64. An originating device in accordance with claim 19 wherein:
  after reception of the electronic mail by the destination processor, a check is performed to determine if the information contained in the electronic mail should be transmitted by the wireless system to the wireless device.

65. An originating device in accordance with claim 20 wherein:
  after reception of the electronic mail by the destination processor, a check is performed to determine if the information contained in the electronic mail should be transmitted by the wireless system to the wireless device.

66. An originating device in accordance with claim 21 wherein:
  after reception of the electronic mail by the destination processor, a check is performed to determine if the information contained in the electronic mail should be transmitted by the wireless system to the wireless device.

67. An originating device in accordance with claim 22 wherein:
  after reception of the electronic mail by the destination processor, a check is performed to determine if the information contained in the electronic mail should be transmitted by the wireless system to the wireless device.

68. An originating device in accordance with claim 23 wherein:
  after reception of the electronic mail by the destination processor, a check is performed to determine if the information contained in the electronic mail should be transmitted by the wireless system to the wireless device.

69. An originating device in accordance with claim 24 wherein:
  after reception of the electronic mail by the destination processor, a check is performed to determine if the information contained in the electronic mail should be transmitted by the wireless system to the wireless device.

70. An originating device in accordance with claim 25 wherein:
  after reception of the electronic mail by the destination processor, a check is performed to determine if the information contained in the electronic mail should be transmitted by the wireless system to the wireless device.

71. An originating device in accordance with claim 26 wherein:
  after reception of the electronic mail by the destination processor, a check is performed to determine if the information contained in the electronic mail should be transmitted by the wireless system to the wireless device.

72. An originating device in accordance with claim 27 wherein:
  after reception of the electronic mail by the destination processor, a check is performed to determine if the information contained in the electronic mail should be transmitted by the wireless system to the wireless device.

73. An originating device in accordance with claim 28 wherein:
  after reception of the electronic mail by the destination processor, a check is performed to determine if the information contained in the electronic mail should be transmitted by the wireless system to the wireless device.

74. An originating device in accordance with claim 29 wherein:
  after reception of the electronic mail by the destination processor, a check is performed to determine if the information contained in the electronic mail should be transmitted by the wireless system to the wireless device.

75. An originating device in accordance with claim 30 wherein:
  after reception of the electronic mail by the destination processor, a check is performed to determine if the information contained in the electronic mail should be transmitted by the wireless system to the wireless device.

76. An originating device in accordance with claim 31 wherein:
  after reception of the electronic mail by the destination processor, a check is performed to determine if the information contained in the electronic mail should be transmitted by the wireless system to the wireless device.

77. An originating device in accordance with claim 32 wherein:
    after reception of the electronic mail by the destination processor, a check is performed to determine if the information contained in the electronic mail should be transmitted by the wireless system to the wireless device.

78. An originating device in accordance with claim 33 wherein:
    after reception of the electronic mail by the destination processor, a check is performed to determine if the information contained in the electronic mail should be transmitted by the wireless system to the wireless device.

79. An originating device in accordance with claim 34 wherein:
    after reception of the electronic mail by the destination processor, a check is performed to determine if the information contained in the electronic mail should be transmitted by the wireless system to the wireless device.

80. An originating device in accordance with claim 35 wherein:
    after reception of the electronic mail by the destination processor, a check is performed to determine if the information contained in the electronic mail should be transmitted by the wireless system to the wireless device.

81. An originating device in accordance with claim 36 wherein:
    after reception of the electronic mail by the destination processor, a check is performed to determine if the information contained in the electronic mail should be transmitted by the wireless system to the wireless device.

82. An originating device in accordance with claim 37 wherein:
    after reception of the electronic mail by the destination processor, a check is performed to determine if the information contained in the electronic mail should be transmitted by the wireless system to the wireless device.

83. An originating device in accordance with claim 38 wherein:
    after reception of the electronic mail by the destination processor, a check is performed to determine if the information contained in the electronic mail should be transmitted by the wireless system to the wireless device.

84. An originating device in accordance with claim 39 wherein:
    after reception of the electronic mail by the destination processor, a check is performed to determine if the information contained in the electronic mail should be transmitted by the wireless system to the wireless device.

85. An originating device in accordance with claim 40 wherein:
    after reception of the electronic mail by the destination processor, a check is performed to determine if the information contained in the electronic mail should be transmitted by the wireless system to the wireless device.

86. An originating device in accordance with claim 41 wherein:
    after reception of the electronic mail by the destination processor, a check is performed to determine if the information contained in the electronic mail should be transmitted by the wireless system to the wireless device.

87. An originating device in accordance with claim 42 wherein:
    after reception of the electronic mail by the destination processor, a check is performed to determine if the information contained in the electronic mail should be transmitted by the wireless system to the wireless device.

88. An originating device in accordance with claim 43 wherein:
    after reception of the electronic mail by the destination processor, a check is performed to determine if the information contained in the electronic mail should be transmitted by the wireless system to the wireless device.

89. An originating device in accordance with claim 44 wherein:
    after reception of the electronic mail by the destination processor, a check is performed to determine if the information contained in the electronic mail should be transmitted by the wireless system to the wireless device.

90. An originating device in accordance with claim 45 wherein:
    after reception of the electronic mail by the destination processor, a check is performed to determine if the information contained in the electronic mail should be transmitted by the wireless system to the wireless device.

91. An originating device in accordance with claim 46 wherein:
    the check is performed by a comparison of an identification of the wireless device with identifications of permissible wireless devices in the wireless system.

92. An originating device in accordance with claim 47 wherein:
    the check is performed by a comparison of an identification of the wireless device with identifications of permissible wireless devices in the wireless system.

93. An originating device in accordance with claim 48 wherein:
    the check is performed by a comparison of an identification of the wireless device with identifications of permissible wireless devices in the wireless system.

94. An originating device in accordance with claim 49 wherein:
    the check is performed by a comparison of an identification of the wireless device with identifications of permissible wireless devices in the wireless system.

95. An originating device in accordance with claim 50 wherein:
    the check is performed by a comparison of an identification of the wireless device with identifications of permissible wireless devices in the wireless system.

96. An originating device in accordance with claim 51 wherein:
    the check is performed by a comparison of an identification of the wireless device with identifications of permissible wireless devices in the wireless system.

97. An originating device in accordance with claim 52 wherein:
the check is performed by a comparison of an identification of the wireless device with identifications of permissible wireless devices in the wireless system.

98. An originating device in accordance with claim 53 wherein:
the check is performed by a comparison of an identification of the wireless device with identifications of permissible wireless devices in the wireless system.

99. An originating device in accordance with claim 54 wherein:
the check is performed by a comparison of an identification of the wireless device with identifications of permissible wireless devices in the wireless system.

100. An originating device in accordance with claim 55 wherein:
the check is performed by a comparison of an identification of the wireless device with identifications of permissible wireless devices in the wireless system.

101. An originating device in accordance with claim 56 wherein:
the check is performed by a comparison of an identification of the wireless device with identifications of permissible wireless devices in the wireless system.

102. An originating device in accordance with claim 57 wherein:
the check is performed by a comparison of an identification of the wireless device with identifications of permissible wireless devices in the wireless system.

103. An originating device in accordance with claim 58 wherein:
the check is performed by a comparison of an identification of the wireless device with identifications of permissible wireless devices in the wireless system.

104. An originating device in accordance with claim 59 wherein:
the check is performed by a comparison of an identification of the wireless device with identifications of permissible wireless devices in the wireless system.

105. An originating device in accordance with claim 60 wherein:
the check is performed by a comparison of an identification of the wireless device with identifications of permissible wireless devices in the wireless system.

106. An originating device in accordance with claim 61 wherein:
the check is performed by a comparison of an identification of the wireless device with identifications of permissible wireless devices in the wireless system.

107. An originating device in accordance with claim 62 wherein:
the check is performed by a comparison of an identification of the wireless device with identifications of permissible wireless devices in the wireless system.

108. An originating device in accordance with claim 63 wherein:
the check is performed by a comparison of an identification of the wireless device with identifications of permissible wireless devices in the wireless system.

109. An originating device in accordance with claim 64 wherein:
the check is performed by a comparison of an identification of the wireless device with identifications of permissible wireless devices in the wireless system.

110. An originating device in accordance with claim 65 wherein:
the check is performed by a comparison of an identification of the wireless device with identifications of permissible wireless devices in the wireless system.

111. An originating device in accordance with claim 66 wherein:
the check is performed by a comparison of an identification of the wireless device with identifications of permissible wireless devices in the wireless system.

112. An originating device in accordance with claim 67 wherein:
the check is performed by a comparison of an identification of the wireless device with identifications of permissible wireless devices in the wireless system.

113. An originating device in accordance with claim 68 wherein:
the check is performed by a comparison of an identification of the wireless device with identifications of permissible wireless devices in the wireless system.

114. An originating device in accordance with claim 69 wherein:
the check is performed by a comparison of an identification of the wireless device with identifications of permissible wireless devices in the wireless system.

115. An originating device in accordance with claim 70 wherein:
the check is performed by a comparison of an identification of the wireless device with identifications of permissible wireless devices in the wireless system.

116. An originating device in accordance with claim 71 wherein:
the check is performed by a comparison of an identification of the wireless device with identifications of permissible wireless devices in the wireless system.

117. An originating device in accordance with claim 72 wherein:
the check is performed by a comparison of an identification of the wireless device with identifications of permissible wireless devices in the wireless system.

118. An originating device in accordance with claim 73 wherein:
the check is performed by a comparison of an identification of the wireless device with identifications of permissible wireless devices in the wireless system.

119. An originating device in accordance with claim 74 wherein:
the check is performed by a comparison of an identification of the wireless device with identifications of permissible wireless devices in the wireless system.

120. An originating device in accordance with claim 75 wherein:
the check is performed by a comparison of an identification of the wireless device with identifications of permissible wireless devices in the wireless system.

121. An originating device in accordance with claim 76 wherein:
the check is performed by a comparison of an identification of the wireless device with identifications of permissible wireless devices in the wireless system.

122. An originating device in accordance with claim 77 wherein:
the check is performed by a comparison of an identification of the wireless device with identifications of permissible wireless devices in the wireless system.

123. An originating device in accordance with claim 78 wherein:

the check is performed by a comparison of an identification of the wireless device with identifications of permissible wireless devices in the wireless system.

124. An originating device in accordance with claim 79 wherein:

the check is performed by a comparison of an identification of the wireless device with identifications of permissible wireless devices in the wireless system.

125. An originating device in accordance with claim 80 wherein:

the check is performed by a comparison of an identification of the wireless device with identifications of permissible wireless devices in the wireless system.

126. An originating device in accordance with claim 81 wherein:

the check is performed by a comparison of an identification of the wireless device with identifications of permissible wireless devices in the wireless system.

127. An originating device in accordance with claim 82 wherein:

the check is performed by a comparison of an identification of the wireless device with identifications of permissible wireless devices in the wireless system.

128. An originating device in accordance with claim 83 wherein:

the check is performed by a comparison of an identification of the wireless device with identifications of permissible wireless devices in the wireless system.

129. An originating device in accordance with claim 84 wherein:

the check is performed by a comparison of an identification of the wireless device with identifications of permissible wireless devices in the wireless system.

130. An originating device in accordance with claim 85 wherein:

the check is performed by a comparison of an identification of the wireless device with identifications of permissible wireless devices in the wireless system.

131. An originating device in accordance with claim 86 wherein:

the check is performed by a comparison of an identification of the wireless device with identifications of permissible wireless devices in the wireless system.

132. An originating device in accordance with claim 87 wherein:

the check is performed by a comparison of an identification of the wireless device with identifications of permissible wireless devices in the wireless system.

133. An originating device in accordance with claim 88 wherein:

the check is performed by a comparison of an identification of the wireless device with identifications of permissible wireless devices in the wireless system.

134. An originating device in accordance with claim 89 wherein:

the check is performed by a comparison of an identification of the wireless device with identifications of permissible wireless devices in the wireless system.

135. An originating device in accordance with claim 90 wherein:

the check is performed by a comparison of an identification of the wireless device with identifications of permissible wireless devices in the wireless system.

136. A programmed processor in accordance with claims 1–135 wherein:

the wireless system broadcasts the information contained in the electronic mail and an identification of the wireless device at a location in the wireless system to the wireless device, said location determined from information stored in the wireless system pertaining to a location of the wireless device within the wireless system.

137. An originating device in accordance with claim 1 wherein:

the one mobile processor is a PC and the programmed processor is a mobile PC.

138. An originating device in accordance with claim 2 wherein:

the one mobile processor is a PC and the programmed processor is a mobile PC.

139. An originating device in accordance with claim 3 wherein:

the one mobile processor is a PC and the programmed processor is a mobile PC.

140. An originating device in accordance with claim 4 wherein:

the one mobile processor is a PC and the programmed processor is a mobile PC.

141. An originating device in accordance with claim 5 wherein:

the one mobile processor is a PC and the programmed processor is a mobile PC.

142. An originating device in accordance with claim 6 wherein:

the one mobile processor is a PC and the programmed processor is a mobile PC.

143. An originating device in accordance with claim 7 wherein:

the one mobile processor is a PC and the programmed processor is a mobile PC.

144. An originating device in accordance with claim 13 wherein:

the one mobile processor is a PC and the programmed processor is a mobile PC.

145. An originating device in accordance with claim 16 wherein:

the one mobile processor is a PC and the programmed processor is a mobile PC.

146. An originating device in accordance with claim 31 wherein:

the one mobile processor is a PC and the programmed processor is a mobile PC.

147. An originating device in accordance with claim 46 wherein:

the one mobile processor is a PC and the programmed processor is a mobile PC.

148. An originating device in accordance with claim 91 wherein:

the one mobile processor is a PC and the programmed processor is a mobile PC.

149. An originating device in accordance with claim 1 wherein:

the one mobile processor is a PC and the programmed processor is a mobile PC; and wherein the wireless system broadcasts the information and an identification of the wireless device at a location in the wireless system to the wireless device determined from information stored in the wireless system pertaining to a location of the wireless device in the wireless system.

150. In a communication system comprising a wireless system which communication system transmits electronic mail inputted to the communication system from an originating device which executes electronic mail programming to originate the electronic mail, mobile processors which execute electronic mail programming to function as a destination of electronic mail, and a destination processor to which the electronic mail is transmitted from the originating device and after reception of the electronic mail by the destination processor, information contained in the electronic mail and an identification of a wireless device in the wireless system are transmitted by the wireless system to the wireless device and from the wireless device to one of the mobile processors, the wireless device and one mobile processor comprising:

a wireless receiver connected to the one mobile processor with the one mobile processor receiving the information contained in the electronic mail after the identification of the wireless device is detected by the wireless receiver in a broadcast by the wireless system.

151. A wireless device and mobile processor in accordance with claim 150 wherein:

the electronic mail originated by the originating device also contains an identification of the wireless device and a recipient of the electronic mail to receive the information at the one mobile processor.

152. A wireless device and mobile processor in accordance with claim 151 wherein:

the identification of the wireless device is a number.

153. A wireless device and mobile processor in accordance with claim 150 wherein:

the originating device is a mobile processor, executes electronic mail programming to originate electronic mail which is wirelessly transmitted from the originating device and by the communication system; and the one mobile processor executes electronic mail programming to originate electronic mail which is wirelessly transmitted from the one mobile processor and by the communication system.

154. A wireless device and mobile processor in accordance with claim 151 wherein:

the originating device is a mobile processor, executes electronic mail programming to originate electronic mail which is wirelessly transmitted from the originating device and by the communication system; and the one mobile processor executes electronic mail programming to originate electronic mail which is wirelessly transmitted from the one mobile processor and by the communication system.

155. A wireless device and mobile processor in accordance with claim 152 wherein:

the originating device is a mobile processor, executes electronic mail programming to originate electronic mail which is wirelessly transmitted from the originating device and by the communication system; and the one mobile processor executes electronic mail programming to originate electronic mail which is wirelessly transmitted from the one mobile processor and by the communication system.

156. A wireless device and mobile processor in accordance with claim 150 wherein:

the one mobile processor executes at least one application program which processes the information contained in the electronic mail.

157. A wireless device and mobile processor in accordance with claim 151 wherein:

the one mobile processor executes at least one application program which processes the information contained in the electronic mail.

158. A wireless device and mobile processor in accordance with claim 152 wherein:

the one mobile processor executes at least one application program which processes the information contained in the electronic mail.

159. A wireless device and mobile processor in accordance with claim 153 wherein:

the one mobile processor executes at least one application program which processes the information contained in the electronic mail.

160. A wireless device and mobile processor in accordance with claim 154 wherein:

the one mobile processor executes at least one application program which processes the information contained in the electronic mail.

161. A wireless device and mobile processor in accordance with claim 155 wherein:

the one mobile processor executes at least one application program which processes the information.

162. A wireless device and mobile processor in accordance with claim 150 wherein:

after reception of the electronic mail by the destination processor, the identification of the wireless device is added to the information contained in the electronic mail.

163. A wireless device and mobile processor in accordance with claim 153 wherein:

after reception of the electronic mail by the destination processor, the identification of the wireless device is added to the information contained in the electronic mail.

164. A wireless device and mobile processor in accordance with claim 150 wherein:

after reception of the electronic mail by the destination processor, the information contained in the electronic mail is processed and transmitted in packets by the wireless system.

165. A wireless device and mobile processor in accordance with claim 150 wherein:

after reception of the electronic mail by the destination processor, information is deleted from the electronic mail and is not transmitted by the wireless system.

166. A wireless device and mobile processor in accordance with claim 151 wherein:

after reception of the electronic mail by the destination processor, information is deleted from the electronic mail and is not transmitted by the wireless system.

167. A wireless device and mobile processor in accordance with claim 152 wherein:

after reception of the electronic mail by the destination processor, information is deleted from the electronic mail and is not transmitted by the wireless system.

168. A wireless device and mobile processor in accordance with claim 153 wherein:

after reception of the electronic mail by the destination processor, information is deleted from the electronic mail and is not transmitted by the wireless system.

169. A wireless device and mobile processor in accordance with claim 154 wherein:

after reception of the electronic mail by the destination processor, information is deleted from the electronic mail and is not transmitted by the wireless system.

170. A wireless device and mobile processor in accordance with claim 155 wherein:
   after reception of the electronic mail by the destination processor, information is deleted from the electronic mail and is not transmitted by the wireless system.
171. A wireless device and mobile processor in accordance with claim 156 wherein:
   after reception of the electronic mail by the destination processor, information is deleted from the electronic mail and is not transmitted by the wireless system.
172. A wireless device and mobile processor in accordance with claim 157 wherein:
   after reception of the electronic mail by the destination processor, information is deleted from the electronic mail and is not transmitted by the wireless system.
173. A wireless device and mobile processor in accordance with claim 158 wherein:
   after reception of the electronic mail by the destination processor, information is deleted from the electronic mail and is not transmitted by the wireless system.
174. A wireless device and mobile processor in accordance with claim 159 wherein:
   after reception of the electronic mail by the destination processor, information is deleted from the electronic mail and is not transmitted by the wireless system.
175. A wireless device and mobile processor in accordance with claim 160 wherein:
   after reception of the electronic mail by the destination processor, information is deleted from the electronic mail and is not transmitted by the wireless system.
176. A wireless device and mobile processor in accordance with claim 161 wherein:
   after reception of the electronic mail by the destination processor, information is deleted from the electronic mail and is not transmitted by the wireless system.
177. A wireless device and mobile processor in accordance with claim 162 wherein:
   after reception of the electronic mail by the destination processor, information is deleted from the electronic mail and is not transmitted by the wireless system.
178. A wireless device and mobile processor in accordance with claim 163 wherein:
   after reception of the electronic mail by the destination processor, information is deleted from the electronic mail and is not transmitted by the wireless system.
179. A wireless device and mobile processor in accordance with claim 164 wherein:
   after reception of the electronic mail by the destination processor, information is deleted from the electronic mail and is not transmitted by the wireless system.
180. A wireless device and mobile processor in accordance with claim 165 wherein:
   the deleted information is a header in the electronic mail inputted by the originating device.
181. A wireless device and mobile processor in accordance with claim 166 wherein:
   the deleted information is a header in the electronic mail inputted by the originating device.
182. A wireless device and mobile processor in accordance with claim 167 wherein:
   the deleted information is a header in the electronic mail inputted by the originating device.
183. A wireless device and mobile processor in accordance with claim 168 wherein:
   the deleted information is a header in the electronic mail inputted by the originating device.
184. A wireless device and mobile processor in accordance with claim 169 wherein:
   the deleted information is a header in the electronic mail inputted by the originating device.
185. A wireless device and mobile processor in accordance with claim 170 wherein:
   the deleted information is a header in the electronic mail inputted by the originating device.
186. A wireless device and mobile processor in accordance with claim 171 wherein:
   the deleted information is a header in the electronic mail inputted by the originating device.
187. A wireless device and mobile processor in accordance with claim 172 wherein:
   the deleted information is a header in the electronic mail inputted by the originating device.
188. A wireless device and mobile processor in accordance with claim 173 wherein:
   the deleted information is a header in the electronic mail inputted by the originating device.
189. A wireless device and mobile processor in accordance with claim 174 wherein:
   the deleted information is a header in the electronic mail inputted by the originating device.
190. A wireless device and mobile processor in accordance with claim 175 wherein:
   the deleted information is a header in the electronic mail inputted by the originating device.
191. A wireless device and mobile processor in accordance with claim 176 wherein:
   the deleted information is a header in the electronic mail inputted by the originating device.
192. A wireless device and mobile processor in accordance with claim 177 wherein:
   the deleted information is a header in the electronic mail inputted by the originating device.
193. A wireless device and mobile processor in accordance with claim 178 wherein:
   the deleted information is a header in the electronic mail inputted by the originating device.
194. A wireless device and mobile processor in accordance with claim 179 wherein:
   the deleted information is a header in the electronic mail inputted by the originating device.
195. A wireless device and mobile processor in accordance with claim 150 wherein:
   after reception by the destination processor, a check is performed to determine if the information contained in the electronic mail should be transmitted by the wireless system to the wireless device and the information contained in the electronic mail is processed and transmitted in data packets by the wireless system.
196. A wireless device and mobile processor in accordance with claim 150 wherein:
   after reception by the destination processor, a check is performed to determine if the information contained in the electronic mail should be transmitted by the wireless system to the wireless device.
197. A wireless device and mobile processor in accordance with claim 151 wherein:
   after reception by the destination processor, a check is performed to determine if the information contained in the electronic mail should be transmitted by the wireless system to the wireless device.
198. A wireless device and mobile processor in accordance with claim 152 wherein:

after reception by the destination processor, a check is performed to determine if the information contained in the electronic mail should be transmitted by the wireless system to the wireless device.

199. A wireless device and mobile processor in accordance with claim 153 wherein:

after reception by the destination processor, a check is performed to determine if the information contained in the electronic mail should be transmitted by the wireless system to the wireless device.

200. A wireless device and mobile processor in accordance with claim 154 wherein:

after reception by the destination processor, a check is performed to determine if the information contained in the electronic mail should be transmitted by the wireless system to the wireless device.

201. A wireless device and mobile processor in accordance with claim 155 wherein:

after reception by the destination processor, a check is performed to determine if the information contained in the electronic mail should be transmitted by the wireless system to the wireless device.

202. A wireless device and mobile processor in accordance with claim 156 wherein:

after reception by the destination processor, a check is performed to determine if the information contained in the electronic mail should be transmitted by the wireless system to the wireless device.

203. A wireless device and mobile processor in accordance with claim 157 wherein:

after reception by the destination processor, a check is performed to determine if the information contained in the electronic mail should be transmitted by the wireless system to the wireless device.

204. A wireless device and mobile processor in accordance with claim 158 wherein:

after reception by the destination processor, a check is performed to determine if the information contained in the electronic mail should be transmitted by the wireless system to the wireless device.

205. A wireless device and mobile processor in accordance with claim 159 wherein:

after reception by the destination processor, a check is performed to determine if the information contained in the electronic mail should be transmitted by the wireless system to the wireless device.

206. A wireless device and mobile processor in accordance with claim 160 wherein:

after reception by the destination processor, a check is performed to determine if the information contained in the electronic mail should be transmitted by the wireless system to the wireless device.

207. A wireless device and mobile processor in accordance with claim 161 wherein:

after reception by the destination processor, a check is performed to determine if the information contained in the electronic mail should be transmitted by the wireless system to the wireless device.

208. A wireless device and mobile processor in accordance with claim 162 wherein:

after reception by the destination processor, a check is performed to determine if the information contained in the electronic mail should be transmitted by the wireless system to the wireless device.

209. A wireless device and mobile processor in accordance with claim 163 wherein:

after reception by the destination processor, a check is performed to determine if the information contained in the electronic mail should be transmitted by the wireless system to the wireless device.

210. A wireless device and mobile processor in accordance with claim 164 wherein:

after reception by the destination processor, a check is performed to determine if the information contained in the electronic mail should be transmitted by the wireless system to the wireless device.

211. A wireless device and mobile processor in accordance with claim 165 wherein:

after reception by the destination processor, a check is performed to determine if the information contained in the electronic mail should be transmitted by the wireless system to the wireless device.

212. A wireless device and mobile processor in accordance with claim 166 wherein:

after reception by the destination processor, a check is performed to determine if the information contained in the electronic mail should be transmitted by the wireless system to the wireless device.

213. A wireless device and mobile processor in accordance with claim 167 wherein:

after reception by the destination processor, a check is performed to determine if the information contained in the electronic mail should be transmitted by the wireless system to the wireless device.

214. A wireless device and mobile processor in accordance with claim 168 wherein:

after reception by the destination processor, a check is performed to determine if the information contained in the electronic mail should be transmitted by the wireless system to the wireless device.

215. A wireless device and mobile processor in accordance with claim 169 wherein:

after reception by the destination processor, a check is performed to determine if the information contained in the electronic mail should be transmitted by the wireless system to the wireless device.

216. A wireless device and mobile processor in accordance with claim 170 wherein:

after reception by the destination processor, a check is performed to determine if the information contained in the electronic mail should be transmitted by the wireless system to the wireless device.

217. A wireless device and mobile processor in accordance with claim 171 wherein:

after reception by the destination processor, a check is performed to determine if the information contained in the electronic mail should be transmitted by the wireless system to the wireless device.

218. A wireless device and mobile processor in accordance with claim 172 wherein:

after reception by the destination processor, a check is performed to determine if the information contained in the electronic mail should be transmitted by the wireless system to the wireless device.

219. A wireless device and mobile processor in accordance with claim 173 wherein:

after reception by the destination processor, a check is performed to determine if the information contained in the electronic mail should be transmitted by the wireless system to the wireless device.

220. A wireless device and mobile processor in accordance with claim 174 wherein:

after reception by the destination processor, a check is performed to determine if the information contained in the electronic mail should be transmitted by the wireless system to the wireless device.

221. A wireless device and mobile processor in accordance with claim 175 wherein:

after reception by the destination processor, a check is performed to determine if the information contained in the electronic mail should be transmitted by the wireless system to the wireless device.

222. A wireless device and mobile processor in accordance with claim 176 wherein:

after reception by the destination processor, a check is performed to determine if the information contained in the electronic mail should be transmitted by the wireless system to the wireless device.

223. A wireless device and mobile processor in accordance with claim 177 wherein:

after reception by the destination processor, a check is performed to determine if the information contained in the electronic mail should be transmitted by the wireless system to the wireless device.

224. A wireless device and mobile processor in accordance with claim 178 wherein:

after reception by the destination processor, a check is performed to determine if the information contained in the electronic mail should be transmitted by the wireless system to the wireless device.

225. A wireless device and mobile processor in accordance with claim 179 wherein:

after reception by the destination processor, a check is performed to determine if the information contained in the electronic mail should be transmitted by the wireless system to the wireless device.

226. A wireless device and mobile processor in accordance with claim 180 wherein:

after reception by the destination processor, a check is performed to determine if the information contained in the electronic mail should be transmitted by the wireless system to the wireless device.

227. A wireless device and mobile processor in accordance with claim 181 wherein:

after reception by the destination processor, a check is performed to determine if the information contained in the electronic mail should be transmitted by the wireless system to the wireless device.

228. A wireless device and mobile processor in accordance with claim 182 wherein:

after reception by the destination processor, a check is performed to determine if the information contained in the electronic mail should be transmitted by the wireless system to the wireless device.

229. A wireless device and mobile processor in accordance with claim 183 wherein:

after reception by the destination processor, a check is performed to determine if the information contained in the electronic mail should be transmitted by the wireless system to the wireless device.

230. A wireless device and mobile processor in accordance with claim 184 wherein:

after reception by the destination processor, a check is performed to determine if the information contained in the electronic mail should be transmitted by the wireless system to the wireless device.

231. A wireless device and mobile processor in accordance with claim 185 wherein:

after reception by the destination processor, a check is performed to determine if the information contained in the electronic mail should be transmitted by the wireless system to the wireless device.

232. A wireless device and mobile processor in accordance with claim 186 wherein:

after reception by the destination processor, a check is performed to determine if the information contained in the electronic mail should be transmitted by the wireless system to the wireless device.

233. A wireless device and mobile processor in accordance with claim 187 wherein:

after reception by the destination processor, a check is performed to determine if the information contained in the electronic mail should be transmitted by the wireless system to the wireless device.

234. A wireless device and mobile processor in accordance with claim 188 wherein:

after reception by the destination processor, a check is performed to determine if the information contained in the electronic mail should be transmitted by the wireless system to the wireless device.

235. A wireless device and mobile processor in accordance with claim 189 wherein:

after reception by the destination processor, a check is performed to determine if the information contained in the electronic mail should be transmitted by the wireless system to the wireless device.

236. A wireless device and mobile processor in accordance with claim 190 wherein:

after reception by the destination processor, a check is performed to determine if the information contained in the electronic mail should be transmitted by the wireless system to the wireless device.

237. A wireless device and mobile processor in accordance with claim 191 wherein:

after reception by the destination processor, a check is performed to determine if the information contained in the electronic mail should be transmitted by the wireless system to the wireless device.

238. A wireless device and mobile processor in accordance with claim 192 wherein:

after reception by the destination processor, a check is performed to determine if the information contained in the electronic mail should be transmitted by the wireless system to the wireless device.

239. A wireless device and mobile processor in accordance with claim 193 wherein:

after reception by the destination processor, a check is performed to determine if the information contained in the electronic mail should be transmitted by the wireless system to the wireless device.

240. A wireless device and mobile processor in accordance with claim 194 wherein:

after reception by the destination processor, a check is performed to determine if the information contained in the electronic mail should be transmitted by the wireless system to the wireless device.

241. A wireless device and mobile processor in accordance with claim 195 wherein:

the check is performed by a comparison of an identification of the wireless device with identifications of permissible wireless devices in the wireless system.

242. A wireless device and mobile processor in accordance with claim 196 wherein:

the check is performed by a comparison of an identification of the wireless device with identifications of permissible wireless devices in the wireless system.

243. A wireless device and mobile processor in accordance with claim 197 wherein:

the check is performed by a comparison of an identification of the wireless device with identifications of permissible wireless devices in the wireless system.

244. A wireless device and mobile processor in accordance with claim 198 wherein:

the check is performed by a comparison of an identification of the wireless device with identifications of permissible wireless devices in the wireless system.

245. A wireless device and mobile processor in accordance with claim 199 wherein:

the check is performed by a comparison of an identification of the wireless device with identifications of permissible wireless devices in the wireless system.

246. A wireless device and mobile processor in accordance with claim 200 wherein:

the check is performed by a comparison of an identification of the wireless device with identifications of permissible wireless devices in the wireless system.

247. A wireless device and mobile processor in accordance with claim 201 wherein:

the check is performed by a comparison of an identification of the wireless device with identifications of permissible wireless devices in the wireless system.

248. A wireless device and mobile processor in accordance with claim 202 wherein:

the check is performed by a comparison of an identification of the wireless device with identifications of permissible wireless devices in the wireless system.

249. A wireless device and mobile processor in accordance with claim 203 wherein:

the check is performed by a comparison of an identification of the wireless device with identifications of permissible wireless devices in the wireless system.

250. A wireless device and mobile processor in accordance with claim 204 wherein:

the check is performed by a comparison of an identification of the wireless device with identifications of permissible wireless devices in the wireless system.

251. A wireless device and mobile processor in accordance with claim 205 wherein:

the check is performed by a comparison of an identification of the wireless device with identifications of permissible wireless devices in the wireless system.

252. A wireless device and mobile processor in accordance with claim 206 wherein:

the check is performed by a comparison of an identification of the wireless device with identifications of permissible wireless devices in the wireless system.

253. A wireless device and mobile processor in accordance with claim 207 wherein:

the check is performed by a comparison of an identification of the wireless device with identifications of permissible wireless devices in the wireless system.

254. A wireless device and mobile processor in accordance with claim 208 wherein:

the check is performed by a comparison of an identification of the wireless device with identifications of permissible wireless devices in the wireless system.

255. A wireless device and mobile processor in accordance with claim 209 wherein:

the check is performed by a comparison of an identification of the wireless device with identifications of permissible wireless devices in the wireless system.

256. A wireless device and mobile processor in accordance with claim 210 wherein:

the check is performed by a comparison of an identification of the wireless device with identifications of permissible wireless devices in the wireless system.

257. A wireless device and mobile processor in accordance with claim 211 wherein:

the check is performed by a comparison of an identification of the wireless device with identifications of permissible wireless devices in the wireless system.

258. A wireless device and mobile processor in accordance with claim 212 wherein:

the check is performed by a comparison of an identification of the wireless device with identifications of permissible wireless devices in the wireless system.

259. A wireless device and mobile processor in accordance with claim 213 wherein:

the check is performed by a comparison of an identification of the wireless device with identifications of permissible wireless devices in the wireless system.

260. A wireless device and mobile processor in accordance with claim 214 wherein:

the check is performed by a comparison of an identification of the wireless device with identifications of permissible wireless devices in the wireless system.

261. A wireless device and mobile processor in accordance with claim 215 wherein:

the check is performed by a comparison of an identification of the wireless device with identifications of permissible wireless devices in the wireless system.

262. A wireless device and mobile processor in accordance with claim 216 wherein:

the check is performed by a comparison of an identification of the wireless device with identifications of permissible wireless devices in the wireless system.

263. A wireless device and mobile processor in accordance with claim 217 wherein:

the check is performed by a comparison of an identification of the wireless device with identifications of permissible wireless devices in the wireless system.

264. A wireless device and mobile processor in accordance with claim 218 wherein:

the check is performed by a comparison of an identification of the wireless device with identifications of permissible wireless devices in the wireless system.

265. A wireless device and mobile processor in accordance with claim 219 wherein:

the check is performed by a comparison of an identification of the wireless device with identifications of permissible wireless devices in the wireless system.

266. A wireless device and mobile processor in accordance with claim 220 wherein:

the check is performed by a comparison of an identification of the wireless device with identifications of permissible wireless devices in the wireless system.

267. A wireless device and mobile processor in accordance with claim 221 wherein:

the check is performed by a comparison of an identification of the wireless device with identifications of permissible wireless devices in the wireless system.

268. A wireless device and mobile processor in accordance with claim 222 wherein:

269. A wireless device and mobile processor in accordance with claim 223 wherein:

the check is performed by a comparison of an identification of the wireless device with identifications of permissible wireless devices in the wireless system.

270. A wireless device and mobile processor in accordance with claim 224 wherein:

the check is performed by a comparison of an identification of the wireless device with identifications of permissible wireless devices in the wireless system.

271. A wireless device and mobile processor in accordance with claim 225 wherein:

the check is performed by a comparison of an identification of the wireless device with identifications of permissible wireless devices in the wireless system.

272. A wireless device and mobile processor in accordance with claim 226 wherein:

the check is performed by a comparison of an identification of the wireless device with identifications of permissible wireless devices in the wireless system.

273. A wireless device and mobile processor in accordance with claim 227 wherein:

the check is performed by a comparison of an identification of the wireless device with identifications of permissible wireless devices in the wireless system.

274. A wireless device and mobile processor in accordance with claim 228 wherein:

the check is performed by a comparison of an identification of the wireless device with identifications of permissible wireless devices in the wireless system.

275. A wireless device and mobile processor in accordance with claim 229 wherein:

the check is performed by a comparison of an identification of the wireless device with identifications of permissible wireless devices in the wireless system.

276. A wireless device and mobile processor in accordance with claim 230 wherein:

the check is performed by a comparison of an identification of the wireless device with identifications of permissible wireless devices in the wireless system.

277. A wireless device and mobile processor in accordance with claim 231 wherein:

the check is performed by a comparison of an identification of the wireless device with identifications of permissible wireless devices in the wireless system.

278. A wireless device and mobile processor in accordance with claim 232 wherein:

the check is performed by a comparison of an identification of the wireless device with identifications of permissible wireless devices in the wireless system.

279. A wireless device and mobile processor in accordance with claim 233 wherein:

the check is performed by a comparison of an identification of the wireless device with identifications of permissible wireless devices in the wireless system.

280. A wireless device and mobile processor in accordance with claim 234 wherein:

the check is performed by a comparison of an identification of the wireless device with identifications of permissible wireless devices in the wireless system.

281. A wireless device and mobile processor in accordance with claim 235 wherein:

the check is performed by a comparison of an identification of the wireless device with identifications of permissible wireless devices in the wireless system.

282. A wireless device and mobile processor in accordance with claim 236 wherein:

the check is performed by a comparison of an identification of the wireless device with identifications of permissible wireless devices in the wireless system.

283. A wireless device and mobile processor in accordance with claim 237 wherein:

the check is performed by a comparison of an identification of the wireless device with identifications of permissible wireless devices in the wireless system.

284. A wireless device and mobile processor in accordance with claim 238 wherein:

the check is performed by a comparison of an identification of the wireless device with identifications of permissible wireless devices in the wireless system.

285. A wireless device and mobile processor in accordance with claim 239 wherein:

the check is performed by a comparison of an identification of the wireless device with identifications of permissible wireless devices in the wireless system.

286. A wireless device and mobile processor in accordance with claim 240 wherein:

the check is performed by a comparison of an identification of the wireless device with identifications of permissible wireless devices in the wireless system.

287. A wireless device and mobile processor in accordance with claims 150–286 wherein:

the wireless system broadcasts the information contained in the electronic mail and an identification of the wireless device at a location in the wireless system to the wireless device, said location determined from information stored in the wireless system pertaining to a location of the wireless device within the wireless system.

288. A wireless device and mobile processor in accordance with claim 150 wherein:

the one mobile processor is a PC and the originating device is a mobile PC.

289. A wireless device and mobile processor in accordance with claim 151 wherein:

the one mobile processor is a PC and the originating device is a mobile PC.

290. A wireless device and mobile processor in accordance with claim 152 wherein:

the one mobile processor is a PC and the originating device is a mobile PC.

291. A wireless device and mobile processor in accordance with claim 153 wherein:

the one mobile processor is a PC and the originating device is a mobile PC.

292. A wireless device and mobile processor in accordance with claim 154 wherein:

the one mobile processor is a PC and the originating device is a mobile PC.

293. A wireless device and mobile processor in accordance with claim 155 wherein:

the one mobile processor is a PC and the originating device is a mobile PC.

294. A wireless device and mobile processor in accordance with claim 156 wherein:

the one mobile processor is a PC and the originating device is a mobile PC.

295. A wireless device and mobile processor in accordance with claim 162 wherein:
the one mobile processor is a PC and the originating device is a mobile PC.

296. A wireless device and mobile processor in accordance with claim 165 wherein:
the one mobile processor is a PC and the originating device is a mobile PC.

297. A wireless device and mobile processor in accordance with claim 180 wherein:
the one mobile processor is a PC and the originating device is a mobile PC.

298. A wireless device and mobile processor in accordance with claim 196 wherein:
the one mobile processor is a PC and the originating device is a mobile PC.

299. A wireless device and mobile processor in accordance with claim 241 wherein:
the one mobile processor is a PC and the originating device is a mobile PC.

300. A wireless device and mobile processor in accordance with claim 150 wherein:
the one mobile processor is a PC and the originating device is a mobile PC; and
the wireless system broadcasts the information and an identification of the wireless device at a location in the wireless system to the wireless device determined from information stored in the wireless system pertaining to a location of the wireless device stored in the wireless system.

301. A communication system comprising:
mobile devices, each mobile device comprising a wireless device connected to a mobile processor which executes electronic mail programming to function as a destination of electronic mail, the wireless device after receiving a broadcast of information contained in the electronic mail and an identification of the wireless device transmits the information to the connected mobile processor;
a wireless system which transmits the information contained in the electronic mail and the identification of the wireless device and broadcasts the information contained in the electronic mail and the identification of the wireless device;
a programmed processor which executes electronic mail programming to originate the electronic mail which contains an address of a destination to which the electronic mail is transmitted and the information contained in the electronic mail; and
a destination processor which receives the electronic mail and is the destination of the electronic mail; and wherein
after reception of the electronic mail by the destination processor, the information contained in the electronic mail and the identification of the wireless device are transmitted to the wireless system and broadcast to the wireless device.

302. A communication system in accordance with claim 301 wherein:
the electronic mail originated by the programmed processor also contains an identification of the wireless device and a recipient of the electronic mail to receive the information at the connected mobile processor.

303. A communication system in accordance with claim 301 wherein:
the identification of the wireless device is a number.

304. A communication system in accordance with claim 301 wherein:
the programmed processor is mobile, executes electronic mail programming to originate electronic mail which is wirelessly transmitted from the programmed processor and by the communication system; and
the connected mobile processor executes electronic mail programming to originate electronic mail which is wirelessly transmitted from the connected mobile processor and by the communication system.

305. A communication system in accordance with claim 302 wherein:
the programmed processor is mobile, executes electronic mail programming to originate electronic mail which is wirelessly transmitted from the programmed processor and by the communication system; and
the connected mobile processor executes electronic mail programming to originate electronic mail which is wirelessly transmitted from the connected mobile processor and by the communication system.

306. A communication system in accordance with claim 303 wherein:
the programmed processor is mobile, executes electronic mail programming to originate electronic mail which is wirelessly transmitted from the programmed processor and by the communication system; and
the connected mobile processor executes electronic mail programming to originate electronic mail which is wirelessly transmitted from the connected mobile processor and by the communication system.

307. A communication system in accordance with claim 301 wherein:
the connected mobile processor executes at least one application program which processes the information contained in the electronic mail.

308. A communication system in accordance with claim 302 wherein:
the connected mobile processor executes at least one application program which processes the information contained in the electronic mail.

309. A communication system in accordance with claim 303 wherein:
the connected mobile processor executes at least one application program which processes the information contained in the electronic mail.

310. A communication system in accordance with claim 304 wherein:
the connected mobile processor executes at least one application program which processes the information contained in the electronic mail.

311. A communication system in accordance with claim 305 wherein:
the connected mobile processor executes at least one application program which processes the information contained in the electronic mail.

312. A communication system in accordance with claim 306 wherein:
the connected mobile processor executes at least one application program which processes the information contained in the electronic mail.

313. A communication system in accordance with claim 301 wherein:
after reception of the electronic mail by the destination processor, information is deleted from the electronic mail and is not transmitted by the wireless system.

314. A communication system in accordance with claim 302 wherein:
after reception of the electronic mail by the destination processor, information is deleted from the electronic mail and is not transmitted by the wireless system.

315. A communication system in accordance with claim 303 wherein:
after reception of the electronic mail by the destination processor, information is deleted from the electronic mail and is not transmitted by the wireless system.

316. A communication system in accordance with claim 304 wherein:
after reception of the electronic mail by the destination processor, information is deleted from the electronic mail and is not transmitted by the wireless system.

317. A communication system in accordance with claim 305 wherein:
after reception of the electronic mail by the destination processor, information is deleted from the electronic mail and is not transmitted by the wireless system.

318. A communication system in accordance with claim 306 wherein:
after reception of the electronic mail by the destination processor, information is deleted from the electronic mail and is not transmitted by the wireless system.

319. A communication system in accordance with claim 307 wherein:
after reception of the electronic mail by the destination processor, information is deleted from the electronic mail and is not transmitted by the wireless system.

320. A communication system in accordance with claim 308 wherein:
after reception of the electronic mail by the destination processor, information is deleted from the electronic mail and is not transmitted by the wireless system.

321. A communication system in accordance with claim 309 wherein:
after reception of the electronic mail by the destination processor, information is deleted from the electronic mail and is not transmitted by the wireless system.

322. A communication system in accordance with claim 310 wherein:
after reception of the electronic mail by the destination processor, information is deleted from the electronic mail and is not transmitted by the wireless system.

323. A communication system in accordance with claim 311 wherein:
after reception of the electronic mail by the destination processor, information is deleted from the electronic mail and is not transmitted by the wireless system.

324. A communication system in accordance with claim 312 wherein:
after reception of the electronic mail by the destination processor, information is deleted from the electronic mail and is not transmitted by the wireless system.

325. A communication system in accordance with claim 313 wherein:
the deleted information is a header in the electronic mail originated by the programmed processor.

326. A communication system in accordance with claim 314 wherein:
the deleted information is a header in the electronic mail originated by the programmed processor.

327. A communication system in accordance with claim 315 wherein:
the deleted information is a header in the electronic mail originated by the programmed processor.

328. A communication system in accordance with claim 316 wherein:
the deleted information is a header in the electronic mail originated by the programmed processor.

329. A communication system in accordance with claim 317 wherein:
the deleted information is a header in the electronic mail originated by the programmed processor.

330. A communication system in accordance with claim 318 wherein:
the deleted information is a header in the electronic mail originated by the programmed processor.

331. A communication system in accordance with claim 319 wherein:
the deleted information is a header in the electronic mail originated by the programmed processor.

332. A communication system in accordance with claim 320 wherein:
the deleted information is a header in the electronic mail originated by the programmed processor.

333. A communication system in accordance with claim 321 wherein:
the deleted information is a header in the electronic mail originated by the programmed processor.

334. A communication system in accordance with claim 322 wherein:
the deleted information is a header in the electronic mail originated by the programmed processor.

335. A communication system in accordance with claim 323 wherein:
the deleted information is a header in the electronic mail originated by the programmed processor.

336. A communication system in accordance with claim 324 wherein:
the deleted information is a header in the electronic mail originated by the programmed processor.

337. A communication system in accordance with claim 301 wherein:
after reception of the electronic mail by the destination processor, a check is performed to determine if the information contained in the electronic mail should be transmitted by the wireless system to the wireless device.

338. A communication system in accordance with claim 302 wherein:
after reception of the electronic mail by the destination processor, a check is performed to determine if the information contained in the electronic mail should be transmitted by the wireless system to the wireless device.

339. A communication system in accordance with claim 303 wherein:
after reception of the electronic mail by the destination processor, a check is performed to determine if the information contained in the electronic mail should be transmitted by the wireless system to the wireless device.

340. A communication system in accordance with claim 304 wherein:
after reception of the electronic mail by the destination processor, a check is performed to determine if the information contained in the electronic mail should be transmitted by the wireless system to the wireless device.

341. A communication system in accordance with claim 305 wherein:
after reception of the electronic mail by the destination processor, a check is performed to determine if the information contained in the electronic mail should be transmitted by the wireless system to the wireless device.

342. A communication system in accordance with claim 306 wherein:
after reception of the electronic mail by the destination processor, a check is performed to determine if the information contained in the electronic mail should be transmitted by the wireless system to the wireless device.

343. A communication system in accordance with claim 307 wherein:
after reception of the electronic mail by the destination processor, a check is performed to determine if the information contained in the electronic mail should be transmitted by the wireless system to the wireless device.

344. A communication system in accordance with claim 308 wherein:
after reception of the electronic mail by the destination processor, a check is performed to determine if the information contained in the electronic mail should be transmitted by the wireless system to the wireless device.

345. A communication system in accordance with claim 309 wherein:
after reception of the electronic mail by the destination processor, a check is performed to determine if the information contained in the electronic mail should be transmitted by the wireless system to the wireless device.

346. A communication system in accordance with claim 310 wherein:
after reception of the electronic mail by the destination processor, a check is performed to determine if the information contained in the electronic mail should be transmitted by the wireless system to the wireless device.

347. A communication system in accordance with claim 311 wherein:
after reception of the electronic mail by the destination processor, a check is performed to determine if the information contained in the electronic mail should be transmitted by the wireless system to the wireless device.

348. A communication system in accordance with claim 312 wherein:
after reception of the electronic mail by the destination processor, a check is performed to determine if the information contained in the electronic mail should be transmitted by the wireless system to the wireless device.

349. A communication system in accordance with claim 313 wherein:
after reception of the electronic mail by the destination processor, a check is performed to determine if the information contained in the electronic mail should be transmitted by the wireless system to the wireless device.

350. A communication system in accordance with claim 314 wherein:
after reception of the electronic mail by the destination processor, a check is performed to determine if the information contained in the electronic mail should be transmitted by the wireless system to the wireless device.

351. A communication system in accordance with claim 315 wherein:
after reception of the electronic mail by the destination processor, a check is performed to determine if the information contained in the electronic mail should be transmitted by the wireless system to the wireless device.

352. A communication system in accordance with claim 316 wherein:
after reception of the electronic mail by the destination processor, a check is performed to determine if the information contained in the electronic mail should be transmitted by the wireless system to the wireless device.

353. A communication system in accordance with claim 317 wherein:
after reception of the electronic mail by the destination processor, a check is performed to determine if the information contained in the electronic mail should be transmitted by the wireless system to the wireless device.

354. A communication system in accordance with claim 318 wherein:
after reception of the electronic mail by the destination processor, a check is performed to determine if the information contained in the electronic mail should be transmitted by the wireless system to the wireless device.

355. A communication system in accordance with claim 319 wherein:
after reception of the electronic mail by the destination processor, a check is performed to determine if the information contained in the electronic mail should be transmitted by the wireless system to the wireless device.

356. A communication system in accordance with claim 320 wherein:
after reception of the electronic mail by the destination processor, a check is performed to determine if the information contained in the electronic mail should be transmitted by the wireless system to the wireless device.

357. A communication system in accordance with claim 321 wherein:
after reception of the electronic mail by the destination processor, a check is performed to determine if the information contained in the electronic mail should be transmitted by the wireless system to the wireless device.

358. A communication system in accordance with claim 322 wherein:
after reception of the electronic mail by the destination processor, a check is performed to determine if the information contained in the electronic mail should be transmitted by the wireless system to the wireless device.

359. A communication system in accordance with claim 323 wherein:
after reception of the electronic mail by the destination processor, a check is performed to determine if the information contained in the electronic mail should be transmitted by the wireless system to the wireless device.

360. A communication system in accordance with claim 324 wherein:
   after reception of the electronic mail by the destination processor, a check is performed to determine if the information contained in the electronic mail should be transmitted by the wireless system to the wireless device.

361. A communication system in accordance with claim 325 wherein:
   after reception of the electronic mail by the destination processor, a check is performed to determine if the information contained in the electronic mail should be transmitted by the wireless system to the wireless device.

362. A communication system in accordance with claim 326 wherein:
   after reception of the electronic mail by the destination processor, a check is performed to determine if the information contained in the electronic mail should be transmitted by the wireless system to the wireless device.

363. A communication system in accordance with claim 327 wherein:
   after reception of the electronic mail by the destination processor, a check is performed to determine if the information contained in the electronic mail should be transmitted by the wireless system to the wireless device.

364. A communication system in accordance with claim 328 wherein:
   after reception of the electronic mail by the destination processor, a check is performed to determine if the information contained in the electronic mail should be transmitted by the wireless system to the wireless device.

365. A communication system in accordance with claim 329 wherein:
   after reception of the electronic mail by the destination processor, a check is performed to determine if the information contained in the electronic mail should be transmitted by the wireless system to the wireless device.

366. A communication system in accordance with claim 330 wherein:
   after reception of the electronic mail by the destination processor, a check is performed to determine if the information contained in the electronic mail should be transmitted by the wireless system to the wireless device.

367. A communication system in accordance with claim 331 wherein:
   after reception of the electronic mail by the destination processor, a check is performed to determine if the information contained in the electronic mail should be transmitted by the wireless system to the wireless device.

368. A communication system in accordance with claim 332 wherein:
   after reception of the electronic mail by the destination processor, a check is performed to determine if the information contained in the electronic mail should be transmitted by the wireless system to the wireless device.

369. A communication system in accordance with claim 333 wherein:
   after reception of the electronic mail by the destination processor, a check is performed to determine if the information contained in the electronic mail should be transmitted by the wireless system to the wireless device.

370. A communication system in accordance with claim 334 wherein:
   after reception of the electronic mail by the destination processor, a check is performed to determine if the information contained in the electronic mail should be transmitted by the wireless system to the wireless device.

371. A communication system in accordance with claim 335 wherein:
   after reception of the electronic mail by the destination processor, a check is performed to determine if the information contained in the electronic mail should be transmitted by the wireless system to the wireless device.

372. A communication system in accordance with claim 336 wherein:
   after reception of the electronic mail by the destination processor, a check is performed to determine if the information contained in the electronic mail should be transmitted by the wireless system to the wireless device.

373. A communication system in accordance with claim 337 wherein:
   the check is performed by a comparison of an identification of the wireless device with identifications of permissible wireless devices in the wireless system.

374. A communication system in accordance with claim 338 wherein:
   the check is performed by a comparison of an identification of the wireless device with identifications of permissible wireless devices in the wireless system.

375. A communication system in accordance with claim 339 wherein:
   the check is performed by a comparison of an identification of the wireless device with identifications of permissible wireless devices in the wireless system.

376. A communication system in accordance with claim 340 wherein:
   the check is performed by a comparison of an identification of the wireless device with identifications of permissible wireless devices in the wireless system.

377. A communication system in accordance with claim 341 wherein:
   the check is performed by a comparison of an identification of the wireless device with identifications of permissible wireless devices in the wireless system.

378. A communication system in accordance with claim 342 wherein:
   the check is performed by a comparison of an identification of the wireless device with identifications of permissible wireless devices in the wireless system.

379. A communication system in accordance with claim 343 wherein:
   the check is performed by a comparison of an identification of the wireless device with identifications of permissible wireless devices in the wireless system.

380. A communication system in accordance with claim 344 wherein:
   the check is performed by a comparison of an identification of the wireless device with identifications of permissible wireless devices in the wireless system.

381. A communication system in accordance with claim 345 wherein:

382. A communication system in accordance with claim 346 wherein:
the check is performed by a comparison of an identification of the wireless device with identifications of permissible wireless devices in the wireless system.

383. A communication system in accordance with claim 347 wherein:
the check is performed by a comparison of an identification of the wireless device with identifications of permissible wireless devices in the wireless system.

384. A communication system in accordance with claim 348 wherein:
the check is performed by a comparison of an identification of the wireless device with identifications of permissible wireless devices in the wireless system.

385. A communication system in accordance with claim 349 wherein:
the check is performed by a comparison of an identification of the wireless device with identifications of permissible wireless devices in the wireless system.

386. A communication system in accordance with claim 350 wherein:
the check is performed by a comparison of an identification of the wireless device with identifications of permissible wireless devices in the wireless system.

387. A communication system in accordance with claim 351 wherein:
the check is performed by a comparison of an identification of the wireless device with identifications of permissible wireless devices in the wireless system.

388. A communication system in accordance with claim 352 wherein:
the check is performed by a comparison of an identification of the wireless device with identifications of permissible wireless devices in the wireless system.

389. A communication system in accordance with claim 353 wherein:
the check is performed by a comparison of an identification of the wireless device with identifications of permissible wireless devices in the wireless system.

390. A communication system in accordance with claim 354 wherein:
the check is performed by a comparison of an identification of the wireless device with identifications of permissible wireless devices in the wireless system.

391. A communication system in accordance with claim 355 wherein:
the check is performed by a comparison of an identification of the wireless device with identifications of permissible wireless devices in the wireless system.

392. A communication system in accordance with claim 356 wherein:
the check is performed by a comparison of an identification of the wireless device with identifications of permissible wireless devices in the wireless system.

393. A communication system in accordance with claim 357 wherein:
the check is performed by a comparison of an identification of the wireless device with identifications of permissible wireless devices in the wireless system.

394. A communication system in accordance with claim 358 wherein:
the check is performed by a comparison of an identification of the wireless device with identifications of permissible wireless devices in the wireless system.

395. A communication system in accordance with claim 359 wherein:
the check is performed by a comparison of an identification of the wireless device with identifications of permissible wireless devices in the wireless system.

396. A communication system in accordance with claim 360 wherein:
the check is performed by a comparison of an identification of the wireless device with identifications of permissible wireless devices in the wireless system.

397. A communication system in accordance with claim 361 wherein:
the check is performed by a comparison of an identification of the wireless device with identifications of permissible wireless devices in the wireless system.

398. A communication system in accordance with claim 362 wherein:
the check is performed by a comparison of an identification of the wireless device with identifications of permissible wireless devices in the wireless system.

399. A communication system in accordance with claim 363 wherein:
the check is performed by a comparison of an identification of the wireless device with identifications of permissible wireless devices in the wireless system.

400. A communication system in accordance with claim 364 wherein:
the check is performed by a comparison of an identification of the wireless device with identifications of permissible wireless devices in the wireless system.

401. A communication system in accordance with claim 365 wherein:
the check is performed by a comparison of an identification of the wireless device with identifications of permissible wireless devices in the wireless system.

402. A communication system in accordance with claim 366 wherein:
the check is performed by a comparison of an identification of the wireless device with identifications of permissible wireless devices in the wireless system.

403. A communication system in accordance with claim 367 wherein:
the check is performed by a comparison of an identification of the wireless device with identifications of permissible wireless devices in the wireless system.

404. A communication system in accordance with claim 368 wherein:
the check is performed by a comparison of an identification of the wireless device with identifications of permissible wireless devices in the wireless system.

405. A communication system in accordance with claim 369 wherein:
the check is performed by a comparison of an identification of the wireless device with identifications of permissible wireless devices in the wireless system.

406. A communication system in accordance with claim 370 wherein:
the check is performed by a comparison of an identification of the wireless device with identifications of permissible wireless devices in the wireless system.

407. A communication system in accordance with claim 371 wherein:

the check is performed by a comparison of an identification of the wireless device with identifications of permissible wireless devices in the wireless system.

408. A communication system in accordance with claim 372 wherein:
the check is performed by a comparison of an identification of the wireless device with identifications of permissible wireless devices in the wireless system.

409. A communication system in accordance with claims 301–408 wherein:
the wireless system broadcasts the information contained in the electronic mail and the identification of the wireless device at a location in the wireless system to the wireless device, said location determined from information stored in the wireless system pertaining to a location of the wireless device within the wireless system.

410. A communication system in accordance with claim 301 wherein:
the connected mobile processor is a PC and the programmed processor is a mobile PC.

411. A communication system in accordance with claim 302 wherein:
the connected mobile processor is a PC and the programmed processor is a mobile PC.

412. A communication system in accordance with claim 303 wherein:
the connected mobile processor is a PC and the programmed processor is a mobile PC.

413. A communication system in accordance with claim 304 wherein:
the connected mobile processor is a PC and the programmed processor is a mobile PC.

414. A communication system in accordance with claim 305 wherein:
the connected mobile processor is a PC and the programmed processor is a mobile PC.

415. A communication system in accordance with claim 306 wherein:
the connected mobile processor is a PC and the programmed processor is a mobile PC.

416. A communication system in accordance with claim 307 wherein:
the connected mobile processor is a PC and the programmed processor is a mobile PC.

417. A communication system in accordance with claim 313 wherein:
the connected mobile processor is a PC and the programmed processor is a mobile PC.

418. A communication system in accordance with claim 325 wherein:
the connected mobile processor is a PC and the programmed processor is a mobile PC.

419. A communication system in accordance with claim 337 wherein:
the connected mobile processor is a PC and the programmed processor is a mobile PC.

420. A communication system in accordance with claim 373 wherein:
the connected mobile processor is a PC and the programmed processor is a mobile PC.

421. A communication system in accordance with claim 301 wherein:
the connected mobile processor is a PC and the programmed processor is a mobile PC; and
the wireless system broadcasts the information contained in the electronic mail and an identification of the wireless device at a location in the wireless system to the wireless device, said location determined from information stored in the wireless system pertaining-to a location of the wireless device within the wireless system.

422. In a communication system comprising a wireless system which communication system transmits electronic mail inputted to the communication system from mobile processors which execute electronic mail programming to originate the electronic mail and function as a destination of electronic mail, and a destination processor to which the electronic mail is transmitted from the mobile processors which originate the electronic mail and after reception of the electronic mail by the destination processor, information contained in the electronic mail and identifications of wireless devices in the wireless system are transmitted by the wireless system to the wireless devices and from the wireless devices to the mobile processors connected thereto, each of the mobile processors comprising:
a programmed processor which executes electronic mail programming to wirelessly originate the electronic mail and to function as a wireless destination of the information contained in the electronic mail, the originated electronic mail containing an address of the destination processor and the information.

423. The mobile processor in accordance with claim 422 wherein:
the electronic mail originated by the programmed processor also contains an identification of the wireless device and a recipient of the electronic mail to receive the information.

424. The mobile processor in accordance with claim 422 wherein:
the identification of the wireless device is a number.

425. The mobile processor in accordance with claim 422 wherein:
the identification of the wireless device is a number.

426. The mobile processor in accordance with claim 422 wherein:
the programmed processor executes at least one application program which processes the information contained in the electronic mail.

427. The mobile processor in accordance with claim 423 wherein:
the programmed processor executes at least one application program which processes the information contained in the electronic mail.

428. The mobile processor in accordance with claim 424 wherein:
the programmed processor executes at least one application program which processes the information contained in the electronic mail.

429. The mobile processor in accordance with claim 425 wherein:
the programmed processor executes at least one application program which processes the information contained in the electronic mail.

430. The mobile processor in accordance with claim 422 wherein:
after reception of the electronic mail by the destination processor, the identification of the wireless device is added to the information contained in the electronic mail.

431. The mobile processor in accordance with claim 426 wherein:

after reception of the electronic mail by the destination processor, the identification of the wireless device is added to the information contained in the electronic mail.

432. The mobile processor in accordance with claim 422 wherein:

after reception of the electronic mail by the destination processor, information is deleted from the electronic mail and is not transmitted by the wireless system.

433. The mobile processor in accordance with claim 423 wherein:

after reception of the electronic mail by the destination processor, information is deleted from the electronic mail and is not transmitted by the wireless system.

434. The mobile processor in accordance with claim 424 wherein:

after reception of the electronic mail by the destination processor, information is deleted from the electronic mail and is not transmitted by the wireless system.

435. The mobile processor in accordance with claim 425 wherein:

after reception of the electronic mail by the destination processor, information is deleted from the electronic mail and is not transmitted by the wireless system.

436. The mobile processor in accordance with claim 426 wherein:

after reception of the electronic mail by the destination processor, information is deleted from the electronic mail and is not transmitted by the wireless system.

437. The mobile processor in accordance with claim 427 wherein:

after reception of the electronic mail by the destination processor, information is deleted from the electronic mail and is not transmitted by the wireless system.

438. The mobile processor in accordance with claim 428 wherein:

after reception of the electronic mail by the destination processor, information is deleted from the electronic mail and is not transmitted by the wireless system.

439. The mobile processor in accordance with claim 429 wherein:

after reception of the electronic mail by the destination processor, information is deleted from the electronic mail and is not transmitted by the wireless system.

440. The mobile processor in accordance with claim 430 wherein:

after reception of the electronic mail by the destination processor, information is deleted from the electronic mail and is not transmitted by the wireless system.

441. The mobile processor in accordance with claim 431 wherein:

after reception of the electronic mail by the destination processor, information is deleted from the electronic mail and is not transmitted by the wireless system.

442. The mobile processor in accordance with claim 432 wherein:

the deleted information is a header in the electronic mail.

443. The mobile processor in accordance with claim 433 wherein:

the deleted information is a header in the electronic mail.

444. The mobile processor in accordance with claim 434 wherein:

the deleted information is a header in the electronic mail.

445. The mobile processor in accordance with claim 435 wherein:

the deleted information is a header in the electronic mail.

446. The mobile processor in accordance with claim 436 wherein:

the deleted information is a header in the electronic mail.

447. The mobile processor in accordance with claim 437 wherein:

the deleted information is a header in the electronic mail.

448. The mobile processor in accordance with claim 438 wherein:

the deleted information is a header in the electronic mail.

449. The mobile processor in accordance with claim 439 wherein:

the deleted information is a header in the electronic mail.

450. The mobile processor in accordance with claim 440 wherein:

the deleted information is a header in the electronic mail.

451. The mobile processor in accordance with claim 441 wherein:

the deleted information is a header in the electronic mail.

452. The mobile processor in accordance with claim 422 wherein:

after reception of the electronic mail by the destination processor, a check is performed to determine if the information contained in the electronic mail should be transmitted by the wireless system to the wireless device.

453. The mobile processor in accordance with claim 423 wherein:

after reception of the electronic mail by the destination processor, a check is performed to determine if the information contained in the electronic mail should be transmitted by the wireless system to the wireless device.

454. The mobile processor in accordance with claim 424 wherein:

after reception of the electronic mail by the destination processor, a check is performed to determine if the information contained in the electronic mail should be transmitted by the wireless system to the wireless device.

455. The mobile processor in accordance with claim 425 wherein:

after reception of the electronic mail by the destination processor, a check is performed to determine if the information contained in the electronic mail should be transmitted by the wireless system to the wireless device.

456. The mobile processor in accordance with claim 426 wherein:

after reception of the electronic mail by the destination processor, a check is performed to determine if the information contained in the electronic mail should be transmitted by the wireless system to the wireless device.

457. The mobile processor in accordance with claim 427 wherein:

after reception of the electronic mail by the destination processor, a check is performed to determine if the information contained in the electronic mail should be transmitted by the wireless system to the wireless device.

458. The mobile processor in accordance with claim 428 wherein:

after reception of the electronic mail by the destination processor, a check is performed to determine if the information contained in the electronic mail should be transmitted by the wireless system to the wireless device.

459. The mobile processor in accordance with claim 429 wherein:

after reception of the electronic mail by the destination processor, a check is performed to determine if the information contained in the electronic mail should be transmitted by the wireless system to the wireless device.

460. The mobile processor in accordance with claim 430 wherein:

after reception of the electronic mail by the destination processor, a check is performed to determine if the information contained in the electronic mail should be transmitted by the wireless system to the wireless device.

461. The mobile processor in accordance with claim 431 wherein:

after reception of the electronic mail by the destination processor, a check is performed to determine if the information contained in the electronic mail should be transmitted by the wireless system to the wireless device.

462. The mobile processor in accordance with claim 432 wherein:

after reception of the electronic mail by the destination processor, a check is performed to determine if the information contained in the electronic mail should be transmitted by the wireless system to the wireless device.

463. The mobile processor in accordance with claim 433 wherein:

after reception of the electronic mail by the destination processor, a check is performed to determine if the information contained in the electronic mail should be transmitted by the wireless system to the wireless device.

464. The mobile processor in accordance with claim 434 wherein:

after reception of the electronic mail by the destination processor, a check is performed to determine if the information contained in the electronic mail should be transmitted by the wireless system to the wireless device.

465. The mobile processor in accordance with claim 435 wherein:

after reception of the electronic mail by the destination processor, a check is performed to determine if the information contained in the electronic mail should be transmitted by the wireless system to the wireless device.

466. The mobile processor in accordance with claim 436 wherein:

after reception of the electronic mail by the destination processor, a check is performed to determine if the information contained in the electronic mail should be transmitted by the wireless system to the wireless device.

467. The mobile processor in accordance with claim 437 wherein:

after reception of the electronic mail by the destination processor, a check is performed to determine if the information contained in the electronic mail should be transmitted by the wireless system to the wireless device.

468. The mobile processor in accordance with claim 438 wherein:

after reception of the electronic mail by the destination processor, a check is performed to determine if the information contained in the electronic mail should be transmitted by the wireless system to the wireless device.

469. The mobile processor in accordance with claim 439 wherein:

after reception of the electronic mail by the destination processor, a check is performed to determine if the information contained in the electronic mail should be transmitted by the wireless system to the wireless device.

470. The mobile processor in accordance with claim 440 wherein:

after reception of the electronic mail by the destination processor, a check is performed to determine if the information contained in the electronic mail should be transmitted by the wireless system to the wireless device.

471. The mobile processor in accordance with claim 441 wherein:

after reception of the electronic mail by the destination processor, a check is performed to determine if the information contained in the electronic mail should be transmitted by the wireless system to the wireless device.

472. The mobile processor in accordance with claim 442 wherein:

after reception of the electronic mail by the destination processor, a check is performed to determine if the information contained in the electronic mail should be transmitted by the wireless system to the wireless device.

473. The mobile processor in accordance with claim 443 wherein:

after reception of the electronic mail by the destination processor, a check is performed to determine if the information contained in the electronic mail should be transmitted by the wireless system to the wireless device.

474. The mobile processor in accordance with claim 444 wherein:

after reception of the electronic mail by the destination processor, a check is performed to determine if the information contained in the electronic mail should be transmitted by the wireless system to the wireless device.

475. The mobile processor in accordance with claim 445 wherein:

after reception of the electronic mail by the destination processor, a check is performed to determine if the information contained in the electronic mail should be transmitted by the wireless system to the wireless device.

476. The mobile processor in accordance with claim 446 wherein:

after reception of the electronic mail by the destination processor, a check is performed to determine if the information contained in the electronic mail should be transmitted by the wireless system to the wireless device.

477. The mobile processor in accordance with claim 447 wherein:

after reception of the electronic mail by the destination processor, a check is performed to determine if the information contained in the electronic mail should be transmitted by the wireless system to the wireless device.

478. The mobile processor in accordance with claim 448 wherein:

after reception of the electronic mail by the destination processor, a check is performed to determine if the information contained in the electronic mail should be transmitted by the wireless system to the wireless device.

479. The mobile processor in accordance with claim 449 wherein:

after reception of the electronic mail by the destination processor, a check is performed to determine if the information contained in the electronic mail should be transmitted by the wireless system to the wireless device.

480. The mobile processor in accordance with claim 450 wherein:

after reception of the electronic mail by the destination processor, a check is performed to determine if the information contained in the electronic mail should be transmitted by the wireless system to the wireless device.

481. The mobile processor in accordance with claim 451 wherein:

after reception of the electronic mail by the destination processor, a check is performed to determine if the information contained in the electronic mail should be transmitted by the wireless system to the wireless device.

482. The mobile processor in accordance with claim 452 wherein:

the check is performed by a comparison of an identification of the wireless device with identifications of permissible wireless devices in the wireless system.

483. The mobile processor in accordance with claim 453 wherein:

the check is performed by a comparison of an identification of the wireless device with identifications of permissible wireless devices in the wireless system.

484. The mobile processor in accordance with claim 454 wherein:

the check is performed by a comparison of an identification of the wireless device with identifications of permissible wireless devices in the wireless system.

485. The mobile processor in accordance with claim 455 wherein:

the check is performed by a comparison of an identification of the wireless device with identifications of permissible wireless devices in the wireless system.

486. The mobile processor in accordance with claim 456 wherein:

the check is performed by a comparison of an identification of the wireless device with identifications of permissible wireless devices in the wireless system.

487. The mobile processor in accordance with claim 457 wherein:

the check is performed by a comparison of an identification of the wireless device with identifications of permissible wireless devices in the wireless system.

488. The mobile processor in accordance with claim 458 wherein:

the check is performed by a comparison of an identification of the wireless device with identifications of permissible wireless devices in the wireless system.

489. The mobile processor in accordance with claim 459 wherein:

the check is performed by a comparison of an identification of the wireless device with identifications of permissible wireless devices in the wireless system.

490. The mobile processor in accordance with claim 460 wherein:

the check is performed by a comparison of an identification of the wireless device with identifications of permissible wireless devices in the wireless system.

491. The mobile processor in accordance with claim 461 wherein:

the check is performed by a comparison of an identification of the wireless device with identifications of permissible wireless devices in the wireless system.

492. The mobile processor in accordance with claim 462 wherein:

the check is performed by a comparison of an identification of the wireless device with identifications of permissible wireless devices in the wireless system.

493. The mobile processor in accordance with claim 463 wherein:

the check is performed by a comparison of an identification of the wireless device with identifications of permissible wireless devices in the wireless system.

494. The mobile processor in accordance with claim 464 wherein:

the check is performed by a comparison of an identification of the wireless device with identifications of permissible wireless devices in the wireless system.

495. The mobile processor in accordance with claim 465 wherein:

the check is performed by a comparison of an identification of the wireless device with identifications of permissible wireless devices in the wireless system.

496. The mobile processor in accordance with claim 466 wherein:

the check is performed by a comparison of an identification of the wireless device with identifications of permissible wireless devices in the wireless system.

497. The mobile processor in accordance with claim 467 wherein:

the check is performed by a comparison of an identification of the wireless device with identifications of permissible wireless devices in the wireless system.

498. The mobile processor in accordance with claim 468 wherein:

the check is performed by a comparison of an identification of the wireless device with identifications of permissible wireless devices in the wireless system.

499. The mobile processor in accordance with claim 469 wherein:

the check is performed by a comparison of an identification of the wireless device with identifications of permissible wireless devices in the wireless system.

500. The mobile processor in accordance with claim 470 wherein:

the check is performed by a comparison of an identification of the wireless device with identifications of permissible wireless devices in the wireless system.

501. The mobile processor in accordance with claim 471 wherein:

the check is performed by a comparison of an identification of the wireless device with identifications of permissible wireless devices in the wireless system.

502. The mobile processor in accordance with claim 472 wherein:
the check is performed by a comparison of an identification of the wireless device with identifications of permissible wireless devices in the wireless system.

503. The mobile processor in accordance with claim 473 wherein:
the check is performed by a comparison of an identification of the wireless device with identifications of permissible wireless devices in the wireless system.

504. The mobile processor in accordance with claim 474 wherein:
the check is performed by a comparison of an identification of the wireless device with identifications of permissible wireless devices in the wireless system.

505. The mobile processor in accordance with claim 475 wherein:
the check is performed by a comparison of an identification of the wireless device with identifications of permissible wireless devices in the wireless system.

506. The mobile processor in accordance with claim 476 wherein:
the check is performed by a comparison of an identification of the wireless device with identifications of permissible wireless devices in the wireless system.

507. The mobile processor in accordance with claim 477 wherein:
the check is performed by a comparison of an identification of the wireless device with identifications of permissible wireless devices in the wireless system.

508. The mobile processor in accordance with claim 478 wherein:
the check is performed by a comparison of an identification of the wireless device with identifications of permissible wireless devices in the wireless system.

509. The mobile processor in accordance with claim 479 wherein:
the check is performed by a comparison of an identification of the wireless device with identifications of permissible wireless devices in the wireless system.

510. The mobile processor in accordance with claim 480 wherein:
the check is performed by a comparison of an identification of the wireless device with identifications of permissible wireless devices in the wireless system.

511. The mobile processors in accordance with claim 481 wherein:
the check is performed by a comparison of an identification of the wireless device with identifications of permissible wireless devices in the wireless system.

512. The mobile processor in accordance with claims 422–511 wherein:
the wireless system broadcasts the information contained in the electronic mail and the identification of the wireless device at a location in the wireless system, said location determined from information stored in the wireless system pertaining to a location of the wireless device within the wireless system.

513. A mobile processor for use in a communication system including a wireless system which transmits and receives wireless communications including electronic mail transmitted to and received by mobile processors, wherein each of the mobile processors executes electronic mail programming to function as an originator or destination of electronic mail, the mobile processor comprising:
a programmed processor which executes electronic mail programming to wirelessly transmit electronic mail to the communication system and wirelessly receive electronic mail from the communication system; and
wherein when the programmed processor sends electronic mail to the communication system containing an address of a destination processor included in the communication system and information contained in the electronic mail, the destination processor receives the information contained in the electronic mail, and after receiving the information contained in the electronic mail, an identification of a wireless device functioning as a wireless destination of the information contained in the electronic mail and the information contained in the electronic mail are transmitted by the wireless system and broadcast to the wireless device which receives the information contained in the electronic mail and transmits the information contained in the electronic mail to one of the mobile processors connected thereto.

514. A mobile processor in accordance with claim 513 wherein:
the electronic mail originated by the programmed processor also contains an identification of the wireless device and a recipient of the electronic mail to receive the information.

515. A mobile processor in accordance with claim 513 wherein:
the identification of the wireless device is a number.

516. A mobile processor in accordance with claim 514 wherein:
the identification of the wireless device is a number.

517. A mobile processor in accordance with claim 513 wherein:
the programmed processor executes at least one application program which processes the information contained in the electronic mail.

518. A mobile processor in accordance with claim 514 wherein:
the programmed processor executes at least one application program which processes the information contained in the electronic mail.

519. A mobile processor in accordance with claim 515 wherein:
the programmed processor executes at least one application program which processes the information contained in the electronic mail.

520. A mobile processor in accordance with claim 516 wherein:
the programmed processor executes at least one application program which processes the information contained in the electronic mail.

521. A mobile processor in accordance with claim 513 wherein:
after reception of the electronic mail by the destination processor, the identification of the wireless device is added to the information contained in the electronic mail.

522. A mobile processor in accordance with claim 513 wherein:
after reception of the electronic mail by the destination processor, information is deleted from the electronic mail and is not transmitted by the wireless system.

523. A mobile processor in accordance with claim 514 wherein:
after reception of the electronic mail by the destination processor, information is deleted from the electronic mail and is not transmitted by the wireless system.

524. A mobile processor in accordance with claim 515 wherein:
after reception of the electronic mail by the destination processor, information is deleted from the electronic mail and is not transmitted by the wireless system.

525. A mobile processor in accordance with claim 516 wherein:
after reception of the electronic mail by the destination processor, information is deleted from the electronic mail and is not transmitted by the wireless system.

526. A mobile processor in accordance with claim 517 wherein:
after reception of the electronic mail by the destination processor, information is deleted from the electronic mail and is not transmitted by the wireless system.

527. A mobile processor in accordance with claim 518 wherein:
after reception of the electronic mail by the destination processor, information is deleted from the electronic mail and is not transmitted by the wireless system.

528. A mobile processor in accordance with claim 519 wherein:
after reception of the electronic mail by the destination processor, information is deleted from the electronic mail and is not transmitted by the wireless system.

529. A mobile processor in accordance with claim 520 wherein:
after reception of the electronic mail by the destination processor, information is deleted from the electronic mail and is not transmitted by the wireless system.

530. A mobile processor in accordance with claim 522 wherein:
the deleted information is a header in the electronic mail transmitted by the programmed processor.

531. A mobile processor in accordance with claim 523 wherein:
the deleted information is a header in the electronic mail transmitted by the programmed processor.

532. A mobile processor in accordance with claim 524 wherein:
the deleted information is a header in the electronic mail transmitted by the programmed processor.

533. A mobile processor in accordance with claim 525 wherein:
the deleted information is a header in the electronic mail transmitted by the programmed processor.

534. A mobile processor in accordance with claim 526 wherein:
the deleted information is a header in the electronic mail transmitted by the programmed processor.

535. A mobile processor in accordance with claim 527 wherein:
the deleted information is a header in the electronic mail transmitted by the programmed processor.

536. A mobile processor in accordance with claim 528 wherein:
the deleted information is a header in the electronic mail transmitted by the programmed processor.

537. A mobile processor in accordance with claim 529 wherein:
the deleted information is a header in the electronic mail transmitted by the programmed processor.

538. A mobile processor in accordance with claim 513 wherein:
after reception of the electronic mail by the destination processor, a check is performed to determine if the information contained in the electronic mail should be transmitted by the wireless system to the wireless device.

539. A mobile processor in accordance with claim 514 wherein:
after reception of the electronic mail by the destination processor, a check is performed to determine if the information contained in the electronic mail should be transmitted by the wireless system to the wireless device.

540. A mobile processor in accordance with claim 515 wherein:
after reception of the electronic mail by the destination processor, a check is performed to determine if the information contained in the electronic mail should be transmitted by the wireless system to the wireless device.

541. A mobile processor in accordance with claim 516 wherein:
after reception of the electronic mail by the destination processor, a check is performed to determine if the information contained in the electronic mail should be transmitted by the wireless system to the wireless device.

542. A mobile processor in accordance with claim 517 wherein:
after reception of the electronic mail by the destination processor, a check is performed to determine if the information contained in the electronic mail should be transmitted by the wireless system to the wireless device.

543. A mobile processor in accordance with claim 518 wherein:
after reception of the electronic mail by the destination processor, a check is performed to determine if the information contained in the electronic mail should be transmitted by the wireless system to the wireless device.

544. A mobile processor in accordance with claim 519 wherein:
after reception of the electronic mail by the destination processor, a check is performed to determine if the information contained in the electronic mail should be transmitted by the wireless system to the wireless device.

545. A mobile processor in accordance with claim 520 wherein:
after reception of the electronic mail by the destination processor, a check is performed to determine if the information contained in the electronic mail should be transmitted by the wireless system to the wireless device.

546. A mobile processor in accordance with claim 521 wherein:
after reception of the electronic mail by the destination processor, a check is performed to determine if the information contained in the electronic mail should be transmitted by the wireless system to the wireless device.

547. A mobile processor in accordance with claim 522 wherein:
after reception of the electronic mail by the destination processor, a check is performed to determine if the information contained in the electronic mail should be transmitted by the wireless system to the wireless device.

548. A mobile processor in accordance with claim 523 wherein:
after reception of the electronic mail by the destination processor, a check is performed to determine if the information contained in the electronic mail should be transmitted by the wireless system to the wireless device.

549. A mobile processor in accordance with claim 424 wherein:
after reception of the electronic mail by the destination processor, a check is performed to determine if the information contained in the electronic mail should be transmitted by the wireless system to the wireless device.

550. A mobile processor in accordance with claim 525 wherein:
after reception of the electronic mail by the destination processor, a check is performed to determine if the information contained in the electronic mail should be transmitted by the wireless system to the wireless device.

551. A mobile processor in accordance with claim 526 wherein:
after reception of the electronic mail by the destination processor, a check is performed to determine if the information contained in the electronic mail should be transmitted by the wireless system to the wireless device.

552. A mobile processor in accordance with claim 527 wherein:
after reception of the electronic mail by the destination processor, a check is performed to determine if the information contained in the electronic mail should be transmitted by the wireless system to the wireless device.

553. A mobile processor in accordance with claim 528 wherein:
after reception of the electronic mail by the destination processor, a check is performed to determine if the information contained in the electronic mail should be transmitted by the wireless system to the wireless device.

554. A mobile processor in accordance with claim 529 wherein:
after reception of the electronic mail by the destination processor, a check is performed to determine if the information contained in the electronic mail should be transmitted by the wireless system to the wireless device.

555. A mobile processor in accordance with claim 530 wherein:
after reception of the electronic mail by the destination processor, a check is performed to determine if the information contained in the electronic mail should be transmitted by the wireless system to the wireless device.

556. A mobile processor in accordance with claim 531 wherein:
after reception of the electronic mail by the destination processor, a check is performed to determine if the information contained in the electronic mail should be transmitted by the wireless system to the wireless device.

557. A mobile processor in accordance with claim 532 wherein:
after reception of the electronic mail by the destination processor, a check is performed to determine if the information contained in the electronic mail should be transmitted by the wireless system to the wireless device.

558. A mobile processor in accordance with claim 533 wherein:
after reception of the electronic mail by the destination processor, a check is performed to determine if the information contained in the electronic mail should be transmitted by the wireless system to the wireless device.

559. A mobile processor in accordance with claim 534 wherein:
after reception of the electronic mail by the destination processor, a check is performed to determine if the information contained in the electronic mail should be transmitted by the wireless system to the wireless device.

560. A mobile processor in accordance with claim 535 wherein:
after reception of the electronic mail by the destination processor, a check is performed to determine if the information contained in the electronic mail should be transmitted by the wireless system to the wireless device.

561. A mobile processor in accordance with claim 536 wherein:
after reception of the electronic mail by the destination processor, a check is performed to determine if the information contained in the electronic mail should be transmitted by the wireless system to the wireless device.

562. A mobile processor in accordance with claim 537 wherein:
after reception of the electronic mail by the destination processor, a check is performed to determine if the information contained in the electronic mail should be transmitted by the wireless system to the wireless device.

563. A mobile processor in accordance with claim 538 wherein:
the check is performed by a comparison of an identification of the wireless device with identifications of permissible wireless devices in the wireless system.

564. A mobile processor in accordance with claim 539 wherein:
the check is performed by a comparison of an identification of the wireless device with identifications of permissible wireless devices in the wireless system.

565. A mobile processor in accordance with claim 540 wherein:
the check is performed by a comparison of an identification of the wireless device with identifications of permissible wireless devices in the wireless system.

566. A mobile processor in accordance with claim 541 wherein:
the check is performed by a comparison of an identification of the wireless device with identifications of permissible wireless devices in the wireless system.

567. A mobile processor in accordance with claim 542 wherein:
the check is performed by a comparison of an identification of the wireless device with identifications of permissible wireless devices in the wireless system.

568. A mobile processor in accordance with claim 543 wherein:

569. A mobile processor in accordance with claim 544 wherein:

the check is performed by a comparison of an identification of the wireless device with identifications of permissible wireless devices in the wireless system.

570. A mobile processor in accordance with claim 545 wherein:

the check is performed by a comparison of an identification of the wireless device with identifications of permissible wireless devices in the wireless system.

571. A mobile processor in accordance with claim 546 wherein:

the check is performed by a comparison of an identification of the wireless device with identifications of permissible wireless devices in the wireless system.

572. A mobile processor in accordance with claim 547 wherein:

the check is performed by a comparison of an identification of the wireless device with identifications of permissible wireless devices in the wireless system.

573. A mobile processor in accordance with claim 548 wherein:

the check is performed by a comparison of an identification of the wireless device with identifications of permissible wireless devices in the wireless system.

574. A mobile processor in accordance with claim 549 wherein:

the check is performed by a comparison of an identification of the wireless device with identifications of permissible wireless devices in the wireless system.

575. A mobile processor in accordance with claim 550 wherein:

the check is performed by a comparison of an identification of the wireless device with identifications of permissible wireless devices in the wireless system.

576. A mobile processor in accordance with claim 551 wherein:

the check is performed by a comparison of an identification of the wireless device with identifications of permissible wireless devices in the wireless system.

577. A mobile processor in accordance with claim 552 wherein:

the check is performed by a comparison of an identification of the wireless device with identifications of permissible wireless devices in the wireless system.

578. A mobile processor in accordance with claim 553 wherein:

the check is performed by a comparison of an identification of the wireless device with identifications of permissible wireless devices in the wireless system.

579. A mobile processor in accordance with claim 554 wherein:

the check is performed by a comparison of an identification of the wireless device with identifications of permissible wireless devices in the wireless system.

580. A mobile processor in accordance with claim 555 wherein:

the check is performed by a comparison of an identification of the wireless device with identifications of permissible wireless devices in the wireless system.

581. A mobile processor in accordance with claim 556 wherein:

the check is performed by a comparison of an identification of the wireless device with identifications of permissible wireless devices in the wireless system.

582. A mobile processor in accordance with claim 557 wherein:

the check is performed by a comparison of an identification of the wireless device with identifications of permissible wireless devices in the wireless system.

583. A mobile processor in accordance with claim 558 wherein:

the check is performed by a comparison of an identification of the wireless device with identifications of permissible wireless devices in the wireless system.

584. A mobile processor in accordance with claim 559 wherein:

the check is performed by a comparison of an identification of the wireless device with identifications of permissible wireless devices in the wireless system.

585. A mobile processor in accordance with claim 560 wherein:

the check is performed by a comparison of an identification of the wireless device with identifications of permissible wireless devices in the wireless system.

586. A mobile processor in accordance with claim 561 wherein:

the check is performed by a comparison of an identification of the wireless device with identifications of permissible wireless devices in the wireless system.

587. A mobile processor in accordance with claim 562 wherein:

the check is performed by a comparison of an identification of the wireless device with identifications of permissible wireless devices in the wireless system.

588. A mobile processor in accordance with claims 513–587 wherein:

the wireless system broadcasts the information contained in the electronic mail and the identification of the wireless device at a location in the wireless system, said location determined from information stored in the wireless system pertaining to a location of the wireless device within the wireless system.

589. In a communication system comprising a wireless system which communication system transmits electronic mail inputted to the communication system from an originating device, processors which execute electronic mail programming to function as a destination of electronic mail, and a destination processor to which the electronic mail is transmitted from the originating device and after reception of the electronic mail by the destination processor, information contained in the electronic mail and an identification of a wireless device in the wireless system are transmitted by the wireless system to the wireless device and from the wireless device to one of the processors connected thereto, the originating device comprising:

a programmed processor which executes electronic mail programming to originate the electronic mail, the electronic mail containing an address of the destination processor and the information contained in the electronic mail which is transmitted to the destination processor.

590. An originating device in accordance with claim 589 wherein:

the electronic mail originated by the programmed processor also contains an identification of the wireless device and a recipient of the electronic mail to receive the information at the one mobile processor.

591. An originating device in accordance with claim 589 wherein:

the identification of the wireless device is a number.

592. An originating device in accordance with claim 590 wherein:

the identification of the wireless device is a number.

593. An originating device in accordance with claim 589 wherein:

the programmed processor executes electronic mail programming to originate electronic mail which is wirelessly transmitted from the programmed processor and by the communication system; and the one processor executes electronic mail programming to originate electronic mail which is wirelessly transmitted from the one processor and by the communication system.

594. An originating device in accordance with claim 590 wherein:

the programmed processor executes electronic mail programming to originate electronic mail which is wirelessly transmitted from the programmed processor and by the communication system; and the one processor executes electronic mail programming to originate electronic mail which is wirelessly transmitted from the one processor and by the communication system.

595. An originating device in accordance with claim 591 wherein:

the programmed processor executes electronic mail programming to originate electronic mail which is wirelessly transmitted from the programmed processor and by the communication system; and the one processor executes electronic mail programming to originate electronic mail which is wirelessly transmitted from the one processor and by the communication system.

596. An originating device in accordance with claims 589–595 wherein:

the one processor executes at least one application program which processes the information.

597. An originating device in accordance with claim 589 wherein:

after reception of the electronic mail by the destination processor, the identification of the wireless device is added to the information contained in the electronic mail before transmission by the wireless system.

598. An originating processor in accordance with claim 589 wherein:

after reception of the electronic mail by the destination processor, information is deleted from the electronic mail and is not transmitted by the wireless system.

599. An originating device in accordance with claim 598 wherein:

the deleted information is a header in the electronic mail inputted by the originating device.

600. An originating device in accordance with claim 589 wherein:

after reception of the electronic mail by the destination processor, a check is performed to determine if the information contained in the electronic mail should be transmitted by the wireless system to the wireless device.

601. An originating device in accordance with claim 600 wherein:

the check is performed by a comparison of an identification of the wireless device with identifications of the permissible wireless devices in the wireless system.

602. An originating device in accordance with claim 589 wherein:

the wireless system broadcasts the information contained in the electronic mail and an identification of the wireless device at a location in the wireless system to the wireless device, said location determined from information stored in the wireless system pertaining to a location of the wireless device within the wireless system.

603. An originating device in accordance with claim 589 wherein:

the one processor is a PC and the programmed processor is a PC.

604. In a communication system comprising a wireless system which communication system transmits electronic mail inputted to the communication system from an originating device which executes electronic mail programming to originate the electronic mail, processors which execute electronic mail programming to function as a destination of electronic mail, and a destination processor to which the electronic mail is transmitted from the originating device and after reception of the electronic mail by the destination processor, information contained in the electronic mail and an identification of a wireless device in the wireless system are transmitted by the wireless system to the wireless device and from the wireless device to one of the processors, the wireless device and processor comprising:

a wireless receiver connected to the one processor with the processor receiving the information contained in the electronic mail after the identification of the wireless device is detected by the wireless receiver in a broadcast by the wireless system.

605. A wireless device and processor in accordance with claim 604 wherein:

the electronic mail originated by the originating device also contains an identification of the wireless device and a recipient of the electronic mail to receive the information at the one processor.

606. A wireless device and processor in accordance with claim 605 wherein:

the identification of the wireless device is a number.

607. A wireless device and processor in accordance with claim 604 wherein:

the originating device is a processor, executes electronic mail programming to originate electronic mail which is wirelessly transmitted from the originating device and by the communication system; and the one processor executes electronic mail programming to originate electronic mail which is wirelessly transmitted from the one processor and by the communication system.

608. A wireless device and processor in accordance with claim 605 wherein:

the originating device is a processor, executes electronic mail programming to originate electronic mail which is wirelessly transmitted from the originating device and by the communication system; and the one processor executes electronic mail programming to originate electronic mail which is wirelessly transmitted from the one processor and by the communication system.

609. A wireless device and processor in accordance with claim 606 wherein:

the originating device is a processor, executes electronic mail programming to originate electronic mail which is wirelessly transmitted from the originating device and by the communication system; and the one processor executes electronic mail programming to originate electronic mail which is wirelessly transmitted from the one processor and by the communication system.

610. A wireless device and processor in accordance with claims 604–609 wherein:

the one processor executes at least one application program which processes the information contained in the electronic mail.

611. A wireless device and processor in accordance with claim 604 wherein:

after reception of the electronic mail by the destination processor, information is deleted from the electronic mail and is not transmitted by the wireless system.

612. A wireless device and processor in accordance with claim 611 wherein:

the deleted information is a header in the electronic mail inputted by the originating device.

613. A wireless device and processor in accordance with claim 604 wherein:

after reception by the destination processor, a check is performed to determine if the information contained in the electronic mail should be transmitted by the wireless system to the wireless device.

614. A wireless device and processor in accordance with claim 613 wherein:

the check is performed by a comparison of an identification of the wireless device with identifications of permissible wireless devices in the wireless system.

615. A wireless device and processor in accordance with claim 604 wherein:

the wireless system broadcasts the information contained in the electronic mail and an identification of the wireless device at a location in the wireless system to the wireless device, said location determined from information stored in the wireless system pertaining to a location of the wireless device within the wireless system.

616. A wireless device and processor in accordance with claim 604 wherein:

the one processor is a PC and the originating device is a PC.

617. A communication system comprising:

devices, each device comprising a wireless device connected to a processor which processor executes electronic mail programming to function as a destination of electronic mail, the wireless device after receiving a broadcast of information contained in the electronic mail and an identification of the wireless device transmits the information contained in the electronic mail to the connected processor;

a wireless system which transmits the information contained in the electronic mail and the identification of the wireless device and broadcasts the information contained in the electronic mail and the identification of the wireless device;

a programmed processor which executes electronic mail programming to originate the electronic mail which contains an address of a destination to which the electronic mail is transmitted and the information contained in the electronic mail; and a destination processor which receives the electronic mail and is the destination of the electronic mail; and wherein after reception of the electronic mail by the destination processor, the information contained in the electronic mail and the identification of the wireless device are transmitted to the wireless system and broadcast to the wireless device.

618. A communication system in accordance with claim 617 wherein:

the electronic mail originated by the programmed processor also contains an identification of the wireless device and a recipient of the electronic mail to receive the information at the connected processor.

619. A communication system in accordance with claim 617 wherein:

the identification of the wireless device is a number.

620. A communication system in accordance with claim 617 wherein:

the programmed processor executes electronic mail programming to originate electronic mail which is wirelessly transmitted from the programmed processor and by the communication system; and the connected processor executes electronic mail programming to originate electronic mail which is wirelessly transmitted from the connected processor and by the communication system.

621. A communication system in accordance with claim 618 wherein:

the programmed processor executes electronic mail programming to originate electronic mail which is wirelessly transmitted from the programmed processor and by the communication system; and the connected processor executes electronic mail programming to originate electronic mail which is wirelessly transmitted from the connected processor and by the communication system.

622. A communication system in accordance with claim 619 wherein:

the programmed processor executes electronic mail programming to originate electronic mail which is wirelessly transmitted from the programmed processor and by the communication system; and the connected processor executes electronic mail programming to originate electronic mail which is wirelessly transmitted from the connected processor and by the communication system.

623. A communication system in accordance with claims 617–622 wherein:

the connected processor executes at least one application program which processes the information contained in the electronic mail.

624. A communication system in accordance with claim 617 wherein:

after reception of the electronic mail by the destination processor, information is deleted from the electronic mail and is not transmitted by the wireless system.

625. A communication system in accordance with claim 624 wherein:

the deleted information is a header in the electronic mail originated by the programmed processor.

626. A communication system in accordance with claim 617 wherein:

the connected processor is a PC and the programmed processor is a PC.

627. A communication system in accordance with claim 617 wherein:

after reception of the electronic mail by the destination processor, a check is performed to determine if the information contained in the electronic mail should be transmitted by the wireless system to the wireless device.

628. A communication system in accordance with claim 627 wherein:
the check is performed by a comparison of an identification of the wireless device with identifications of permissible wireless devices in the wireless system.

629. A communication system in accordance with claim 617 wherein:
the wireless system broadcasts the information contained in the electronic mail and the identification of the wireless device at a location in the wireless system to the wireless device, said location determined from information stored in the wireless system pertaining to a location of the wireless device within the wireless system.

630. In a communication system comprising a wireless system which communication system transmits electronic mail inputted to the communication system from processors which execute electronic mail programming to originate the electronic mail and function as a destination of electronic mail, and a destination processor to which the electronic mail is transmitted from the processors which originate the electronic mail and after reception of the electronic mail by the destination processor, information contained in the electronic mail and identifications of wireless devices in the wireless system are transmitted by the wireless system to the wireless devices and from the wireless devices to the processors connected thereto, each of the processors comprising:
a programmed processor which executes electronic mail programming to wirelessly originate the electronic mail and to function as a wireless destination of the information contained in the electronic mail, the originated electronic mail containing an address of the destination processor and the information.

631. The processor in accordance with claim 630 wherein:
the electronic mail originated by the programmed processor also contains an identification of the wireless device and a recipient of the electronic mail to receive the information.

632. The processor in accordance with claim 630 wherein:
the identification of the wireless device is a number.

633. The processor in accordance with claim 631 wherein:
the identification of the wireless device is a number.

634. The processor in accordance with claims 630–633 wherein:
the programmed processor executes at least one application program which processes the information contained in the electronic mail.

635. The processor in accordance with claim 630 wherein:
after reception of the electronic mail by the destination processor, the identification of the wireless device is added to the information contained in the electronic mail.

636. The processor in accordance with claim 630 wherein:
after reception of the electronic mail by the destination processor, information is deleted from the electronic mail is not transmitted by the wireless system.

637. The processor in accordance with claim 636 wherein:
the deleted information is a header in the electronic mail originated by the programmed processor.

638. The processor in accordance with claim 630 wherein:
after reception of the electronic mail by the destination processor, a check is performed to determine if the information contained in the electronic mail should be transmitted by the wireless system to the wireless device.

639. The processor in accordance with claim 638 wherein:
the check is performed by a comparison of an identification of the wireless device with identifications of permissible wireless devices in the wireless system.

640. The processor in accordance with claim 630 wherein:
the wireless system broadcasts the information contained in the electronic mail and the identification of the wireless device at a location in the wireless system, said location determined from information within the wireless system pertaining to a location of the wireless device within the wireless system.

641. A processor for use in a communication system including a wireless system which transmits and receives wireless communications including electronic mail to and from processors, wherein the processor executes electronic mail programming to function as an originator or destination of electronic mail, the processor comprising:
a programmed processor which executes electronic mail programming to wirelessly transmit electronic mail to the communication system and wirelessly receive electronic mail from the communication system; and wherein
when the programmed processor sends electronic mail to the communication system containing an address of a destination processor included in the communication system and information contained in the electronic mail, the destination processor receives the information contained in the electronic mail, and after receiving the information contained in the electronic mail, an identification of a wireless device functioning as a wireless destination of the information and the information contained in the electronic mail are transmitted by the wireless system and broadcast to the wireless device which receives the information contained in the electronic mail and transmits the information contained in the electronic mail to one of the processors connected thereto.

642. A processor in accordance with claim 641 wherein:
the electronic mail originated by the programmed processor also contains an identification of the wireless device and a recipient of the electronic mail to receive the information.

643. A processor in accordance with claim 641 wherein:
the identification of the wireless device is a number.

644. A processor in accordance with claim 642 wherein:
the identification of the wireless device is a number.

645. A processor in accordance with claims 641–644 wherein:
the programmed processor executes at least one application program which processes the information contained in the electronic mail.

646. A processor in accordance with claim 641 wherein:
after reception of the electronic mail by the destination processor, the identification of the wireless device is added to the information contained in the electronic mail.

647. A processor in accordance with claim 641 wherein:
after reception of the electronic mail by the destination processor, information is deleted from the electronic mail and is not transmitted by the wireless system.

648. A processor in accordance with claim 647 wherein:
the deleted information is a header in the electronic mail transmitted by the programmed processor.

649. A processor in accordance with claim 641 wherein:
after reception of the electronic mail by the destination processor, a check is performed to determine if the information contained in the electronic mail should be transmitted by the wireless system to the wireless device.

650. A processor in accordance with claim 649 wherein:
the check is performed by a comparison of an identification of the wireless device with identifications of permissible wireless devices in the wireless system.

651. A processor in accordance with claim 641 wherein:
the wireless system broadcasts the information contained in the electronic mail and the identification of the wireless device at a location in the wireless system, said location determined from information stored in the wireless system pertaining to a location of the wireless device within the wireless system.

652. A computer program stored on a storage medium for use in a communication system comprising a wireless system which communication system transmits electronic mail inputted to the communication system from an originating device, mobile processors which execute electronic mail programming to function as a destination of electronic mail, and a destination processor in the communication system to which the electronic mail is transmitted from the originating device, said computer program when executed causes said destination processor to perform the steps of:

receiving the electronic mail from the originating device; and transmitting information contained in the electronic mail and an identification of a wireless device from the destination processor, wherein the wireless system thereafter broadcasts the information contained in the electronic mail and the identification to the wireless device, the wireless device transmits the information contained in the electronic mail to one of the mobile processors connected thereto, and wherein the electronic mail from the originating device includes an address of the destination processor and the information to be transmitted.

653. A computer program in accordance with claim 652, wherein said computer program when executed causes said destination processor to perform the step of:

adding, after reception of the electronic mail by the destination processor, the identification of the wireless device to the information contained in the electronic mail before transmission by the wireless system.

654. A computer program in accordance with claim 652, wherein said computer program when executed causes said destination processor to perform the step of:

deleting, after reception of the electronic mail by the destination processor information from the electronic mail; and not transmitting deleted information by the wireless system.

655. A computer program in accordance with claim 652 wherein said computer program when executed causes said destination processor to perform the step of:

performing a check, after reception of the electronic mail by the destination processor, to determine if the information contained in the electronic mail should be transmitted by the wireless system to the wireless device.

656. A computer program in accordance with claim 652, wherein said computer program when executed causes said destination processor to perform the step of:

processing, after reception of the electronic mail by the destination processor, the information contained in the electronic mail; and transmitting the processed information in packets by the wireless system.

657. A computer program in accordance with claim 652, wherein said identification is a number serving as a mobile identification (ID) of said wireless device.

658. A computer program in accordance with claim 657, wherein information indicating a destination of said electronic mail contained in said electronic mail is converted to said mobile ID.

659. A destination processor for use in a communication system comprising a wireless system, which communication system transmits electronic mail inputted to the communication system from an originating device, mobile processors which execute electronic mail programming to function as a destination of electronic mail, and said destination processor in the communication system to which the electronic mail is transmitted from the originating device, said destination processor comprising:

a processor which receives the electronic mail from the originating device, and transmits information contained in the electronic mail and an identification of a wireless device from said destination processor, and the wireless system thereafter broadcasts the information contained in the electronic mail and the identification to the wireless device, wherein the wireless device transmits the information contained in the electronic mail to one of the mobile processors connected thereto, and wherein the electronic mail from the originating device includes an address of the destination processor and the information to be transmitted.

660. A destination processor in accordance with claim 659, wherein said processor adds, after reception of the electronic mail by the destination processor, the identification of the wireless device to the information contained in the electronic mail before transmission by the wireless system.

661. A destination processor in accordance with claim 659, wherein said processor deletes, after reception of the electronic mail by the destination processor information from the electronic mail, and said deleted information is not transmitted by the wireless system.

662. A destination processor in accordance with claim 659, wherein said processor performs a check, after reception of the electronic mail by the destination processor, to determine if the information contained in the electronic mail should be transmitted by the wireless system to the wireless device.

663. A destination processor in accordance with claim 659, wherein said processor processes, after reception of the electronic mail by the destination processor, the information contained in the electronic mail, and transmits the processed information in packets by the wireless system.

664. A destination processor in accordance with claim 659, wherein said identification is a number serving as a mobile identification (ID) of said wireless device.

665. A destination processor in accordance with claim 664, wherein information indicating a destination of said electronic mail contained in said electronic mail is converted to said mobile ID.

* * * * *

US006317592C1

(12) INTER PARTES REEXAMINATION CERTIFICATE (0452nd)

United States Patent
Campana, Jr. et al.

(10) Number: US 6,317,592 C1
(45) Certificate Issued: *Sep. 18, 2012

(54) ELECTRONIC MAIL SYSTEM WITH RF COMMUNICATIONS TO MOBILE PROCESSORS

(75) Inventors: Thomas J. Campana, Jr., Chicago, IL (US); Michael P. Ponschke, Lockport, IL (US); Gary F. Thelen, Palos Park, IL (US)

(73) Assignee: Computer Leasco, Inc., Birmingham, MI (US)

Reexamination Request:
No. 95/000,020, May 29, 2003
No. 90/006,495, Dec. 26, 2002

Reexamination Certificate for:
Patent No.: 6,317,592
Issued: Nov. 13, 2001
Appl. No.: 09/455,409
Filed: Dec. 6, 1999

(*) Notice: This patent is subject to a terminal disclaimer.

Related U.S. Application Data

(63) Continuation of application No. 09/161,462, filed on Sep. 28, 1998, now Pat. No. 6,067,451, which is a continuation of application No. 08/844,957, filed on Apr. 23, 1997, now Pat. No. 5,819,172, which is a continuation of application No. 08/443,430, filed on May 18, 1995, now Pat. No. 5,625,670, which is a continuation of application No. 07/702,939, filed on May 20, 1991, now Pat. No. 5,436,960.

(51) Int. Cl.
*H04M 11/10* (2006.01)

(52) U.S. Cl. ............... 455/412.1; 455/418; 709/206

(58) Field of Classification Search ................ 340/3.5, 340/3.52–3.54, 5.5, 5.51, 5.54, 5.8, 5.81, 340/5.85, 825.22, 825.26–825.29, 825.52, 340/7.31, 7.45–7.48, 7.51–7.56; 455/31.2, 455/31.3, 38.3, 461, 466, 412.1, 412.2, 414.1–415, 455/422.1, 426.1, 426.2, 556.1–557; 379/93.01, 379/93.14, 93.24, 100.08, 93.05–93.07, 93.12, 379/93.15, 93.23; 709/203, 205, 206, 207, 709/223, 224; 370/351, 352, 353, 354, 355, 370/356, 357, 389, 390, 392, 394, 395.3, 370/395.52, 432, 466, 467, 474, 475
See application file for complete search history.

(56) References Cited

To view the complete listing of prior art documents cited during the proceedings for Reexamination Control Numbers 90/006,495 and 95/000,020, please refer to the USPTO's public Patent Application Information Retrieval (PAIR) system under the Display References tab.

*Primary Examiner* — Roland G. Foster

(57) ABSTRACT

A system (100) for transmitting information from one of a plurality of originating processors A-N to at least a plurality of destination processors (A-N) which may be transported during operation in accordance with the invention includes at least one gateway switch (14), a gateway switch storing information received from one of the at least one originating processor prior to transmission of the information to the at least one destination processor; a RF information transmission network (302) for transmitting stored information received from one of the at least one gateway switch by RF transmission to at least one destination processor; at least one interface switch (304), an interface switch connecting a gateway switch to the RF transmission network and transmitting stored information received from one of the at least one gateway switch to the RF information transmission network; and wherein the information is electronic mail system in response to an address of the receiving interface switch which has been added to the information originated by the originating processor by either the originating processor or gateway switch and the information is transmitted from the receiving interface switch to the RF information transmission network with an address of the destination processor to receive the information which has been added by either the originating processor, a gateway switch or the receiving interface switch.

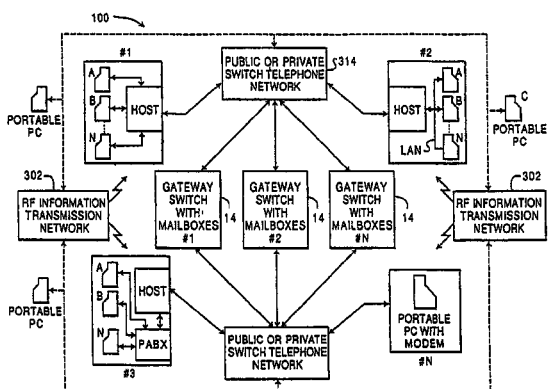

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-665 are cancelled.

* * * * *